United States Patent [19]
Massey et al.

[11] Patent Number: 5,349,644
[45] Date of Patent: Sep. 20, 1994

[54] DISTRIBUTED INTELLIGENCE ENGINEERING CASUALTY AND DAMAGE CONTROL MANAGEMENT SYSTEM USING AN AC POWER LINE CARRIER-CURRENT LAN

[75] Inventors: John Massey, Fairfax; Garland R. Granzow, Leesburg, both of Va.

[73] Assignee: Electronic Innovators, Inc., Fairfax, Va.

[21] Appl. No.: 159,692

[22] Filed: Dec. 1, 1993

Related U.S. Application Data

[63] Continuation of Ser. No. 906,309, Jun. 30, 1992, abandoned.

[51] Int. Cl.$^5$ .............................................. G06F 13/00
[52] U.S. Cl. ................................... 395/200; 340/310 R
[58] Field of Search ............... 395/200, 275, 575, 700; 340/310 R, 310 A, 538; 364/138

[56] References Cited

U.S. PATENT DOCUMENTS

| | | | |
|---|---|---|---|
| 3,909,821 | 9/1975 | Jagoda et al. | 340/310 |
| 3,911,415 | 10/1975 | Whyte | 340/310 |
| 3,912,916 | 10/1975 | Grun et al. | 235/152 |
| 3,924,223 | 12/1975 | Whyte et al. | 340/310 |
| 3,942,168 | 3/1976 | Whyte | 340/310 |
| 3,944,723 | 3/1976 | Fong | 178/3 |
| 3,949,172 | 4/1976 | Brown et al. | 179/2.5 |
| 3,962,547 | 8/1976 | Pattantyus-Abraham | 179/2.5 |
| 3,967,264 | 6/1976 | Whyte et al. | 340/310 |
| 3,973,087 | 8/1976 | Fong | 179/170 |
| 3,973,240 | 8/1976 | Fong | 340/151 |

(List continued on next page.)

OTHER PUBLICATIONS

Muilwijk, Dirk, "Correlative Phase Shift Keying–A Cass of Constant Envelope Modulation Techniques", IEEE Transactions on Comm. vol. COM-29, No. 3, Mar. 1981 pp. 226-256.

Austin et al., "QPSK, Staggered QPSK, and MSK–A Comparative Evaluation", IEEE Transactions on Comm. vol. COM-31, No. 2, Feb. 1983 pp. 171-182.

(List continued on next page.)

*Primary Examiner*—Robert L. Richardson
*Attorney, Agent, or Firm*—Nixon & Vanderhye

[57] ABSTRACT

A distributed artificial intelligence data acquisition and equipment control system forms a local area network (LAN) over the AC power lines of a vessel for communicating shipboard engineering casualty and damage control information. Each node in the LAN includes a power line carrier current (PLCC) transceiver, a slave processing unit for interfacing with local sensors or equipment and a master processing unit for controlling the formation, transmission and reception of offset-quadrature-phase-shift-keyed (OQPSK) LAN messages. Nodes in the LAN are strategically positioned at various locations throughout the ship and are configured to function either as a Terminal Unit or as a Data & Control Unit. Terminal Units are equipped with a touch screen display and an intelligent controller that provides a user-friendly interactive operator interface through a series of display screen prompts and includes a data base of ship casualty and damage control information stored in a local non-volatile random access memory. The data base, containing both archived and current data, is maintained and constantly updated by each terminal unit in response to information acquired both locally and from other nodes in the LAN. Each Terminal Unit is assigned specific damage control responsibilities for monitoring conditions, controlling equipment and for exchanging data and commands with other nodes. Data and Control units perform monitoring and control functions similar to Terminal Units, but have no touch screen and provide no user interface. The PLCC transceiver at each node includes an improved low noise transmitter that employs a direct digital modulation (DDM) technique utilizing ROM stored waveforms and an improved receiver that uses a passive linear-phase bandpass detection filter and a switchable phase-locked/Costas loop for highly reliable, rapid acquisition of PSK signals.

150 Claims, 53 Drawing Sheets

U.S. PATENT DOCUMENTS

| | | | |
|---|---|---|---|
| 3,980,954 | 9/1976 | Whyte | 325/48 |
| 3,990,019 | 11/1976 | Crockett et al. | 330/207 |
| 4,007,360 | 2/1977 | Kniel et al. | 235/152 |
| 4,008,467 | 2/1977 | Pattantyus-Abraham et al. | 340/310 |
| 4,023,071 | 5/1977 | Fussell | 361/56 |
| 4,027,265 | 5/1977 | Kobayashi et al. | 329/122 |
| 4,030,034 | 6/1977 | Ruegg | 325/319 |
| 4,060,735 | 11/1977 | Pascucci et al. | 307/3 |
| 4,065,763 | 12/1977 | Whyte et al. | 340/310 |
| 4,066,912 | 1/1978 | Wetherell | 307/3 |
| 4,083,009 | 4/1978 | Bickford et al. | 325/304 |
| 4,085,378 | 4/1978 | Ryan et al. | 329/124 |
| 4,092,606 | 5/1978 | Ryan | 329/124 |
| 4,101,834 | 7/1978 | Stutt et al. | 325/42 |
| 4,106,007 | 8/1978 | Johnston et al. | 340/310 |
| 4,130,861 | 12/1978 | LaForest | 363/39 |
| 4,156,194 | 5/1979 | Mueller | 325/320 |
| 4,178,482 | 12/1979 | Ouelette | 179/15 |
| 4,180,779 | 12/1979 | Hook et al. | 329/50 |
| 4,216,542 | 8/1980 | Hermesmeyer | 375/67 |
| 4,218,655 | 8/1980 | Johnston et al. | 455/39 |
| 4,229,705 | 10/1980 | Takahashi et al. | 330/258 |
| 4,234,926 | 11/1980 | Wallace et al. | 364/551 |
| 4,274,067 | 6/1981 | Uzunoglu | 331/172 |
| 4,280,224 | 7/1981 | Chethik | 375/116 |
| 4,281,293 | 7/1981 | Childs et al. | 329/105 |
| 4,281,412 | 7/1981 | Wissel | 375/86 |
| 4,301,445 | 11/1981 | Robinson | 340/825.54 |
| 4,302,844 | 11/1981 | Bruene | 375/58 |
| 4,307,380 | 12/1981 | Gander | 340/310 |
| 4,310,805 | 1/1982 | Hackert et al. | 331/1 |
| 4,311,964 | 1/1982 | Boykin | 329/104 |
| 4,328,590 | 5/1982 | Lee | 455/203 |
| 4,344,066 | 8/1982 | Beggs | 340/310 |
| 4,355,303 | 10/1982 | Phillips et al. | 340/310 |
| 4,389,622 | 6/1983 | Kackman | 332/19 |
| 4,408,186 | 10/1983 | Howell | 340/310 |
| 4,431,930 | 2/1994 | Monticelli | 307/520 |
| 4,446,458 | 5/1984 | Cook . | |
| 4,458,236 | 7/1984 | Perkins | 340/310 |
| 4,468,792 | 8/1984 | Baker et al. | 375/45 |
| 4,479,215 | 10/1984 | Baker | 371/33 |
| 4,480,232 | 10/1984 | Baker et al. | 331/1 |
| 4,489,420 | 12/1984 | Baker et al. | 375/94 |
| 4,510,611 | 4/1985 | Dougherty | 375/8 |
| 4,514,594 | 4/1985 | Brown et al. | 179/2.51 |
| 4,514,697 | 4/1985 | York | 329/104 |
| 4,516,079 | 7/1985 | York | 329/104 |
| 4,523,128 | 6/1985 | Stamm et al. | 315/291 |
| 4,527,247 | 7/1985 | Kaiser et al. | 364/550 |
| 4,543,540 | 9/1985 | Linder | 331/1 |
| 4,556,866 | 12/1985 | Gorecki | 340/310 |
| 4,563,650 | 1/1986 | York et al. | 329/50 |
| 4,567,557 | 1/1986 | Burns | 364/145 |
| 4,569,050 | 2/1986 | Ohme | 371/37 |
| 4,573,170 | 2/1987 | Melvin, Jr. et al. | 375/100 |
| 4,575,684 | 3/1986 | Stamm | 329/122 |
| 4,575,710 | 3/1986 | Best | 340/514 |
| 4,577,333 | 3/1986 | Lewis et al. | 375/45 |
| 4,577,977 | 3/1986 | Pejsa | 374/39 |
| 4,580,276 | 4/1986 | Andruzzi, Jr. et al. | 375/42 |
| 4,583,231 | 4/1986 | Puckette | 375/1 |
| 4,583,232 | 4/1986 | Howell | 375/8 |
| 4,584,685 | 4/1986 | Gajjar | 371/35 |
| 4,589,120 | 5/1986 | Mendala | 375/117 |
| 4,591,940 | 5/1986 | Sun et al. | 361/68 |
| 4,597,082 | 6/1986 | Hill et al. | 371/32 |
| 4,609,839 | 9/1986 | Howell | 307/542 |
| 4,633,218 | 12/1986 | Palsgrove et al. | 340/310 |
| 4,636,771 | 1/1987 | Ochs | 430/310 |

(List continued on next page.)

OTHER PUBLICATIONS

Gardner, Floyd, "Comparison of QPSK Carrier Regenerator Circuits for TDMA Application ", ESRO/ESTEC, pp. 43B-1 through 43B-5, Netherlands.

Oshita et al., "Combined Effect of the Carrier Recovery and Symbol Timing Recovery Error on the $P_e$ Performance of QPR and Offset QPR Systems", IEEE Transactions on Comm. vol. COM-30, No. 12, Dec. 1982, pp. 2534-2550.

Weber, et al., "Demod-Remod Coherent Tracking Receiver for QPSK and SQPSK", IEEE Transactions on Comm. vol. COM-28, No. 12, Dec. 1980, pp. 1945-1968.

Halverson et al., "A Further Comment on the Spectral Width of MSK-Type Signalling Waveforms Relative to That of PSK", IEEE Transactions on Comm. vol. COM-30, No. 8, Aug. 1982, pp. 1983-1993.

Yazdani et al., "Constant Envelope Bandlimited BPSK Signal", IEEE Transactions on Comm. vol. COM 28, No. 6, Jun. 1980, pp. 889-897.

Greenstein et al., "Required Transmit Filter Bandwidths in Digital Radio Systems", IEEE Transactions on Comm. vol. COM-29, No. 9, Sep. 1981, pp. 1405-1409.

(List continued on next page.)

U.S. PATENT DOCUMENTS

| | | | |
|---|---|---|---|
| 4,638,299 | 1/1987 | Campbell | 340/310 |
| 4,642,607 | 2/1987 | Strom et al. | 340/310 |
| 4,644,320 | 2/1987 | Carr et al. | 340/310 |
| 4,644,547 | 2/1987 | Vercellotti et al. | 371/69 |
| 4,644,566 | 2/1987 | Vercellotti et al. | 375/94 |
| 4,645,956 | 2/1987 | Shuey | 307/562 |
| 4,648,091 | 3/1987 | Gajjar | 371/37 |
| 4,649,569 | 3/1987 | Kennon et al. | 455/67 |
| 4,668,934 | 5/1987 | Shuey | 340/310 |
| 4,675,648 | 6/1987 | Roth et al. | 340/310 |
| 4,697,166 | 9/1987 | Warnagiris et al. | 340/310 |
| 4,703,306 | 10/1987 | Barritt | 340/310 |
| 4,715,045 | 12/1987 | Lewis et al. | 375/58 |
| 4,731,810 | 3/1988 | Watkins . | |
| 4,745,391 | 5/1988 | Gajjar | 340/310 |
| 4,746,897 | 5/1988 | Shuey | 340/310 |
| 4,755,792 | 7/1988 | Pezzolo et al. | 340/538 |
| 4,766,414 | 8/1988 | Shuey | 340/310 |
| 4,772,870 | 9/1988 | Reyes | 340/310 |
| 4,777,381 | 10/1988 | Fernandes | 307/64 |
| 4,785,195 | 11/1988 | Rochelle et al. . | |
| 4,815,106 | 3/1989 | Propp et al. | 375/36 |
| 4,845,466 | 7/1989 | Hariton et al. | 340/310 |
| 4,864,589 | 9/1989 | Endo | 375/1 |
| 4,885,563 | 12/1989 | Johnson et al. | 340/310 |
| 4,885,564 | 12/1989 | Vercellotti et al. | 340/310 |
| 4,896,277 | 1/1990 | Vercellotti et al. | 364/551.01 |
| 4,903,006 | 2/1990 | Boomgaard | 340/310 |
| 4,912,553 | 3/1990 | Pal et al. | 358/86 |
| 4,912,723 | 3/1990 | verbanets, Jr. | 375/7 |
| 5,034,882 | 7/1991 | Eisenhard et al. | 364/200 |
| 5,184,179 | 2/1993 | Tarr et al. | 355/206 |

OTHER PUBLICATIONS

Western Digital Manual, Part No. WD2840, pp. 42–43.

Proposal to Develop and Produce Prototype Integrated Shipboard Control and Information System submitted to PMS–400 by Electronic Innovators, Inc., Jun. 1983.

Rough Order of Magnitude to Develop and Produce Prototype DDG–51 Class Power Bus Information System submitted to NAVSEA 05D3 by Electronic Innovators, Inc., Jun. 1983.

ROM Communication Prepared for Ingalls Shipbuilding Division, Pasagoula, MS., prepared by Electronic Innovators, Inc., Apr. 3, 1981.

Expression of Interest in Highspeed Shipboard Powerline Communication submitted to NAVSEA by Electronic Innovators, Inc., May 31, 1985.

A Submarine Data Recording System Using Power Line Carrier Communications by John Massey, Electronic Innovators, Inc.

An Integrated Shipboard Control & Information System, by Electronic Innovators, Inc., (1983).

A Shipboard Damage Control System, by John Massey, Electronic Innovators, Inc., (1985).

What Exactly is Power Line Communication, by John Massey, Electronic Innovators, Inc.

Final Test Report–Contract Number N00140-8-5-C-JF56 for Naval Underwater Systems Center, by Electronic Innovators, Inc., Oct. 10, 1985.

Test Report–Power Line Carrier Ship Board Test in USS Scott (DD-995 by Electronic Innovators, Inc.), Apr. 2,3,4, 1983.

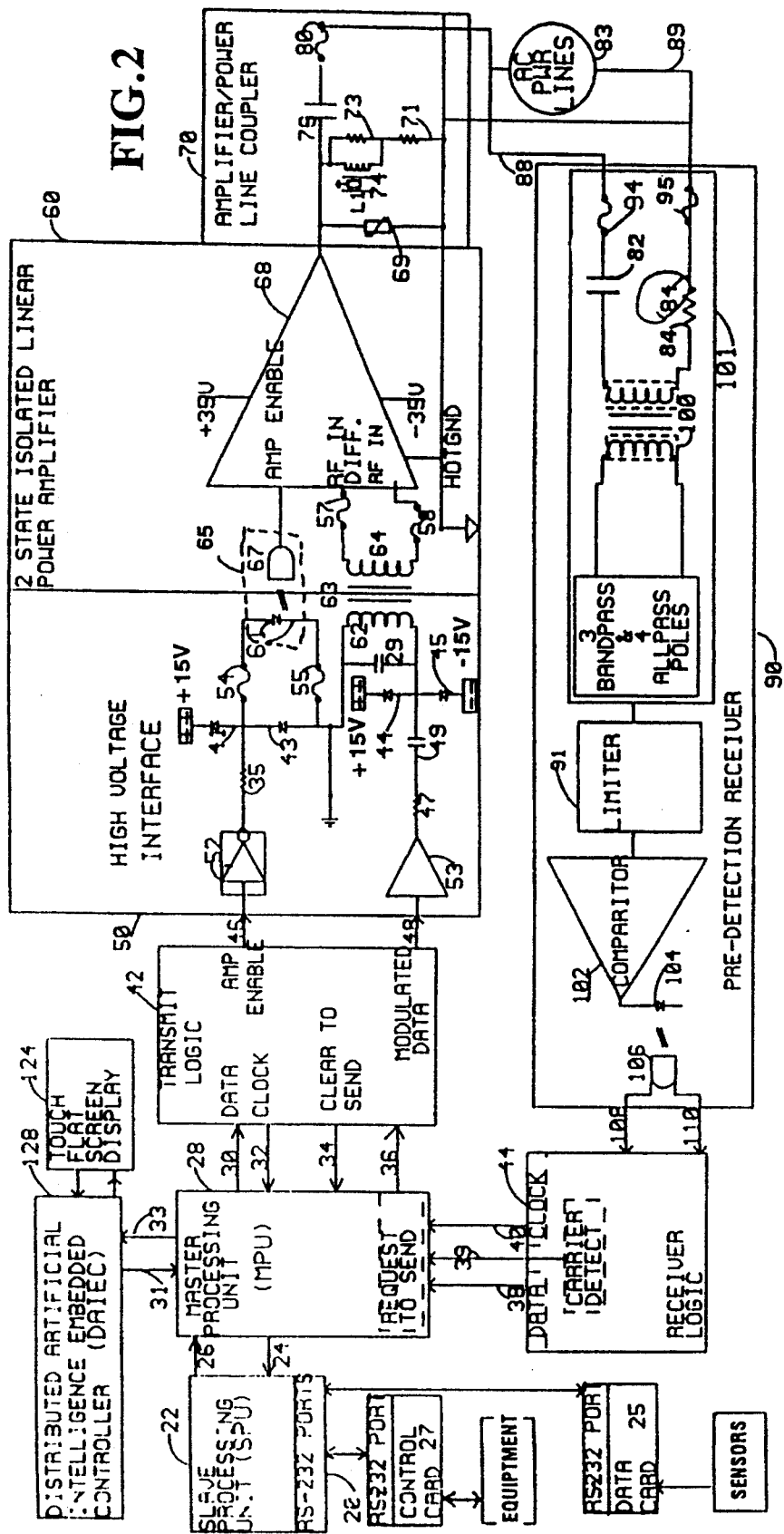

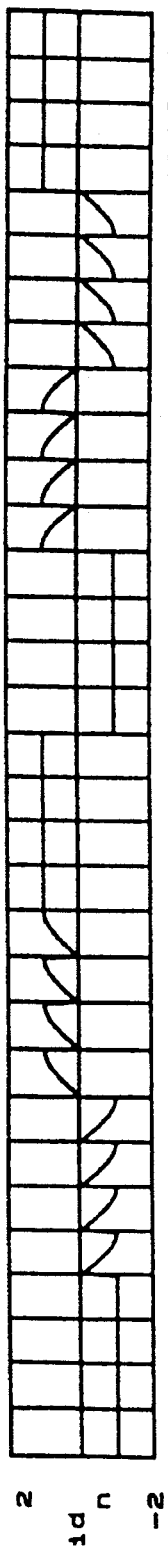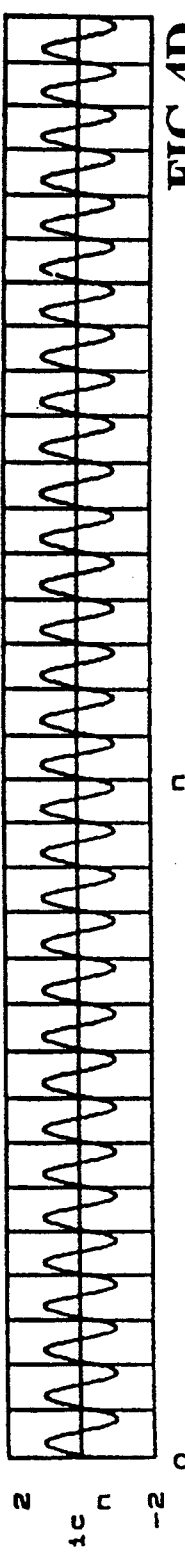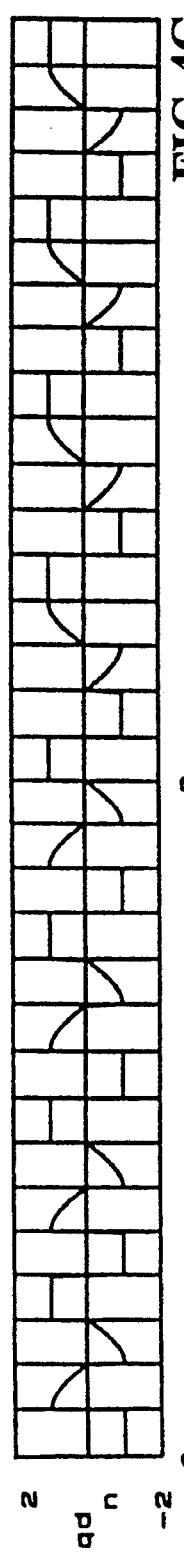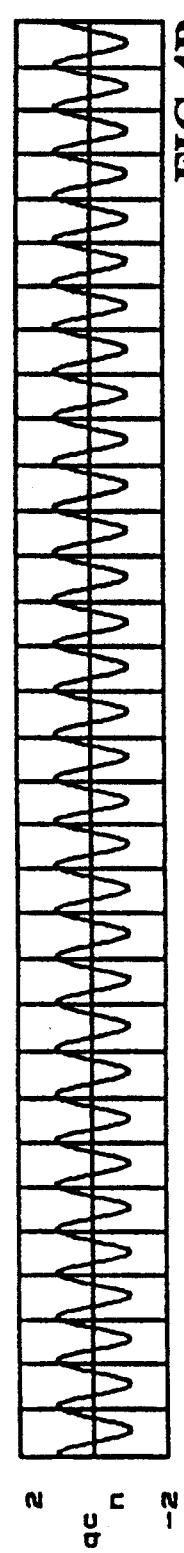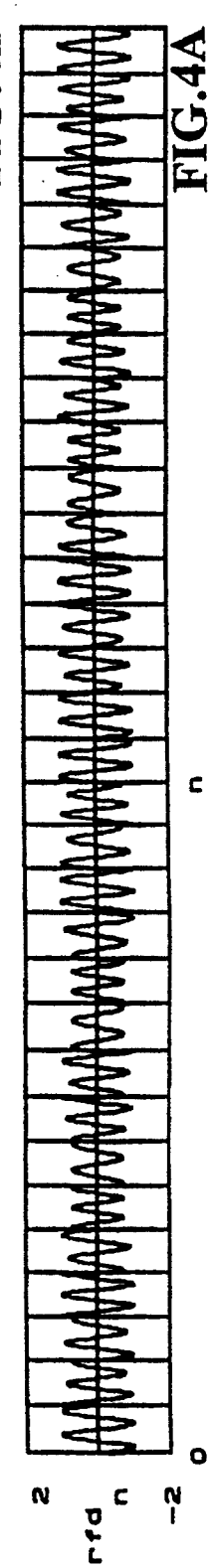

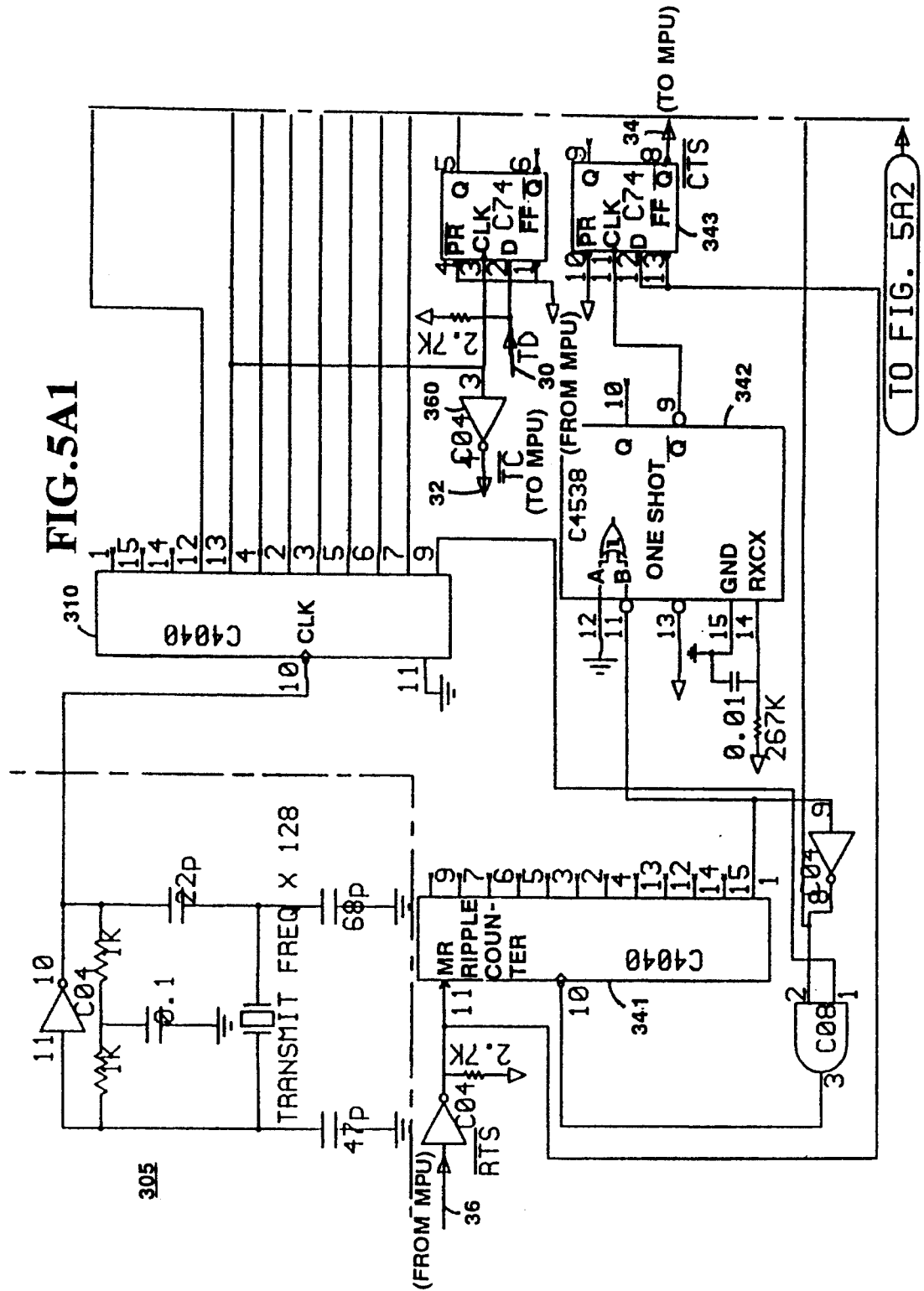
FIG.5A1

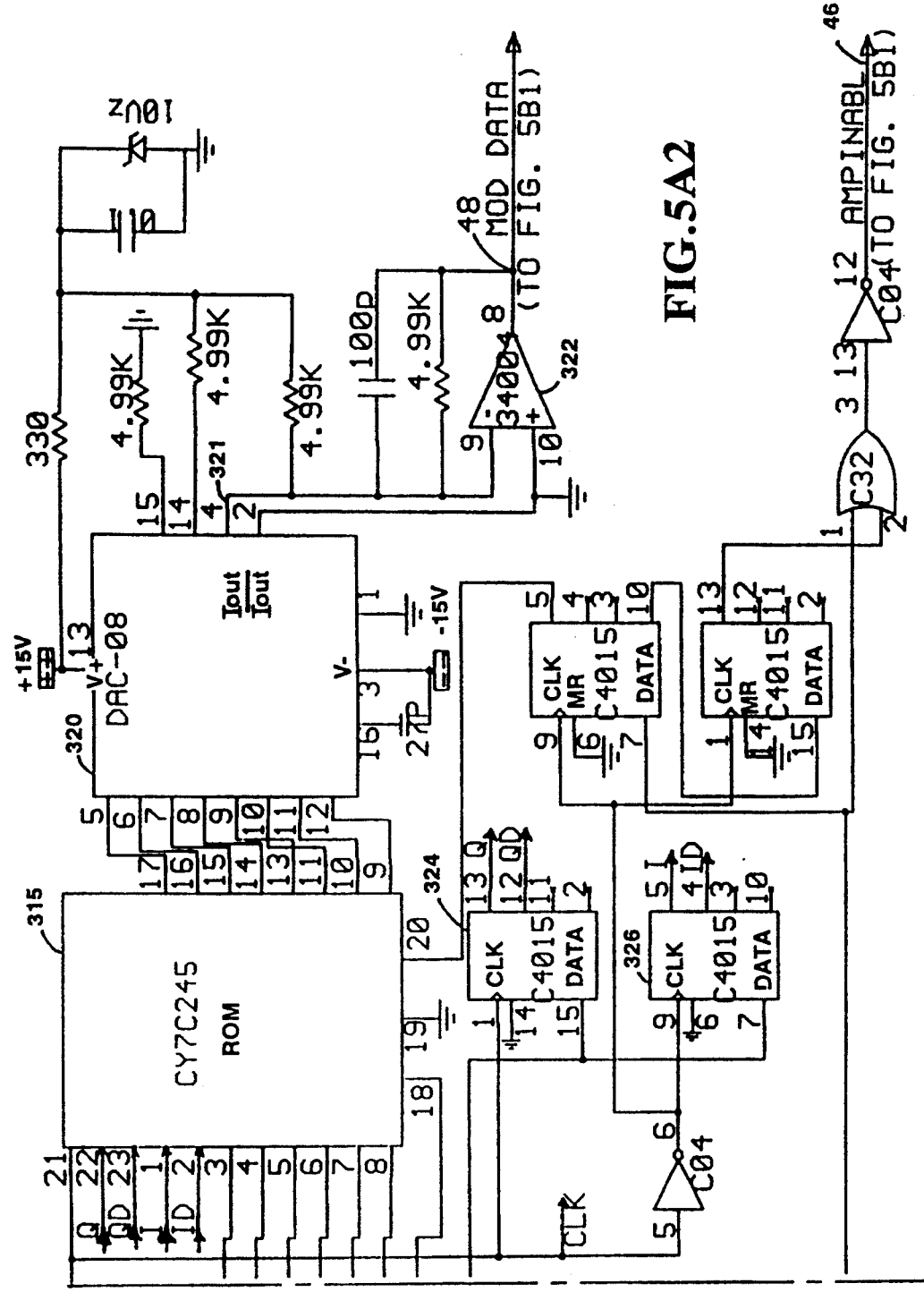
FIG. 5A2

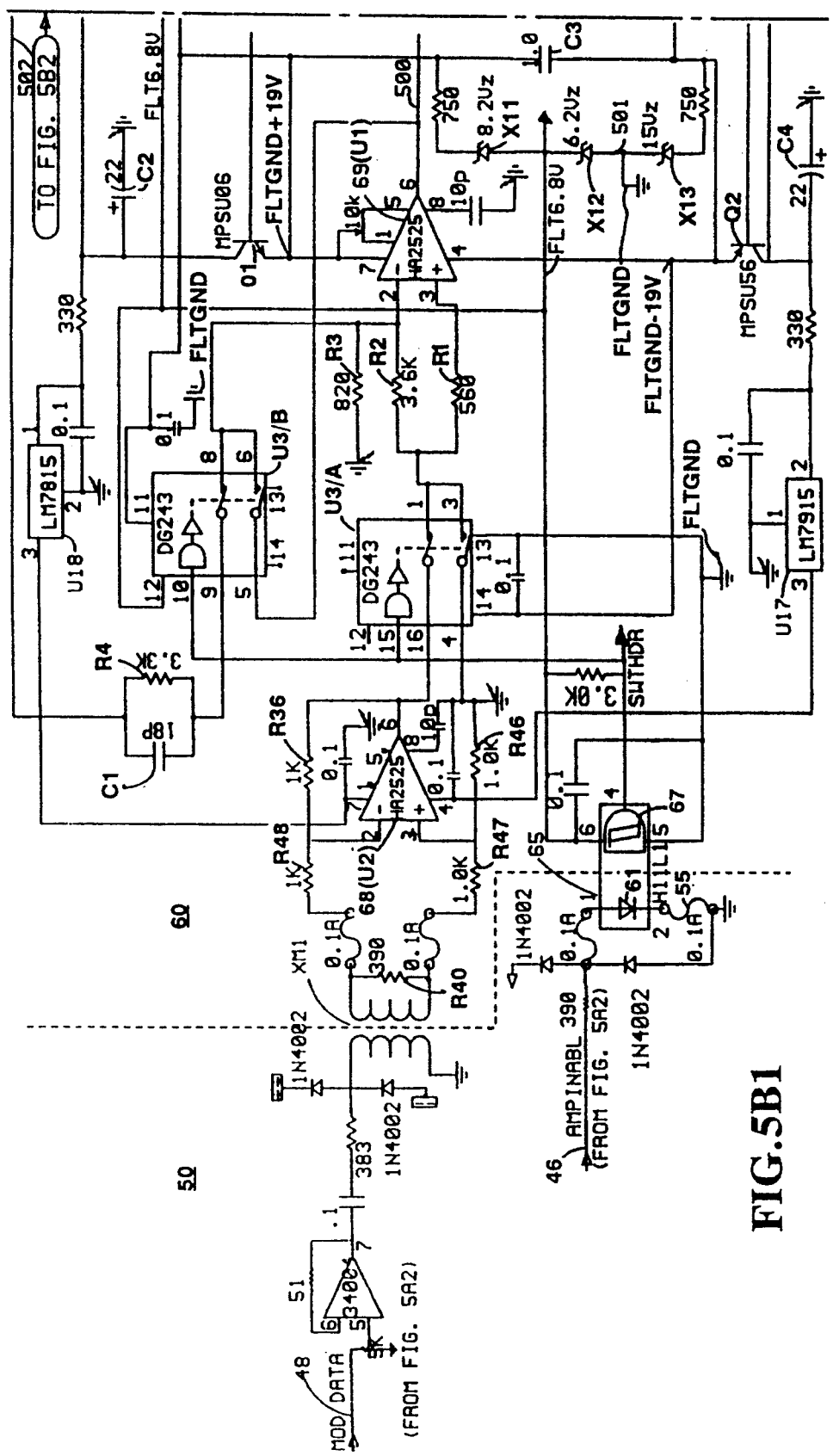
FIG. 5B1

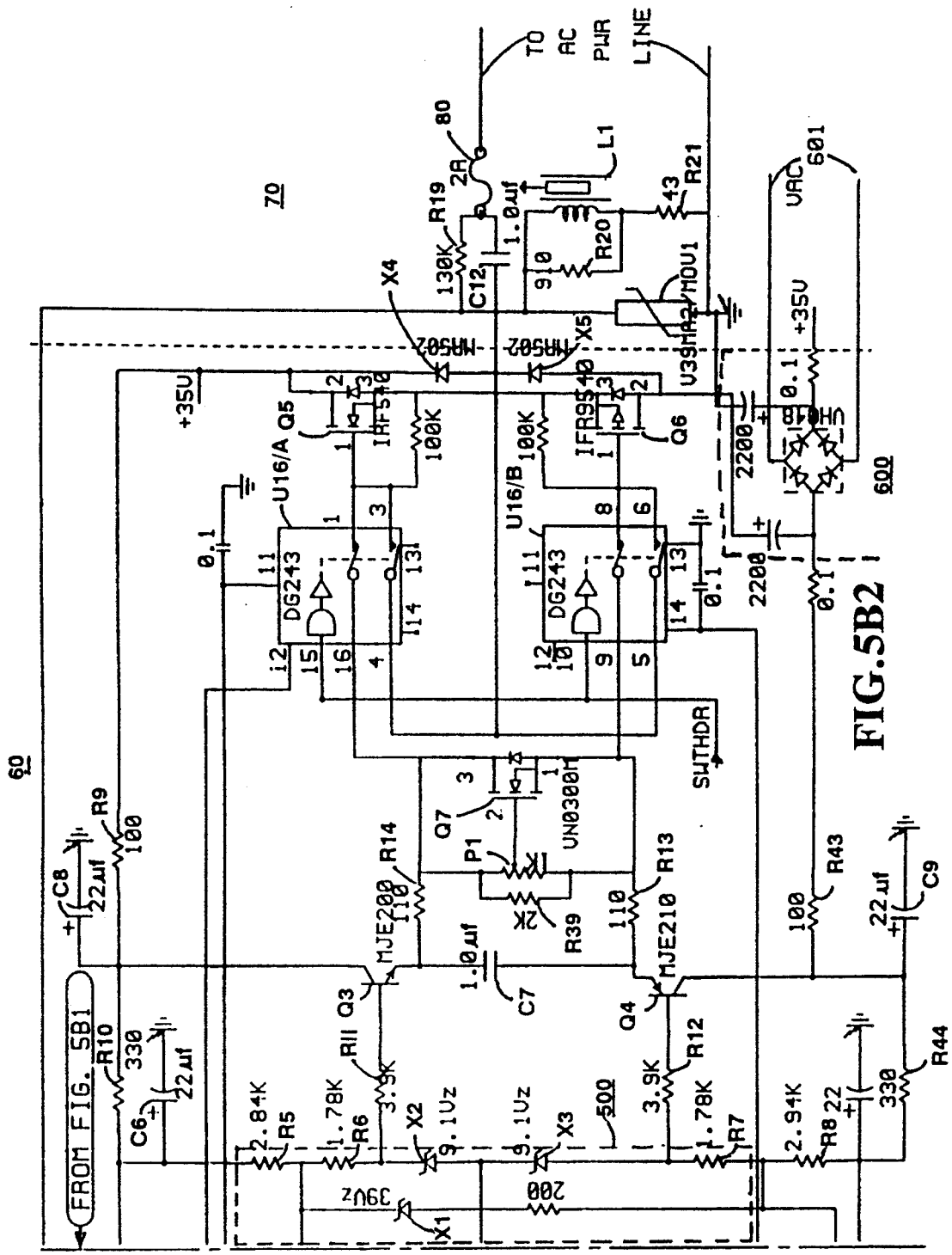
FIG.5B2

| OPERATIONAL MODE<br>GENERAL STEAMING | | EMERGENCY MODE<br>NONE |
|---|---|---|
| | MAIN DAMAGE CONTROL | |
        Airborne Ordnance Hit
        Below Waterline hit
        Fire
        CBR
        Nuclear Weapons Accident
        Collision
        Grounding
        Explosion
        Display
        Maintenance
FIG.7A

| | | | | | | | | |
|---|---|---|---|---|---|---|---|---|
| HEAT | | | | | | | | |
| SMOKE | | | NA | NA | | | | |
| FIRE MAIN PRESSURE | | | | | | | | |
| FIRE MAIN FLOW | | | | | | | | |
| FLOODING | | | | | | | | |
| VENTILATION | | | | | | | | |
| ENGINEERING | | | | | | | | |
|     DRY AIR | | | | | | | | |
|     CHILLED H2O | | | | | | | | |
|     DEMIN H2O | | | | | | | | |
|     COMPRESSED AIR | | | | | | | | |
|     OXYGEN | | | | | | | | |
|     NITROGEN | | | | | | | | |
|     HALON 1301 | | | | | | | | |
|     JP-5 | | | | | | | | |
| DAMAGE CONTROL CONFIG | | | | | | | | |
| | |
|---|---|
| MAIN ELECTRICAL | \<-5 \ +5 \>\| \<-5 \ -25 \>\| \ LOST \|not applicable\| \ no change |
| AUXILIARY ELECTRICAL | \<-5 \ +5 \>\| \<-5 \ -25 \>\| \ LOST \|not applicable\| \ no change |
FIG.7A1

OPERATIONAL MODE
GENERAL STEAMING

EMERGENCY MODE
AIRBORNE ORDNANCE HIT

ANNOUNCE AIRBORNE ORDNANCE HIT

YES

NO

SAVE  SELECT  SCROLL  UP  DOWN  SCREEN  RIGHT  LEFT  CLOSE SHIP

FIG.7A2

AIRBORNE ORDNANCE HIT SITREP
OPERATIONAL MODE
GENERAL QUARTERS
EMERGENCY MODE
AIRBORNE ORDNANCE HI
MISSILE HIT ON 01 LEVEL BETWEEN FRAME 138 AND 174 PORTSIDE
NO PLC COMMUNICATION WITH HIT SPACE
REQUESTING PERMISSION TO ANNOUNCE
FIRE OUT OF CONTROL
MISSILE HIT
REQUESTING PERMISSION TO ORDER
ASSEMBLY OF DAMAGE CONTROL PARTIES
ALL OF THE ABOVE
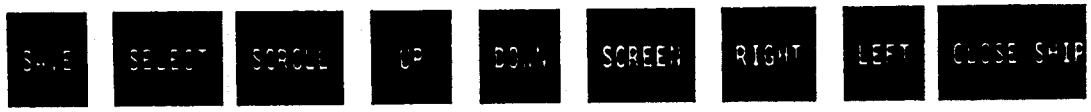
FIG.7A3

OPERATIONAL MODE                                      EMERGENCY MODE

GENERAL STEAMING                                      NONE

MAIN MECHANICAL

MAIN MECHANICAL DISPLAY

CAUSALITY RECONFIGURATION

INACTIVE SENSOR LIST MAINTENANCE

CLOSE SHIP LIST MAINTENANCE

DAMAGE CONTROL CONFIGURATION LIST

COMMUNICATION MAINTENANCE

| SAVE | SELECT | SCROLL | UP | DOWN | SCREEN | RIGHT | LEFT |

OPERATIONAL MODE                                            EMERGENCY MODE
GENERAL STEAMING                                                  NONE
| | 1 | 2 | 3 | 4 | NO CHANGE | NO RETURN SENSOR | NO RETURN UNIT |
|---|---|---|---|---|---|---|---|
| HEAT | | | | | | | |
| SMOKE | | | | | | | |
| FIRE MAIN PRESSURE | | | | | | | |
| FIRE MAIN FLOW | | | | | | | |
| FLOODING | | | | | | | |
| VENTILATION | | | | | | | |
| SHOCK SENSORS | | | | | | | |
| ENGINEERING | | | | | | | |
|     DRY AIR | | | | | | | |
|     CHILLED H2O | | | | | | | |
|     DEMIN H2O | | | | | | | |
|     COMPRESSED AIR | | | | | | | |
|     OXYGEN | | | | | | | |
|     NITROGEN | | | | | | | |
|     HALON 1301 | | | | | | | |
|     JP-5 | | | | | | | |
| DAMAGE CONTROL CONFIG | | | | | | | |
FIG.7D1

OPERATIONAL MODE                                      EMERGENCY MODE

GENERAL STEAMING                                      NONE

MAIN ELECTRICAL

Communication Maintenance

Battle Shorting List Maintenance

Load Shedding List Maintenance

Transient Control Maintenance

Display and Control of Electrical Distribution

SYSTEM COMMUNICATION RELIABILITY REPORT

OPERATIONAL MODE                                              EMERGENCY MODE

GENERAL STEAMING                                                    NONE

```
        NO COMMUNICATION
    L   ----------------------------------------------------1000/HR.
    O
    G

C
    O   ----------------------------------------------------100/HR.
    M

R
    A   ----------------------------------------------------10/HR.
    T
    E

----------------------------------------------------1/HR.

----------------------------------------------------.5/HR.

----------------------------------------------------.2/HR.
```

ERROR RATES NOT REPORTED BELOW .2/HOUR

FIG.7E1

OPERATIONAL MODE							EMERGENCY MODE
GENERAL STEAMING								NONE
FIRE
| Equipment | CONDITION 1 | see | where | Auth | location | Auto |
|---|---|---|---|---|---|---|
| Scy-1 | YES | NC |  |  | 03-150-2-C | Y |
| turbine | YES | .95 | CIC | OOD | 3-300-0-E | N |
FIG.7E2

OPERATIONAL MODE                                    EMERGENCY MODE

GENERAL STEAMING                                         NONE

SELECT BATTLE SHORTING CONDITIONS FOR

SPY-1 RADAR

DURING CONDITION ONE

AND

FIRE

| CONDITION 1 | SEE | WHERE | AUTH |
| YES | NO | ■ | ■ |

NO        YES        01

15        WO

22

| SAVE | SELECT | SCROLL | UP | DOWN | SCREEN | RIGHT | LEFT |

FIG. 7E3

OPERATIONAL MODE                                      EMERGENCY MODE

GENERAL STEAMING                                      NONE

TRANSIENT CONTROL MAINTENANCE

SELECT FROM LIST OF TRANSIENT EQUIPMENTS

EQUIPMENT  1         EQUIPMENT  2         EQUIPMENT  3
        EQUIPMENT  4         EQUIPMENT  5         EQUIPMENT  6
        EQUIPMENT  7         EQUIPMENT  8         EQUIPMENT  9
        EQUIPMENT 10         EQUIPMENT 11     EQUIPMENT 12
        EQUIPMENT 13         EQUIPMENT 14         EQUIPMENT 15
        EQUIPMENT 16         EQUIPMENT 17         EQUIPMENT 18
        EQUIPMENT 19         EQUIPMENT 20         EQUIPMENT 21

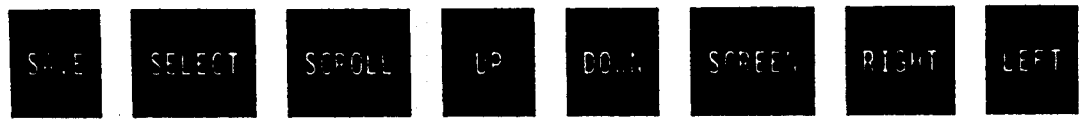

FIG.7E4

OPERATIONAL MODE                                      EMERGENCY MODE

GENERAL STEAMING                                           NONE

TRANSIENT SCENARIO MODIFICATION FOR
            EQUIPMENT      8         TRANSIENT      2 SECONDS

EQUIPMENT   22   PRIME   NO    YES   EQUIPMENT 32   ALTER   NO    YES
EQUIPMENT   26   ALTER   YES   YES   EQUIPMENT 22   ALTER   NO    YES

FIG.7E5

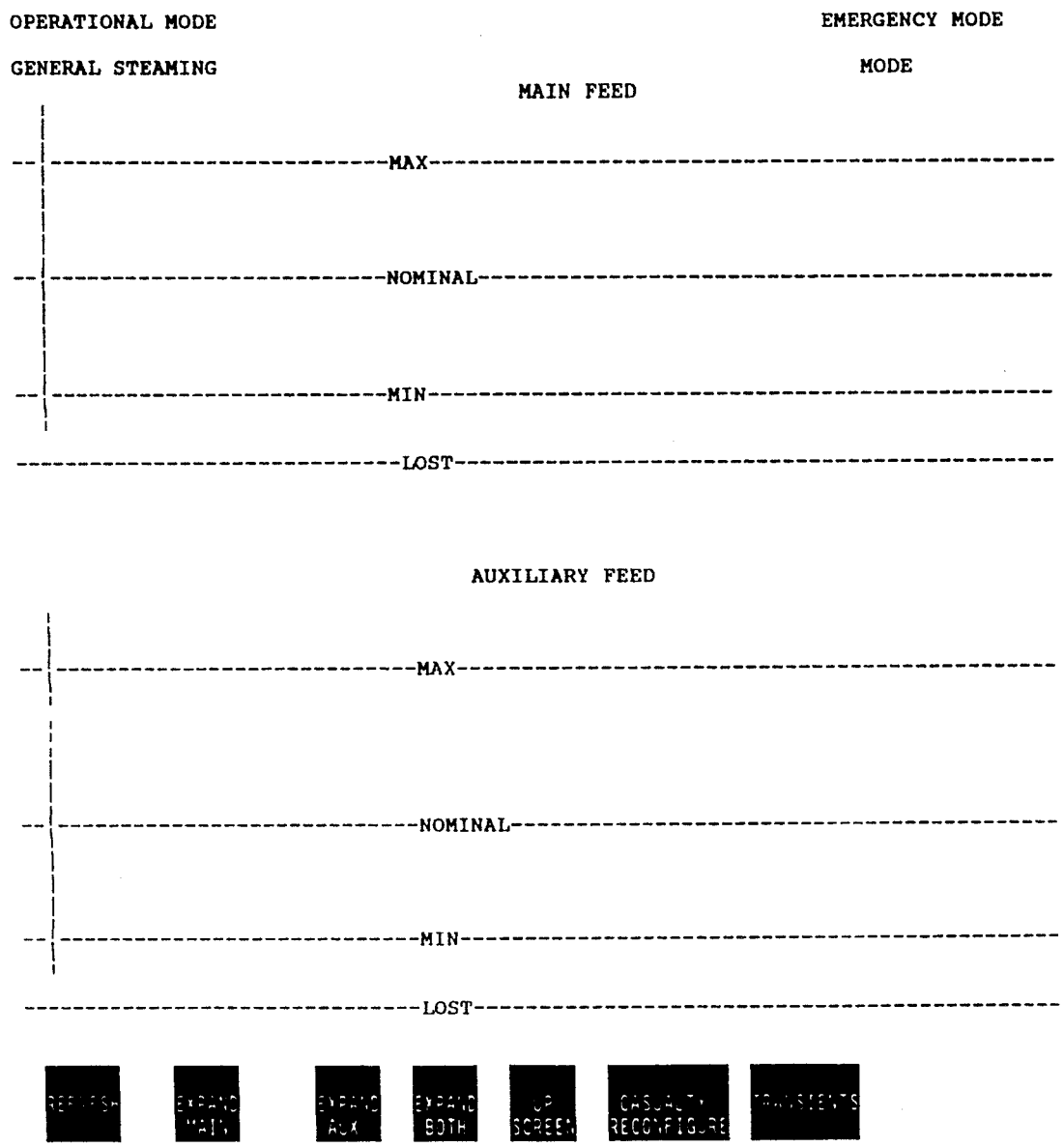
FIG.7E6

OPERATIONAL MODE                                           EMERGENCY MODE
GENERAL STEAMING                                                 NONE
```
                                 MAIN FEED
   |
 --|--------------------------MAX--------------------------------------------
   |
   |
   |
   |
 --|-----------------------NOMINAL------------------------------------------
   |
   |
   |
   |
 --|--------------------------MIN--------------------------------------------
   |
 -----------------------------LOST-------------------------------------------
                               AUXILIARY FEED
location xx                                                      location yy
   |
 --|--------------------------MAX--------------------------------------------
   |
   |
   |
 --|-----------------------NOMINAL------------------------------------------
   |
   |
   |
 --|--------------------------MIN--------------------------------------------
   |
 -----------------------------LOST-------------------------------------------
```
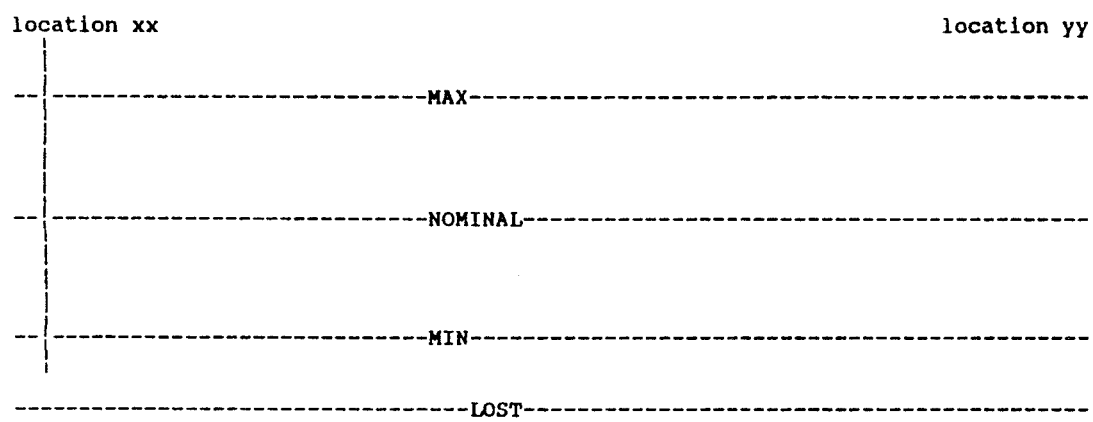
FIG.7E7

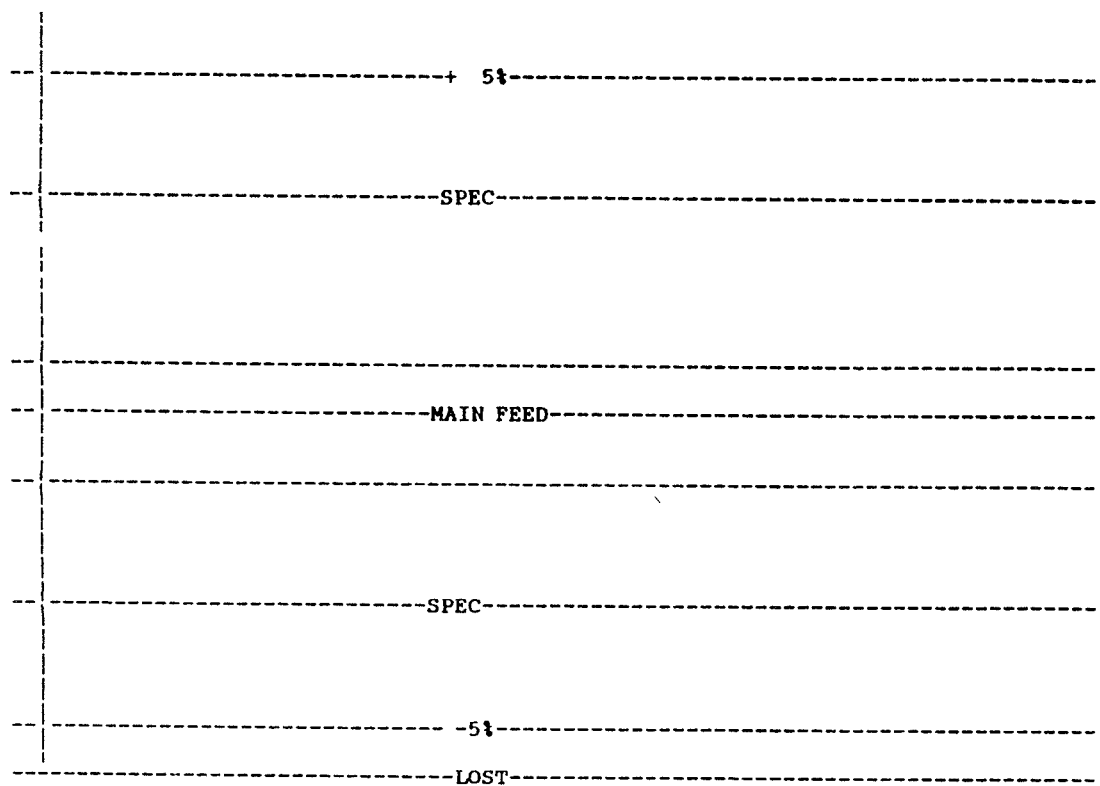
FIG.7E8

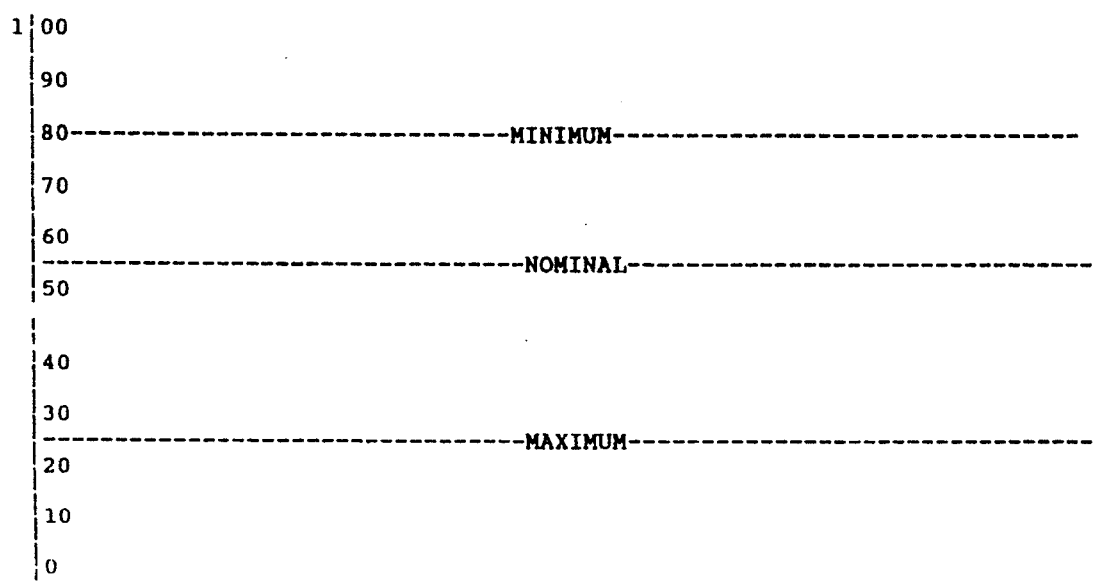
FIG.7E9

OPERATIONAL MODE
GENERAL STEAMING
EMERGENCY MODE
NONE
MAIN COMMUNICATION
SYSTEM INITIALIZATION
WATCH QUARTERS & STATION BILL MAINTENANCE
UNREPORTED SHIPS COMPANY
SET OPERATIONAL MODE
BOARDS AND LISTS MAINTENANCE
SET TRAINING
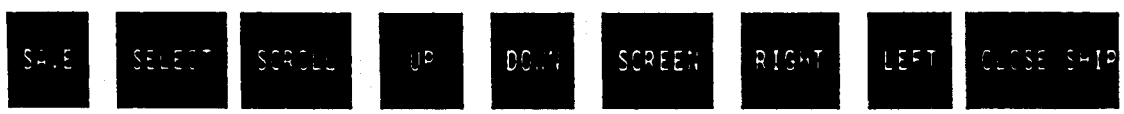
FIG.7F OPERATIONAL MODE　　　　　　　　　　　　　EMERGENCY MODE
IN PORT　　　　　　　　　　　　　　　　　　　NONE
SYSTEM INITIALIZATION
SET INITIALIZATION
SET OPERATIONAL
DISPLAY COMMUNICATION DATA
DISPLAY SENSOR DIFFERENCES
CONDUCT OPERABILITY TEST
SET SYSTEM OPERABILITY BOARD
FIG.7F1

SYSTEM COMMUNICATION RELIABILITY REPORT

OPERATIONAL MODE                     EMERGENCY MODE
IN PORT                                 NONE

NO COMMUNICATION
---------------------------------------------------------------1000/HR.

OPERATIONAL MODE  
IN PORT
EMERGENCY MODE  
NONE
WATCH QUARTERS & STATION BILL MAINTENANCE
CHANGE ORGANIZATION
CHANGE PERSONNEL
REPORT IN BY
   ORGANIZATION
   LOCATION
   INDIVIDUAL
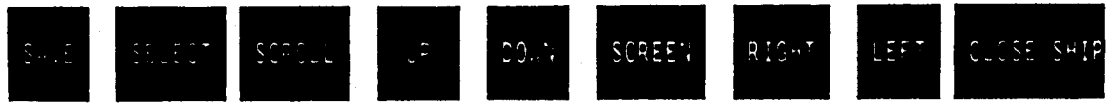
FIG.7F3

OPERATIONAL MODE                                    EMERGENCY MODE
GENERAL QUARTERS                                       MISSILE HIT
              WATCH QUARTERS & STATION BILL MAINTENANCE
                              REPORT IN
                  CIC
                  LOCATION # 1 IN VICINITY OF CIC
                  LOCATION # 2 IN VICINITY OF CIC
                  LOCATION # 3 IN VICINITY OF CIC
                  INDIVIDUAL IF YOU SEE SOMEONE
                  EXCEPTIONS IF YOU DO NOT SEE SOMEONE
FIG.7F4

OPERATIONAL MODE  
GENERAL QUARTERS

EMERGENCY MODE  
MISSILE HIT

WATCH QUARTERS & STATION BILL MAINTENANCE  
REPORT IN

EXCEPTIONS

SELECT FIRST CHARACTER OF LAST NAME

YOU MAY SELECT NAMES FROM THE EXCEPTIONS LIST AT ANY TIME

---

Q    W    E    R    T    Y    U    I    O    P

---

A    S    D    F    G    H    J    K    L

---

Z    X    C    V    B    N    M    BACKSPACE/DELETE

---

EXCEPTIONS LIST OF PERSONS WITH A LAST NAME OF

| PERSON NAME ONE | PERSON NAME TWO | PERSON NAME THREE |
|---|---|---|
| PERSON NAME FIVE | PERSON NAME SIX | PERSON NAME SEVEN |
| PERSON NAME EIGHT | PERSON NAME NINE | PERSON NAME TEN |
| PERSON NAME ELEVEN | PERSON NAME TWELVE | PERSON NAME THIRTEEN |
| PERSON NAME FOURTEEN | PERSON NAME FIFTEEN | PERSON NAME SIXTEEN |
| PERSON NAME SEVENTEEN | PERSON NAME EIGHTEEN | PERSON NAME NINETEEN |

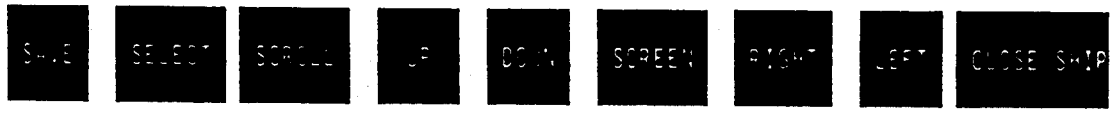

FIG.7F5

NO COMMANDS DATA ONLY   NO COMMANDS DATA ONLY   NO COMMANDS DATA ONLY

OPERATIONAL MODE:
GENERAL QUARTERS

EMERGENCY MODE:
MISSILE HIT

MAIN MECHANICAL DATA

MAIN ELECTRICAL DATA

MAIN DAMAGE CONTROL DATA

MAIN COMMUNICATION DATA

MAKE MAIN MECHANICAL

MAKE MAIN ELECTRICAL

MAKE MAIN DAMAGE CONTROL

MAKE MAIN COMMUNICATIONS

SELECT  SCROLL  UP  DOWN  SCREEN  RIGHT  LEFT

NO COMMANDS DATA ONLY   NO COMMANDS DATA ONLY   NO COMMANDS DATA ONLY

FIG.7G1

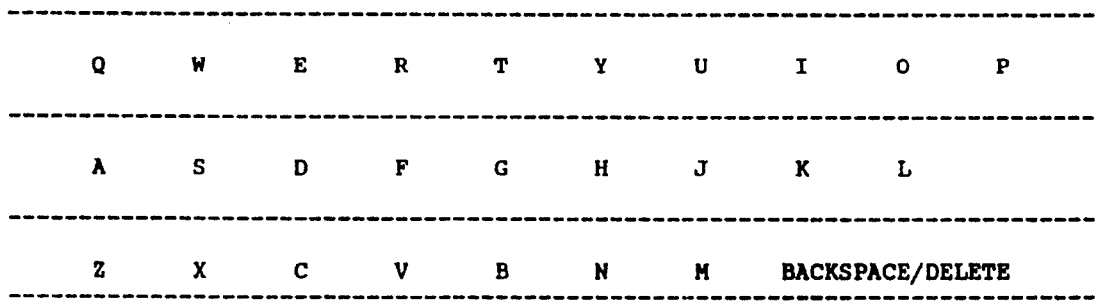
FIG.7G2

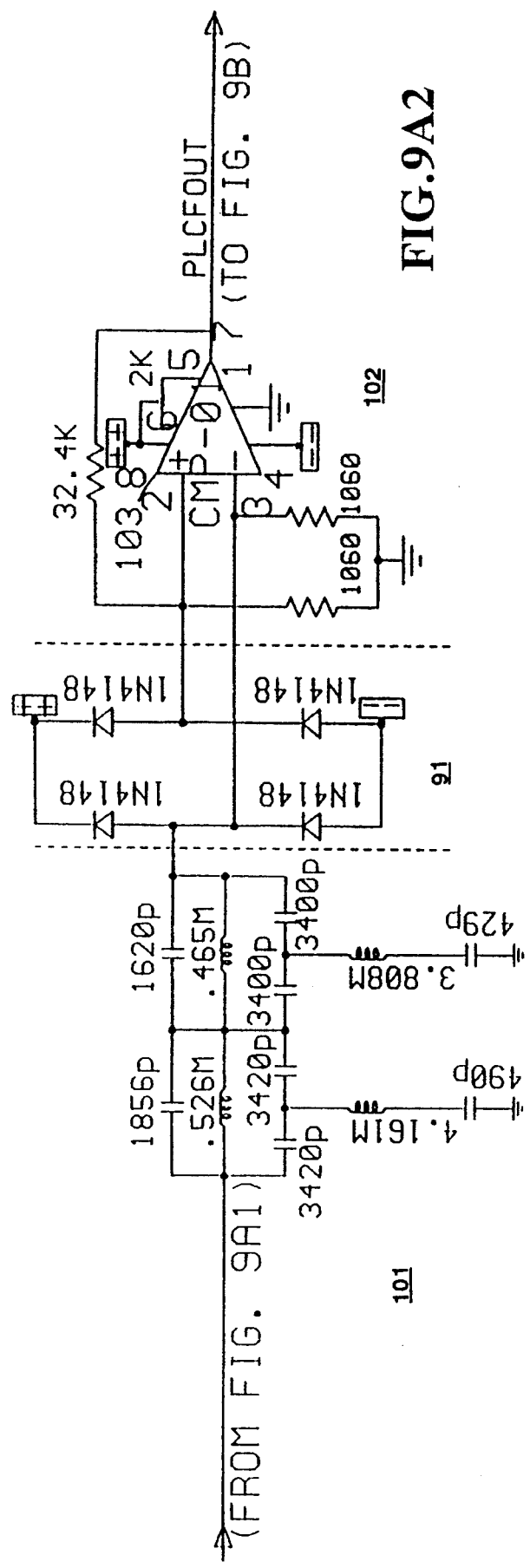

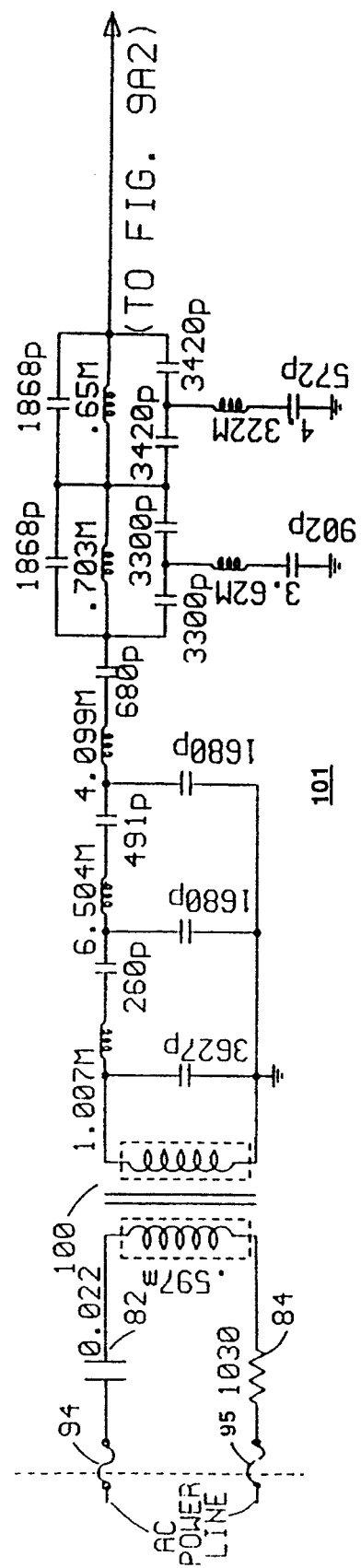
FIG.9A1

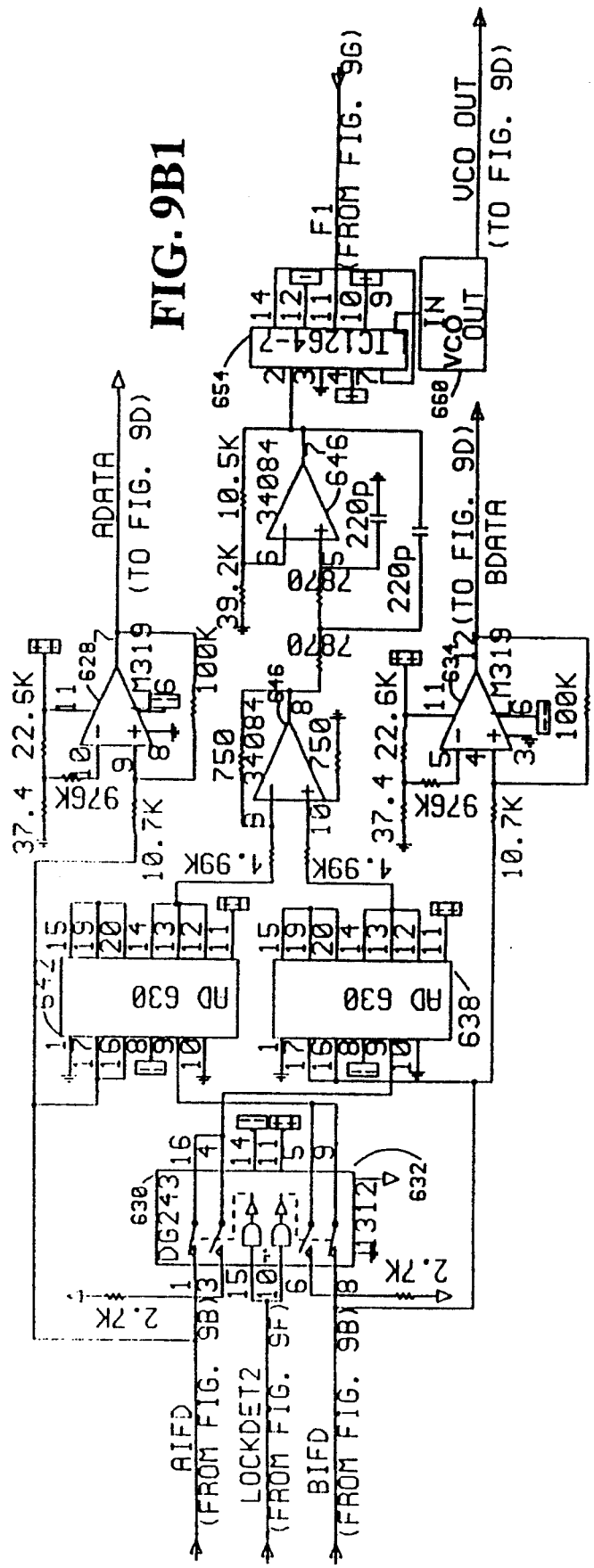
FIG. 9B1

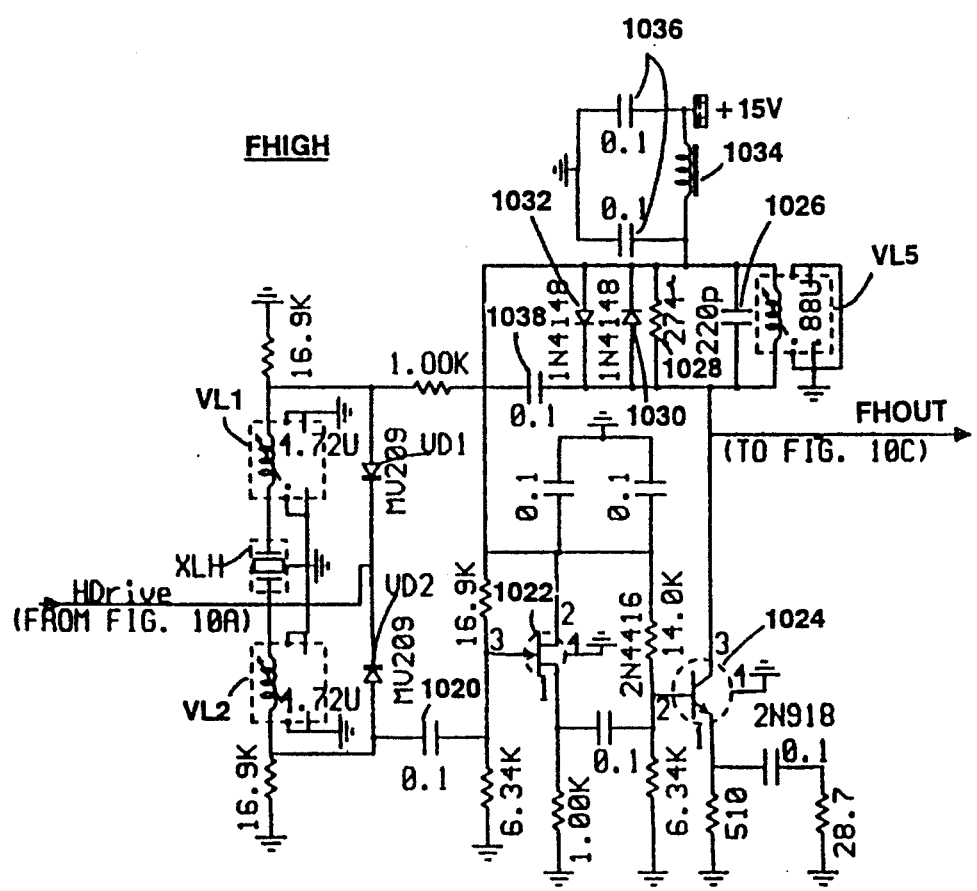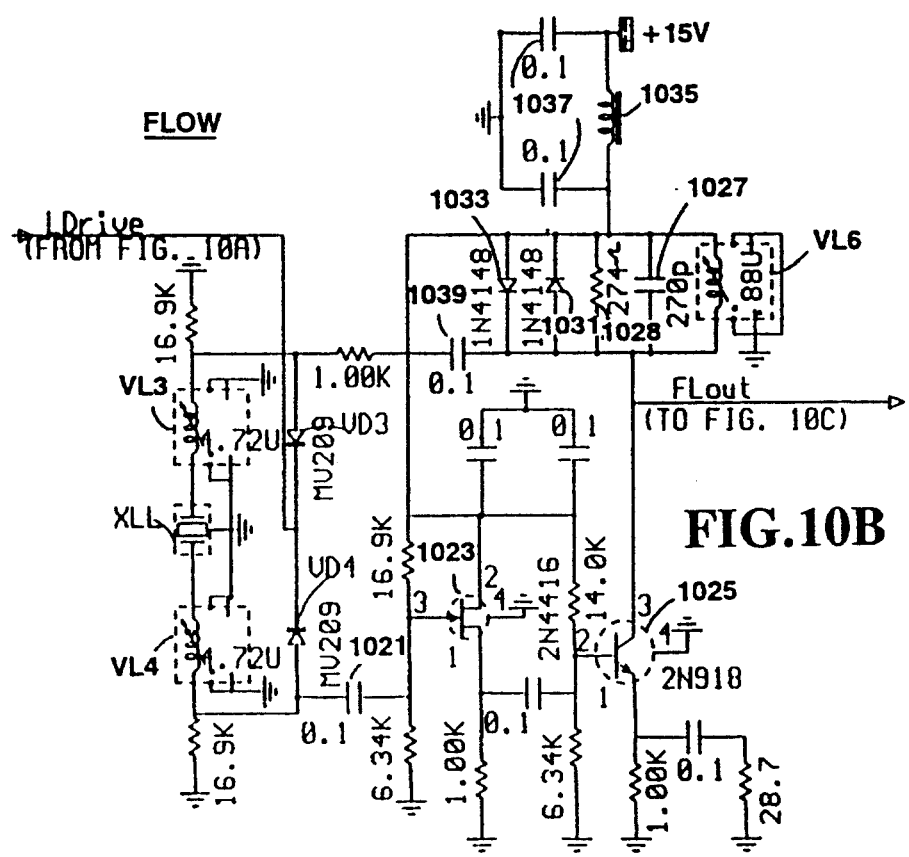
FIG. 10B

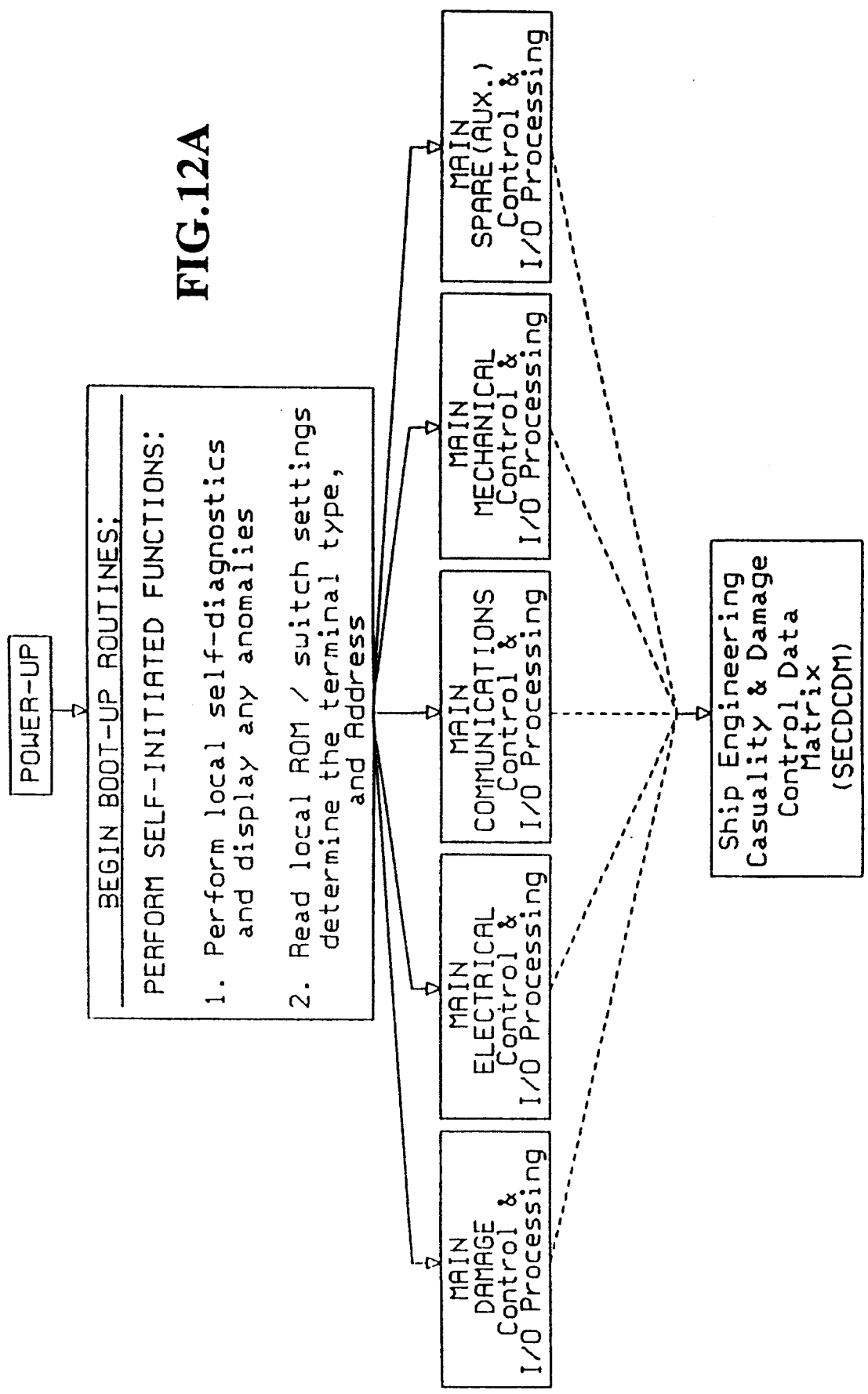

DISTRIBUTED INTELLIGENCE ENGINEERING CASUALTY AND DAMAGE CONTROL MANAGEMENT SYSTEM USING AN AC POWER LINE CARRIER-CURRENT LAN

This is a continuation of application Ser. No. 07/906,309, filed Jun. 30, 1992, now abandoned.

FIELD OF THE INVENTION

This invention relates generally to a local area network (LAN) power line carrier-current communications system. More specifically, the invention relates to a distributed intelligence data acquisition and equipment control system that communicates engineering casualty and damage control data over the AC power lines of a seagoing vessel or other structure. In particular, the invention is concerned with a low noise transmitter and receiver circuit for providing fast, highly reliable bidirectional digital carrier-current communications.

BACKGROUND AND SUMMARY OF THE INVENTION

Rudimentary power line carrier-current communication (PLCC) systems have been in use for many years. By way of example, in the early 50's PLCC units were commercially available that plugged into household power lines. These units enabled a parent to monitor an infant crying in a remote bedroom via power line carrier (PLC) transmitting and receiving units. Similarly, PLC based units permitted music generated in one location in a house to be transmitted to other points in the house via the power lines. PLC technology has also been used to implement and control various household functions. For example, a central PLC control station has been used to remotely control household lights and home appliances.

However, due to lack of reliability, PLCC systems have typically not been utilized in applications where loss of life could result if the system failed to consistently perform properly. Contrasted to the present invention, prior art PLC based systems have significant disadvantages. For example, prior art PLC control systems are extremely slow (e.g., conventionally about 50 bits per second) and do not permit bidirectional transfer of information. Additionally, because of a lack of satisfactory high voltage protection circuitry, prior art systems are susceptible to disruption caused by high voltage surges on the power lines such as often are produced, for example, by lighting strikes. Also, prior art PLC systems are typically amplitude modulated, and have very high error rates due to various sources of ambient power line noise.

One prior art example of a PLC communication network, U.S. Pat. No. 5,034,882 to Eisenhard et al issued Jul. 23, 1991, is known to employ distributed intelligence among a plurality of preprogrammed cells. However, the Eisenhard system contemplates using a conventional prior art transceiver for digital data and, moreover, does not perform any processing on the transmitted data. As such, the Eisenhard system still retains the poor data reliability and inadequate noise immunity inherent in prior art PLCC systems. Another prior art example using PLC communication is provided in U.S. Pat. No. 4,234,926 to Wallace et al, issued Nov. 18, 1980. The Wallace system utilizes remote data acquisition units which monitor conditions of transportable containers and sends data regarding those conditions over existing on-site power wiring to a central monitoring computer. However, the Wallace system does not envision a distributed intelligence system enabling monitoring and control of equipment at remote sites and, moreover, provides only a single, separate signal transfer unit located in proximity to the central monitoring computer to assist in reducing noise-induced operating problems.

The following list of prior issued patents (which is by no means exhaustive) describe various aspects of power line communication systems:

| Pat. No. | Issued | Inventor(s) |
| --- | --- | --- |
| 4,311,964 | Jan. 19, 1982 | Boykin |
| 4,328,590 | May 4, 1982 | Lee |
| 4,885,564 | Dec. 5, 1989 | Vercellotti et al |
| 4,885,563 | Dec. 5, 1989 | Johnson et al |
| 4,815,106 | Mar. 21, 1989 | Propp et al |
| 4,715,045 | Dec. 22, 1987 | Lewis et al |
| 4,675,648 | Jun. 23, 1987 | Roth et al. |
| 4,644,547 | Feb. 17, 1987 | Vercellotti et al |
| 4,580,276 | Apr. 1, 1986 | Andruzzi, Jr. |
| 4,567,557 | Jan. 28, 1986 | Burns |

In accordance with a preferred embodiment of the present invention, the LAN consists of numerous communications nodes positioned at physically separate locations. Each node in the LAN consists of an intelligent Terminal Unit or a Data & Control Unit that utilizes the local AC power lines as the common bus over which it bidirectionally communicates with other communications units at other nodes. By using PLC communication techniques, there is no need to run dedicated cabling between LAN nodes. Moreover, PLC communication is more "survivable" during a conflagration or other destruction than dedicated cabling or fiber optic communication systems.

The PLC local area network distributed intelligence communications system disclosed herein, overcomes many of the disadvantages of the prior art identified above. In accordance with a preferred exemplary embodiment of the present invention, each Terminal Unit of the PLCC LAN is provided with an intelligent controller (hereinafter referred to as a "distributed artificial intelligence embedded controller" or DAIEC) that communicates with any other Terminal Unit or node in the network and provides an interactive operator interface through a touch-screen CRT display device. Moreover, the DAIEC in each Terminal unit includes a local non-volatile random access memory and maintains a data base of ship casualty and damage control information (referred to herein as the ship engineering casualty and damage control data matrix or SECDCDM). In addition, each communication node in the LAN utilizes an improved carrier-current transmitter and receiver circuitry that significantly increases the overall speed, noise immunity and reliability of PLC communications on the LAN. (For example, transmission rates greater than 55 Kbytes/sec and undetected error rates of less than $10^{-11}$).

An exemplary embodiment of the present invention is described herein as an "engineering casualty and damage control" management system and is intended for installation and use within, for example, a U.S. Navy ship or Coast Guard cutter. In general, engineering casualty control is concerned with the prevention, minimization and correction of the effects of operational and battle damage to the machinery, electrical systems and piping installations. Whereas, "Damage control" is concerned with such things as the preservation of stability and watertight integrity, the control of fires, and the control of nuclear, biological, and chemical contamination. An example of "battle damage" is the physical damage resulting from a bomb or a missile hitting the ship. Some examples of "operational damage" are damages resulting from fire, collision, grounding (i.e., running aground), weather or equipment explosion.

In a catastrophe, it is critical that an automated system operate reliably and quickly. For example, lives can be saved by quickly preventing occupied areas of the ship from filling with smoke or water. Further damage can be averted by knowing and managing the fire or flooding so that the ship may continue fighting. In addition, the archiving of shipboard data for later study and training can be of great importance in improving the management of future catastrophes.

The PLCC arrangement in accordance with the present invention provides a particularly advantageous technique for implementing a shipboard damage control management system. Power cables in all US fighting ships have fused main and alternate feeds. Additionally, if one line of a three phase power line shorts to the deck, the power and signals on the power line will not be lost. (As an example, after the massive combat fires in the USS STARK and HMS SHEFFIELD, each ship's power distribution system was still functional.) Additionally, such shipboard power cables are extremely large and strong. Thus, even in the midst of an anti-ship missile-caused fire, a ship power line cable is far more likely to remain intact than other cable. Fiber optic cables are extremely fragile when compared to power cables. Fiber optic cables are not readily repairable at sea whereas ship's company has experience in the quick repairing of power cables.

More of USS STARK's company died due to smoke inhalation than died as a direct result of the two missile hits. These people were trapped in a smoke infested area of the ship. They had no means to communicate with other parts of the ship, and no one knew where they were. If a PLC LAN terminal unit in accordance with the present invention had been available, they could have communicated over the power lines and been saved. In accordance with a preferred exemplary embodiment of the present invention, a data matrix stored at each terminal unit will contain updated data from sensors located throughout the ship and provide a means to identify any trapped members of a ship's company.

The initial shock of the missile hits in USS STARK caused a disruption of the ship's primary electrical power. The result was that STARK was unable to either defend herself or conduct effective damage control. There were two causes for the loss of power. First, shock sensitive circuit breakers opened on missile impact. Second the impacting missile broke a primary power line. Lack of information about the open breakers and the broken power line prevented the establishment of a power system reconfiguration plan. Since the shipboard breakers and switches were not able to be controlled remotely, primary power was never reestablished. Without electrical power in an all electric ship, effective efforts to fight the fire were not possible. Analysis conducted after the fire showed that with the proper information concerning the power distribution system, the power could have been restored.

Review of data from ship fires shows that smoke will propagate through a ship in about 4 minutes. The preferred embodiment of the present invention provides a method and means for obtaining the establishment of smoke-tight, fire-tight boundaries within 24 seconds from the start of the fire. (This is only 10 percent of the time it would take for a ship to be completely filled with smoke). As such, complete restoration of electric power must be accomplished in less than 5 seconds to assure that smoke-tight, fire-tight boundaries can be set within 24 seconds.

Another damage control asset to be considered is fire fighting water. In a fire on the USS STARK, the destruction of the main fire fighting water line rendered the ship unable to develop adequate fire main pressure. (A nearby tug prevented the loss of the USS STARK). In accordance with the preferred embodiment of the present invention, after accumulating and storing data from sensors throughout the fire fighting water subsystem, the fire water main layout can be manually or automatically reconfigured to accommodate the reduced capacity caused by a broken fire fighting water main.

Moreover, there are various pieces of ship equipment that must be available when a conflagration is imminent or when the ship is performing a particular operation. Conventionally, most major pieces of ship's equipment have safeguards built into them which prevent damage caused by overload. One example is the gas turbine that drives the electrical generators for the ship. Sensors and controls are provided to prevent turbine overload. If, for example, the turbine was operated for longer than ten seconds at an output capacity that is greater than 105 percent of its rated capacity, it would ordinarily be automatically shut down. Operation at 105% of capacity would not destroy the turbine. It would, however, reduce the life of the turbine perhaps 100 hours per hour that the turbine operates at 105%. As load increases above 105% the reduction in life of the turbine will be accelerated. At 115 percent of rated load the turbine may have its life reduced by 500 hours for each overload hour.

On a military vessel, a missile system is required for effective offensive actions and for the defense of the ship. Conventionally, as a part of the missile guidance system, the ship provides a microwave signal to the missile while in flight. This microwave energy is called the "Rear Reference" signal. Safety considerations require that the missile must be able to destroy itself if it malfunctions. This safety consideration is known as "Self Destruct". The procedure for Self Destruct is that whenever the Rear Reference signal is absent or removed, the missile warhead automatically detonates.

The following exemplary scenario illustrates the interrelationship between a few of the diverse ship systems that the inventors have recognized must be organized and controlled during a typical conflagration: assume the notional ship discussed above is operating on only one turbine of its three turbines and that particular turbine is running at 98 percent of capacity. The ship comes under attack by two inbound exocet missiles and has launched four missiles in its defense. The main mess compressor or some piece of ancillary equipment subsequently turns on. The compressor current causes the sole gas turbine to go to 105 percent of capacity. The turbine overload control shuts down the turbine. The ship is now without power. The rear reference signal stops because of loss of power to the microwave transmitter. Loss of the rear reference signal from the ship causes the missiles to self destruct. The powerless ship is now also defenseless. The exocet missiles hit the ship for two reasons: first, the ship had no coordinated way to remove overload protection from the turbine; second, the ship had no coordinated way to remove non-essential loads.

This type of removal of protection is called "battle shorting". For example, opening a radar transmitter's cabinet door will shut down the transmitter due to sensing switches in the doors. Battle shorting removes these safeguards. The designer of the transmitter understood that the safety of the entire ship must come before the safety of the person opening the door. Currently, however, there is no central control or monitoring of these features in a conventional Navy ship. Moreover, in the engineering plant of a conventional US Navy ship there is currently no battle shorting of major pieces of equipment. In a situation where the battle shorting of a major piece of equipment such as the ship turbine becomes necessary, there are certain procedures that should be followed. For example, if the turbine is going to be battle shorted, the percentage of overload should be monitored by someone of appropriate authority in the engineering chain of command. (Ultimately, it may be the responsibility of the commanding officer of the ship to decide if he should risk destroying the turbine rather than shutting it down). Moreover, the shutting off of other nonessential loads (e.g., the mess compressor) would also reduce the likelihood of a turbine overload. This technique is called "load shedding". Decisions regarding the timely load shedding of various pieces of equipment should also be made by one having the appropriate authority. Accordingly, a preferred exemplary embodiment of the present invention makes battle shorting and load shedding of major pieces of ship equipment feasible by providing centralized monitoring and control facilities at strategic locations throughout the ship.

In accordance with an exemplary preferred embodiment of the present invention, a list of non-essential equipments is arranged in a data base (i.e., the SECDCDM) stored in non-volatile memory in each Terminal Unit and is utilized to indicate equipment that can be removed from service. Likewise, a list of essential equipments that must remain in service, almost without regard for equipment life and ships company safety, is also stored in the data base at each terminal. One engaged in the art of military ship design would appreciate that these two lists will differ as the operational modes of the ship are changed. For example, during a storm, ship's command should be able to shut down the radar and battle short the anchor windlass rather than run aground.

The combination of the high reliability of PLC communication using the improved transceiver of the present invention along with the equipment monitoring, integrated battle shorting, load shedding and distributed intelligence data management methods disclosed herein in accordance with the preferred exemplary embodiment of the present invention, will significantly enhance the survivability of modern warships and commercial vessels.

BRIEF DESCRIPTION OF THE DRAWINGS

These and other objects and advantages of this invention will be better appreciated by reading the following detailed description of the presently preferred exemplary embodiment taken with the accompanying drawings of which:

FIG. 2 is a block diagram of exemplary terminal unit used in the local area network;

FIGS. 4A–4E depict waveform maps of modulated RF Data;

FIGS. 5A1 and 5A2 are detailed circuit diagrams of the Transmit Logic section of the Terminal Unit shown in FIG. 2 in accordance with a preferred embodiment of the present invention;

FIGS. 5B1 and 5B2, combined, are a detailed circuit diagram of a preferred embodiment in accordance with the present invention of the high voltage interface, the two-state isolated linear power amplifier, and the AC power line coupler of the transmitter circuit sections 50, 60 and 70 shown in FIG. 2;

FIGS. 7A–7G2 are a series of exemplary flat screen displays;

FIG. 9A1 and 9A2 are detailed circuit diagrams of the linear phase bandpass filter, limiter and comparator circuits of the pre-detection receiver section of the PLCC transceiver in accordance with a preferred embodiment of the present invention;

FIGS. 9B and 9B1 are detailed circuit diagrams of the phase-locked/Costas loop section of the receiver logic shown in FIG. 6A in accordance with a preferred embodiment of the present invention;

FIGS. 10A–10C are detailed circuit diagrams of the Voltage Controlled Oscillator (VCO) of the Receiver Logic loop circuit shown in FIGS. 6A and 9B1;

FIG. 12A is a high level flow chart for the DAIEC operational software;

With respect to the above drawings, the following table provides a list of symbol conventions used throughout the figures to designate a particular component part number and/or an associated function:

| SYMBOL | PART NO. | FUNCTION/DESCRIPTION |
|---|---|---|
| 34004 | 34004B | Quad Operational Amplifier |
| 34084 | MC34084P | Quad Operational Amplifier |
| AD630 | AD630AD | Balanced Modulator/Demodulator |
| C00 | CD74HC00E | Quad 2-input NAND Gates |
| C04 | SN74HC04N | Hex INVERTERS |
| C08 | CD74HC08E | Quad 2-input AND Gates |
| C30 | MC74HC30N | 8-input NAND Gate |
| C32 | SN74HC32N | Quad 2-input OR Gates |
| C74 | SN74HC74N | Dual D-type Positive-edge triggered Flip-Flops with Reset & Clear |
| C86 | CN74HC86E | Quad 2-input Exclusive OR Gates |
| C4015 | CD74HC4015E | Dual 4-Bit Serial-input/parallel-output shift registers |
| C4040 | SN74HC4040N | 12-Bit Ripple Counter |
| C4538 | MC74HC4538AN | Dual Precision Monostable Multivibrators |
| CMP-01 | CMP-01CJ | Comparator |
| CY7C245 | CY7C245-35WC | Reprogrammable 2048 × 8 Registered PROM |
| DAC-08 | DAC08HP | 8 bit, Multiplying D/A Converter |
| DG243 | DG243CJ | Monolithic CMOS Analog Switch |
| H11L1 | H11L1 | Photon Coupled Isolator |
| HA2525 | HA32525-5 | Operational Amplifier |
| HP2300 | HP2300 | Opto Coupler |
| LM319 | LM319N | Dual Comparators |
| LTC1264-7 | LTC1264-7CN | Linear phase switched capacitor filter |
| MC1496 | MC1496L | Balanced Modulator/Demodulator |
| VFC110 | VFC110BG | Voltage to Frequency Converter |
| — | | +15 |
| — | | +8 |
| — | | +5 |
| — | | HOT GROUND |
| — | | FLOATING GROUND |
| — | | −8 |
| — | | −15 |

DETAILED DESCRIPTION OF A PREFERRED EXEMPLARY EMBODIMENT

Figure 1A:
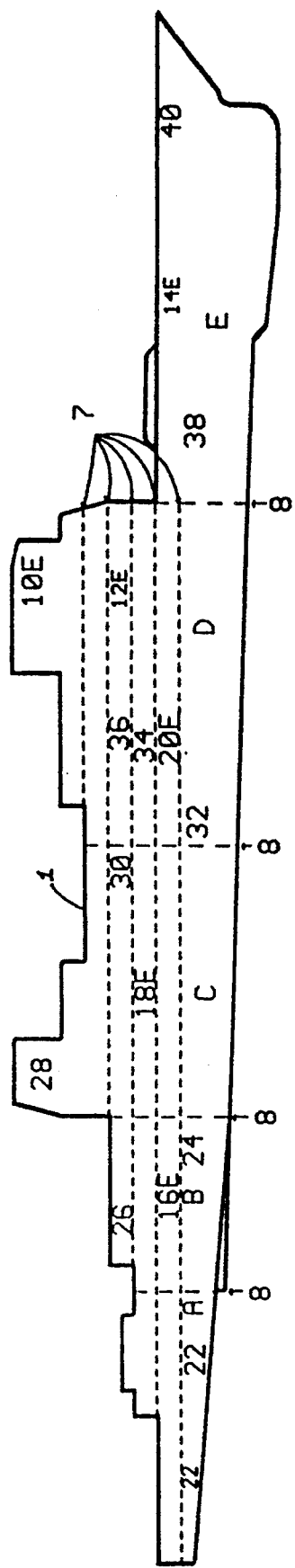
FIGS. 1A and 1B are block diagrams of an exemplary power line carrier local area network following the present invention.

Referring to FIG. 1A, an exemplary preferred configuration for an engineering casualty and damage control management system in accordance with the present invention is illustrated as comprising a local area network of numerous PLC terminal units distributed throughout a vessel or ship. The PLC terminal units are identified by letters and numbers from 10 to 100. Enhanced nodes (designated by the letter "E" following the node number) are contemplated for locations where more than one person will view a Terminal Unit display. Consequently, The terminal unit displays at these locations may be enlarged or otherwise enhanced. Some examples of preferred locations for enhanced nodes are: the ship Bridge 10E, the Combat Information Center (CIC) 12E, the Forward Repair Locker 14E, the Aft Repair Locker 16E, Damage Control Central 18E and Main Engineering 20E. The terminal unit located in CIC is designated as "Main Communication". The terminal unit at Damage Control Central is designated as "Main Damage Control". The terminal unit at the Forward Repair Locker is "Main Spare". The terminal unit at main engineering is designated as "Main Mechanical". The terminal unit in the main generator room is "Main Electrical". The horizontal dotted lines, 7, represent decks and the vertical dashed lines, 8, delineate vertical damage control zones. Since there is AC power supplied to these zones, communication is possible over the existing power lines without additional cabling. Each PLC terminal unit has a protocol for communicating and exchanging data with any of the other terminal units in the ship. Each PLC Terminal Unit can accumulate, assimilate and communicate engineering casualty and damage control data from any other unit. In order to perform and control these processes, a flat "touch screen" display I/O device and a distributed artificial intelligence embedded controller (DAIEC) are provided in each terminal unit. This controller includes a micro-computer with non-volatile memory and a resident program (the DAIEC control program) for maintaining a local database and performing user/operator interface functions related to the touch screen display.

Figure 1B:
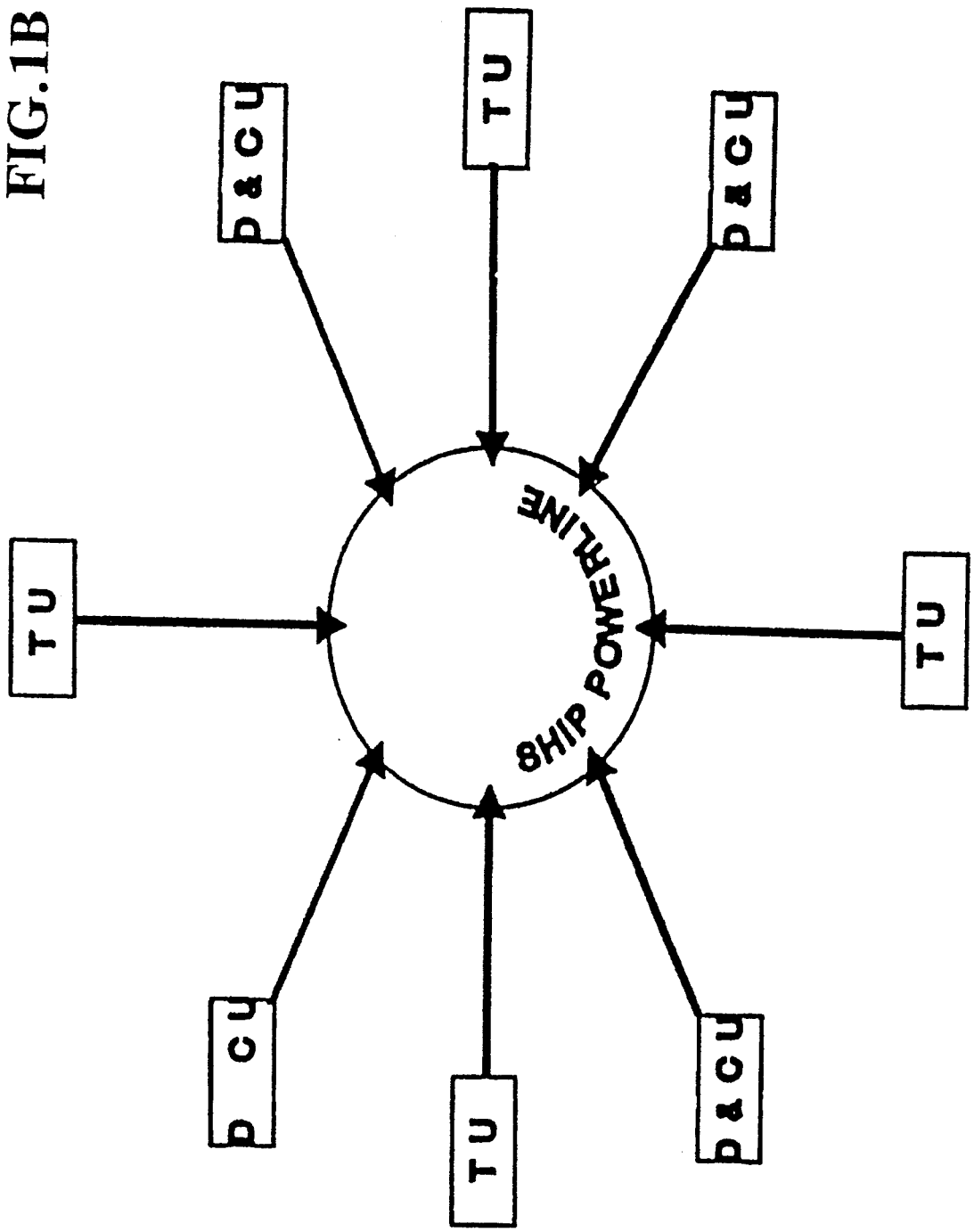

The engineering casualty and damage control management system in accordance with a preferred exemplary embodiment of the present invention also consists of Data & Control units. FIG. 1B illustrates PLC Terminal Units and Data and Control units (DCUs) as nodes connected to the ship power lines in a LAN configuration. The Data and Control units are identical to terminal units except that they have no user interface capability in that they do not contain a DAIEC or a flat touch screen. Moreover, DCUs may be self supporting or they may be housed in an enclosure for another piece of equipment. For example, a Data and Control unit might be located in a housing for a large turbine. The Data and Control unit would provide data to the system about the performance of the turbine and pass control signals to the turbine from the system. A Data and Control unit might also be located in the midst of a group of shipboard equipment which is a long way from a Terminal Unit. In this way, the use of Data and Control units will further reduce the amount of shipboard data cabling required for implementing a LAN.

Prior to LAN system operation, all units have been assigned a unique numeric address and identity such as Main Communication Terminal Unit or Turbine Data and Control unit. The DAIEC in each terminal unit (TU) holds this unique address in a local non-volatile memory (e.g., EEPROM). In the Data & Control units, a resident controlling program (e.g., a scaled down version of the DAIEC control program) reads a local hard-wired binary coded switch setting upon boot-up to determine its address.

Figure 11:
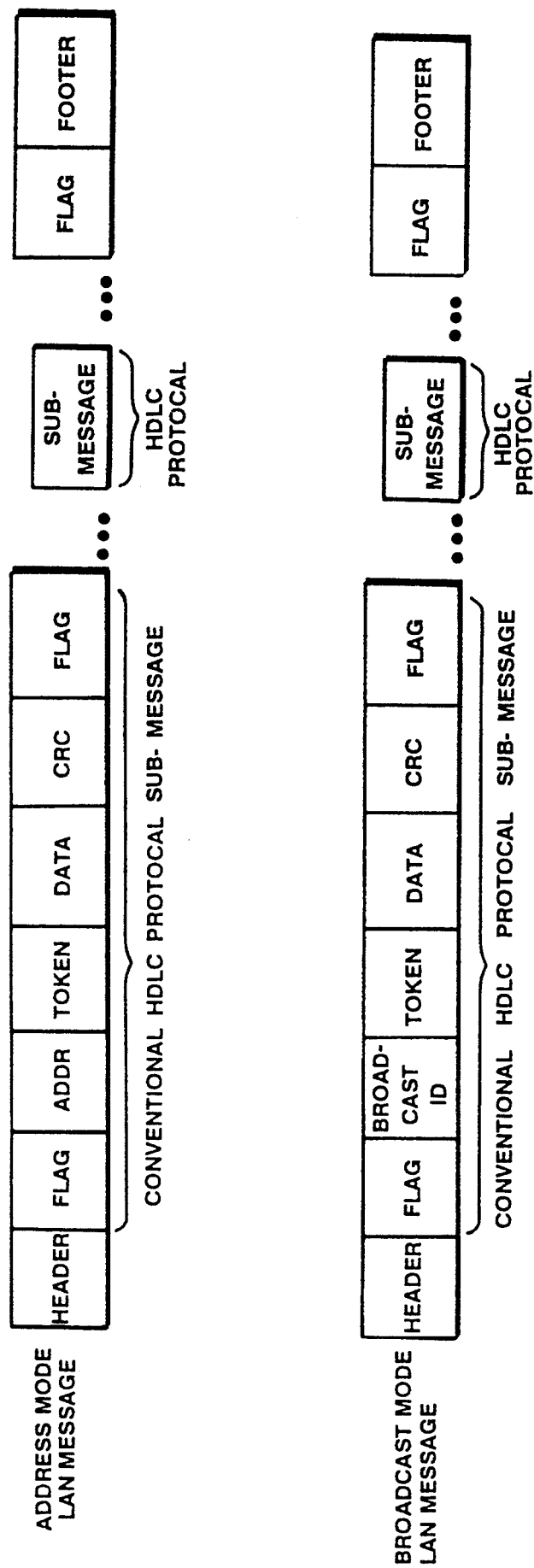
FIG. 11 is a block representation of the protocol for a serial message between terminal units on the local area network of FIG. 1B.

All units in the LAN communicate with one another via offset-quadrature-phase-shift keyed signals (OQPSK) constituting LAN system messages which may consist of one or more "sub-messages" of a chosen protocol. In the preferred embodiment of the present invention, HDLC protocol is utilized, however, other protocols may also be utilized. The engineering casualty and damage control management system, in accordance with a preferred embodiment of the present invention, provides two different ways for the transmitter to identify the destination of the message. More specifically, the system may operate in either a "broadcast mode" or in an an "address mode". In a "broadcast" mode one unit sends message data to all other units. These broadcast messages also contain the address of the next Terminal Unit or Data and Control unit permitted to send a message. This next transmit enable address is called a "token". In the "address" mode, each LAN message comprises at least one sub-message containing a destination address for the transmitted data and the token. For example, in an address-mode LAN message there may be a sub-message containing the address of the Main Communication Terminal Unit followed by data and a token for Main Communication, and this sub-message may be followed by another sub-message containing the address of Main Damage Control followed by data for Main Damage Control. In addition, all OQPSK LAN system messages are preceded by a "header" and terminated with a "footer", as discussed in greater detail below. An illustration of an exemplary address mode and broadcast mode message format in accordance with the present invention is depicted in FIG. 11.

In both modes the address of the sender is a part of the message as well as any acknowledgements required by the particular communications protocol used (e.g., HDLC). For example, a terminal unit addressed as "123", acknowledges that since it's last transmission it has received messages from terminal units addressed as "100", "115" and "130". This acknowledgement allows terminal units addressed as "100", "115" and "130" to drop their last messages to the terminal unit addressed as "123".

In the broadcast mode each terminal unit listens and determines from the addresses of all the terminal units on line, the address of the present transmitter and the address of the next transmitter. In the address mode a terminal unit is blind to all message traffic except its own. A resident non-volatile memory in each terminal unit contains the addresses of all terminal units which are installed.

Engineering casualty and damage control data is the lifeblood of effective engineering casualty and damage control. Sensors to accumulate engineering casualty and damage control data are placed throughout the ship and information provided by them form a ships engineering casualty and damage control data matrix (SECDCDM). This SECDCDM contains measured parameters, the proper values of the parameters for each operational configuration of the ship, the location of each sensor within the ship, the terminal or data and control unit number and data port associated with that particular data. This engineering casualty and damage control data can be quite comprehensive, as exemplified by the explanation of various ship systems in the following paragraphs.

For example, the nominal and range of proper operational values for a ship's 440 VAC current and voltage, both 60 and 400 hertz, as well as casualty power availability are a part of the SECDCDM. To further aid casualty reconfiguration of the ship's electric plant, the SECDCDM also includes data for numerous switch and circuit breaker settings.

Temperature and smoke data are used to determine the type and location of fire as well as the effects of smoke from the fire. The proper speed and direction of the ship's fans for various configurations is also in the SECDCDM. This information is also used to determine the best way to fight the fire and smoke.

The fire main water pressure and flow is used to determine the condition of the fire main sub-system. This data is also an aid in any casualty reconfiguration of the ship's fire mains. In addition, this data is used to determine the amount of water brought on board to fight fire which is also important in determining the water's effect on ship stability. For example, a one square foot hole fifteen feet below the waterline will allow about 48 tons of water per minute into a modern combatant. Thus, knowledge about below waterline levels of water is imperative to ship survivability and must be in the SECDCDM.

There are a number of engineering plant systems that, like the electric power plant, are used to support other parts of the ship and combat systems. The normal range and actual operational values of parameters for these systems are stored in the SECDCDM. For example, in modern fighting ships demineralized and chilled water is used to cool equipment. The ship's damage control data matrix holds data on the cooling water system. Similarly, modern radars require dry air for pressurizing the waveguide. The degree that the dry air system has or will continue to maintain pressurized dry air can also be ascertained with the SECDCDM.

In an exemplary preferred embodiment of the present invention, the damage control configuration of the ship designated by the letters x, y, z and w, is also in the SECDCDM. The damage control configuration portion of the SECDCDM is a list of "fittings" which are controlled. Table One, shown below, is an example of part of the damage control configuration portion of the SECDCDM.

TABLE One

| FITTING LOCATION | Normal Conf. | | | | Fire Conf. | Flood | Change | Term # | Data # | LOC |
|---|---|---|---|---|---|---|---|---|---|---|
| | x | y | z | w | | | | | | |
| fitting 123 | o | c | c | x | c | c | OOD | 12 | 6 | 3-75-4-M |

Referring now to Table One, "Normal Conf." stands for the normal configuration of the particular fitting "123". The letter "o" indicates an open condition and the letter "c" indicates a closed condition for the particular fitting number. As indicated in Table One, fitting 123 is to be closed during fire and flooding. If this configuration is to be changed, it can only be done with the authority of the Officer Of the Deck (OOD). The sensing of the opening of fitting 123 is done at terminal unit "12" through data port number 6. The location of fitting 123 is on the third deck, at frame 75 on the port side in a machinery space. The letters "x" "y" "z" and "w" designate various classifications of settings for fittings, defined as follows:

Classification X (X-RAY) is assigned to fittings which should be closed at all times except when actually in use. This classification is set only in well protected harbors.

Classification Y (YOKE) is assigned to fittings for which ZEBRA classification also exists. These fittings are closed during condition YOKE, thus reducing the number of fittings to be closed when condition ZEBRA is set. When condition YOKE is set, YOKE and X-RAY fittings are closed. This condition is set and maintained at sea and in port during wartime.

Classification Z (ZEBRA) is assigned to fittings normally required to be open for operation of the ship, habitability and access to battle stations. Zebra fittings must be closed during battle or emergencies. When condition ZEBRA is set fittings classified X-RAY, YOKE, and ZEBRA are closed. This classification provides the maximum protection in battle.

Classification W (WILLIAM) is assigned to fittings which normally remain open during all conditions of readiness. With these sensors any deviation from the set configuration will immediately be known. These configurations are used to control the propagation of all types of foreign agents in the ship from gas to water.

Today ships have hundreds of safeguards. Some for human safety which, for example, turn off a radar transmitter if a person opens a cabinet door. Some prevent overload of equipment. Removal of these safeguards is called "battle shorting". In some cases the only data that the SECDCDM must contain is information that indicates that a particular piece of equipment must be battle shorted in a certain damage control configuration. In other cases, when equipment is battle shorted, the data matrix must contain and display a variable parameter value for the overloaded equipment. Table Two, as shown below, is an example of the type of a battle shorting information stored as a portion of the SECDCDM.

TABLE Two

| Equipment | config. | | | | see | where | Auth | Term # | Port # | location | Auto |
| --- | --- | --- | --- | --- | --- | --- | --- | --- | --- | --- | --- |
| | x | y | z | w | | | | | | | |
| Spy-1 | n | y | y | n | n | | | 12 | 2 | 03-150-2-C | y |
| turbine | n | y | y | n | .95 | 14 | OOD | 14 | 1 | 3-300-0-E | n |

In this example, an "n" in the "see" column of TABLE TWO indicates that the particular piece of equipment is in a battle shorted configuration. Moreover, the battle shorting parameter data for that particular piece of equipment (e.g., SPY-1) will not be displayed by the system. Furthermore, whenever there is a "y" in one of the configuration columns, this indicates that the particular piece of equipment will automatically be battle shorted. For example, referring to TABLE Two, the authority for placing the turbine in a battle short condition occurs when the turbine gets to 95% of capacity (indicated by "0.95" in the "see" column). Authority is granted by the OOD, as indicated in the "Auth" column. when the turbine is battle shorted, the percentage of capacity of the turbine is displayed on terminal unit number 14.

A ship goes nowhere without fuel. Thus, the values of fuel rates, location and amounts of the different types of fuel are also stored in the SECDCDM.

In a large emergency, such as a collision at sea or a mine explosion or a missile hit, response time to the emergency is paramount. For that reason, in a preferred embodiment of the present invention, all terminal units (TUs) have shock sensors inside their enclosures. Further, there are shock sensors bried in the keel. This data is fed to terminal units and is also stored as part of the SECDCDM. In this way, any particular terminal unit can alert all TUs in the system that a certain section of the ship has experienced severe shock.

In a non automated ship, the system, in accordance with the present invention, will still work well, albeit slower. For example, in that type of environment, operation is performed manually with operators at each terminal unit inputting emergency data at the flat touch screen to the associated local DAIEC. Terminal operators then receive commands on their PLC terminal unit flat screens, allowing them to operate, monitor and control equipment from a safe distance.

Once all emergency data has been assimilated, the PLC terminal units output both automatic and manual commands. Similar automatic commands are sent to the Data and Control units. A discussion of some exemplary manual and automatic commands follows, along with reasons why such commands are needed.

In a preferred exemplary embodiment of the present invention, there are commands to change the position of a primary power switch or reset a circuit breaker. The integrity of the electrical distribution system is of particular significance because most of our modern ships are completely electrical. For example, one set of commands sent over the ship power lines are commands that enable restoration of the electrical power distribution integrity of the ship. The SECDCDM can be configured to include as much power distribution data as the ship designer requires. Casualty Reconfiguration of power distribution is then done by analysis of the sensor data in the SECDCDM. This analysis is performed by a DAIEC with the appropriate configuration commands sent to RS-232-C ports via other TUs or Data and Control units. In some instances, a particular ship subsystem or location may not have the capability to perform an operation automatically. In those cases, the system sends a visual command to an operator at the appropriate TU. These visual instructions notify the operator to open, close or reset a particular switch. The particular TU operator can then personally close circuit breakers, turn on equipment and perform other control functions. Such actions enable restoration of the electrical power distribution system to the highest state of readiness that is possible given the conditions that might exist during an emergency situation.

In an exemplary preferred embodiment of the present invention, the process for establishment of smoke-tight fire-tight boundaries is similar to the restoration and reconfiguration of electrical power distribution discussed above. First, a "close ship" command is announced and the ship is taken to a known configuration. In this case, all air circulation is stopped while the system determines how the ship should be reconfigured. Nominally, "close ship" orders should take about two seconds. At the same time, the DAIEC control program overlays smoke and temperature data on a terminal unit display of the locations of fans and water-tight hatches that will be used to control the fire. Second, the program determines the optimum fire fighting condition of these assets. Third, the program reviews the conditions of the damage control assets and decides which conditions need to be changed. (For example, a hatch which was inadvertently left open may need to be closed.) Finally, manual or automatic controls are sent to the proper terminal units, their ports and their flat screens to accomplish the correct changes in asset configurations. Similar automatic controls are also sent to the appropriate Data and Control units.

In a preferred embodiment of the present invention, battle shorting and load shedding list changes can be accomplished as the ship is changing from one operational configuration to another. For example, when changing from an Underway Replenishment configuration to a General Quarters configuration the following three guidelines are used to minimize the effect of battle shorting and load shedding: first, load shedding will only be done on an "as needed" basis; second, the load shedding list will change with the operational mode of the ship and a load shedding history (e.g., if the mess compressor has been shed for a long time perhaps the water demineralizer will be shed); and third, all critical battle shorted parameters will be monitored by the system and displayed for ships company.

The location of the TUs and the Data and Control units in the hull can also have a significant effect on the total system survivability. For example, for bomb or missile attacks, it may be desirable to position the units near or below the waterline, however, a below waterline location is not necessarily ideal in the case of attacks by torpedoes or mines which can cause hull penetrations. Likewise, terminal units are more preferably located safely outside the engine room and mess deck. This aids fire fighting in those areas of the ship where accidental fires are the most likely. For these reasons the engineering casualty and damage control management system in accordance with a preferred embodiment of the present invention is implemented using distributed processing. In addition, three widely separated terminal units run identical calculations for each of the major functions of the ship PLCC LAN system. Thus, loss of significant portions of the engineering casualty and damage control management system in accordance with the present invention will not incapacitate the system, but may merely reduce its response time, overall capability or reduce the amount of data in the SECDCDM. Also, during normal operation of the system the units are in the broadcast mode. Thus, each unit continually provides its data to all other units.

Referring again to FIG. 1A, four vertical damage control boundaries delineated by dashed lines, 8, divide ship, 1 into five damage control zones (A-E). To enhance survivability of the system under adverse conditions, one "primary" LAN Terminal Unit node is located in each of these zones amid ships, below the waterline. In addition, two above water "secondary" LAN Terminal Unit nodes exist for each underwater node below the ship waterline. Each "secondary" unit acts as a backup for its corresponding primary unit. One above water node is on the port side of the ship and one on the starboard side of the ship. Neither secondary Terminal Unit node is on the same level of the ship nor within three zones (delineated by deck lines, 7, and vertical lines 8) from the other identical node. Accordingly, there is one "primary" terminal unit and two "secondary" terminal units for each one fifth of the ship for a total of 15 terminal units.

In addition, any terminal unit (TU) in the engineering casualty and damage control management system LAN can be designated or reconfigured as a "primary" terminal unit. To further enhance survivability, all TUs and Data and Control units (DCUs) are located near shipboard primary 440 VAC power lines. Uninterruptible power is provided to the TUs and DCUs either from a shipboard source or from local batteries.

TERMINAL UNIT USER/OPERATOR INTERFACES

In a preferred embodiment of the present invention, there are at least five damage control zones and five corresponding primary Terminal Units (TUs) each having different types of damage control responsibilities and each providing a man-machine operator interface. The five primary terminal unit types are designated according to responsibility and function as: Main Electrical Control, Main Mechanical Control, Main Damage Control, Main Communication and Main Spare. A flat touch screen 124, illustrated in FIG. 2, is used as the I/O device through which an operator interface for a Terminal Unit is provided. This user/operator interfacing is accomplished through the provision of particular DAIEC flat touch screen displays as depicted in FIGS. 7E-7G2. A flowchart for the DAIEC control program is shown in FIG. 12A.

Figure 12B:
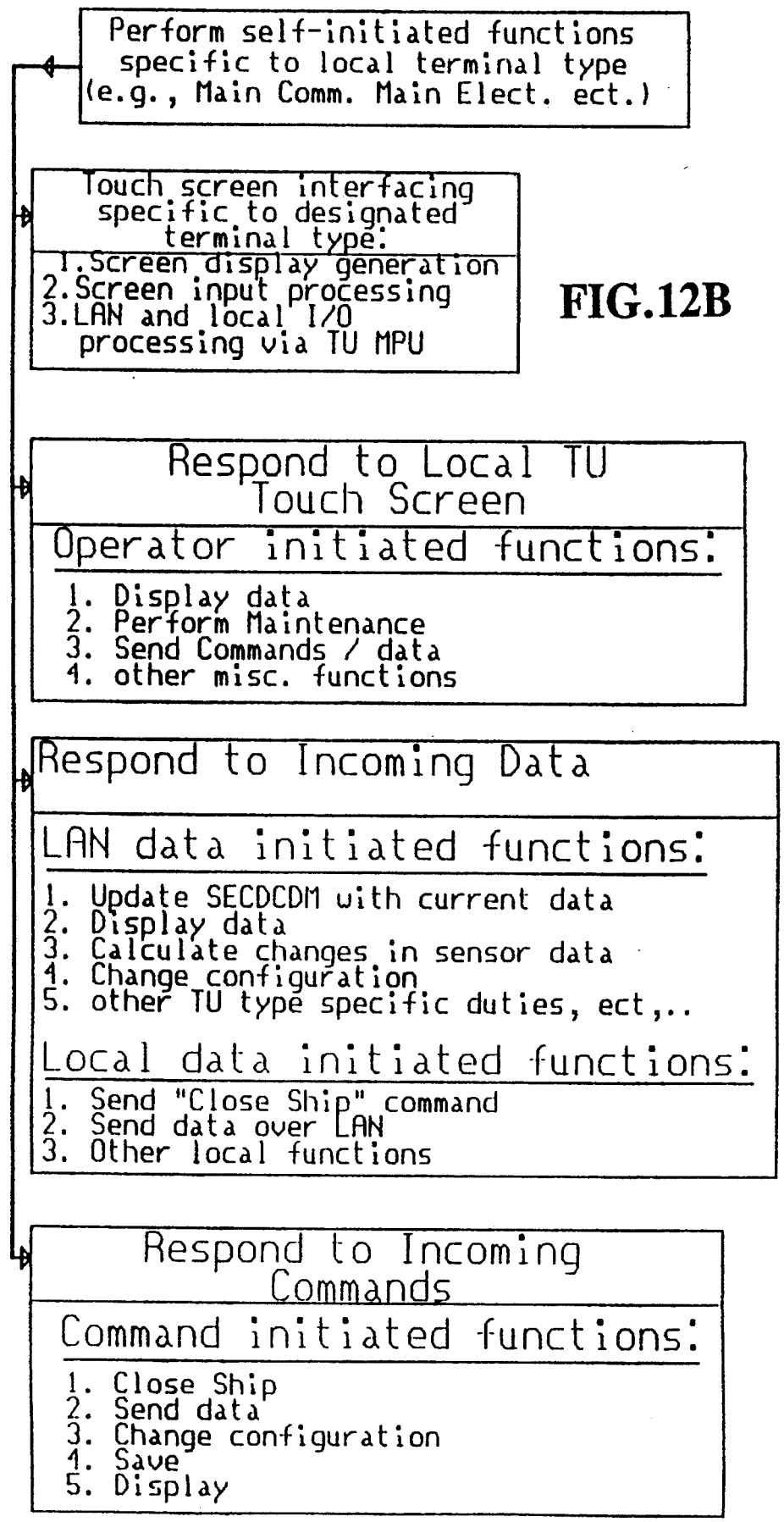
FIG. 12B is a more detailed flow chart of the common functional routines in each of the five main Terminal Unit type Control and I/O Processing functional blocks illustrated in FIG. 12A.

A more detailed flowchart generally illustrating an exemplary primary Terminal Unit control and I/O processing routine is depicted in FIG. 12B. In lieu of individual flowcharts, specific program design function flow descriptions for each of the five Terminal Unit types, are set forth at the end of the five respective descriptive sections detailed below. These program function flow descriptions are a form of program design language and are somewhat analogous to flow charts in that they may be used by a programmer of ordinary skill in conjunction with the exemplary user interface display screens depicted in FIGS. 7E-7G2 to develop working programs in a desired computer language for controlling the function and operation of each Terminal Unit and Data and Control unit in a PLCC LAN in accordance with a preferred embodiment of the present invention. Flowcharts and state diagrams would not accurately and succinctly represent the distributed processing arrangement of the present invention because each terminal unit assumes a different type of primary functional role (e.g., Main Mechanical, Main Electrical, etc.) and yet retains all the program procedures necessary to assume the primary functional roles of any other terminal in the LAN.

PRIMARY/SECONDARY TERMINAL UNIT CONFIGURATIONS

Figure 7D:
Figure 7E:

All terminal units are configured to operate as one of either two basic functional types: a "primary" unit or a "secondary" unit. A Terminal Unit can be configured to function and operate as any one of the five "primary" units such as Main Electrical, Main Mechanical, etc. Moreover, terminal units can also be configured to operate in a backup capacity for any one of the five primary terminal unit types. These units which are designated to operate in a backup capacity for primary terminal units are called "secondary" terminal units. A terminal unit when acting as a secondary terminal unit has two levels of operation which operate in concert: The terminal simultaneously operates as an input/output device at a "foreground" level and as a operational and computational backup for an associated type of primary terminal unit at a "background" level. A brief description of the operator interface for a secondary terminal unit is as follows:

At the foreground level, the primary (first) touch screen provided is the screen display depicted in FIG. 7G1. This screen, as is true for all foreground level screens, allows for display of data but not for entering commands other than screen control commands. Accordingly, touch screen input regions for the "close ship" and "save" commands are not displayed. The top part of the display above the solid bar is used for displaying the input and output of data from the terminal unit. (For example, the current "operational" and "emergency" modes selected for the notional ship are displayed as "General Quarters" and "Missile Hit"). Since secondary terminal units in their foreground level are able to acquire any data available from the screen of any primary terminal unit, the area below the wide bar is to be used to display data from primary terminal units. For example, if Main Mechanical is selected in the screen display of FIG. 7G1, then the screen display for Main Mechanical (FIG. 7D) appears. This is possible since each terminal unit has all current system data and operational programs available via the SECDCDM stored in local non-volatile memory.

Referring now to the "MAKE" commands depicted in FIG. 7G1, these commands are used to convert a secondary terminal unit to a primary terminal unit. At the same time, this process converts the present primary terminal to a secondary terminal unit or removes the present primary terminal unit's identification from the hardware inventory. When any one of the "MAKE" commands is selected, the screen depicted in FIG. 7G2 appears. It functions as a touch screen keyboard. As a security precaution, the operator must know how to operate the keyboard as well as know a specific password sequence to be able to change the Damage Control and Engineering Management System configuration. An exemplary procedure is to require the operator to enter his or her name and then the appropriate password. The DAIEC will respond with questions about the new configuration.

However, this is only one of two ways that the system configuration can be changed. If desired, the DAIEC can also be programmed to recommend that the configuration be changed with approval of the OOD (Office of the Deck). A discussion of this process is as follows:

At each terminal unit the DAIEC stores, in its own associated local non-volatile memory, information regarding the sequential predetermined order for token passing and the assigned primary or secondary roles for all terminal units on the LAN. Additionally, all terminal units are also capable of functioning as a "Main Spare" unit (discussed in detail further below). Therefore, before an emergency starts to unfold, all DAIECs must have stored, in their own local non-volatile memory, all data received from all other terminal units. Accordingly, as a part of each "broadcast" message there is an acknowledgement for each message that has been received since that terminal unit last had the token. To save time each terminal unit declares which station it has not heard from since the last token. Thus, the DAIEC in each secondary terminal unit determines when its associated primary terminal is not responding. For a given LAN configuration, minimal experimentation will determine the proper ratio between the total number of terminals in the LAN and the number of terminals not hearing from a particular primary station. When a secondary terminal determines from this ratio that its associated primary station is in trouble (e.g., not responding due to a malfunction), the secondary terminal takes over the functions of that primary terminal when it next receives the token.

The first action is to request authority from Main Communication (more detail below) for authority to change configuration from a secondary unit to a primary unit. Second, without authority the secondary unit provides all terminal units with any data which the primary terminal unit should have sent in the last message. The secondary terminal unit can do this because its DAIEC also runs redundant or back-up calculations for its associated primary terminal unit and receives any configurational information to be able to make this change in configuration. When main communication receives the request to change the configuration the OOD must assemble the necessary personnel at the new location. In the meantime the secondary unit is providing the system with any data necessary to keep the system running. When new personnel arrive at the new location they can use the password scheme discussed above to make the configuration change. Main Communication can also make a configuration change from its terminal unit mode because Main Communication has the responsibility to remove a failed primary unit from the communication path and announce its loss. Whereas, for example, Main Damage Control only has the responsibility to determine whether or not a repair is in order but cannot order a configuration change.

A program design function flow description for a Secondary Terminal unit is set forth below:

---

Secondary Terminal Unit Program Function Flow:

Incoming Data Initiated Functions:

Store/update all current SECDCD in local
non-volatile memory. Of interest is data required
to perform default role

Emulate default primary unit:

Check default unit output data against data
and calculations performed by secondary
terminal unit
Report differences
Determine if default unit goes off line and
request permission to reconfigure
Change configuration from secondary terminal
unit to primary terminal unit

Incoming Commands Initiated Functions:

Close ship
Reset local
Set local close ship configuration
Send Data
local by port & extreme differences only
all local by port
all local by port and card
all local
battle shorted overload
Change
port configuration
Save
Local Data
Display
Manual command & control

Terminal Unit Operator Initiated Functions:

Request permission to change designation to
another unit by password
Display Primary Unit Data

Incoming Local Data Initiated Functions:

Send close ship command
Send local Reconfiguration by port & card

Self initiated Functions:

Upon Boot-up:
Perform self diagnostic & display anomalies
without operator request
Read local non-volatile memory and determine
that this unit is configured as a Secondary terminal
unit with a particular Second default configuration
such as Main Electrical, Mechanical, etc.

MAIN ELECTRICAL CONTROL

Main Electrical Control performs the function of command and control of the electric generation and distribution system (i.e., control of the ship's electric plant). The goal of Main Electrical is to return an electrical distribution system to the highest state of readiness possible during and after the emergency. Each major piece of electrical plant equipment contains a Data and Control unit (DCU). Each DCU receives and processes control signals from an associated primary Terminal Unit.

In the preferred embodiment, the DCUs provide electrical node data to the Main Electrical control primary terminal unit. Main Electrical control is preferably located near ship's main 60 hertz generators, which are conventionally driven by gas turbines. There are three reasons for the selecting the generator room as the location for Main Electrical control. First, this location is the source of electrical power in the ship. Second, being where source of electrical power, it is the casualty reconfiguration analysis begins. Third, the most experienced electrical distribution technicians in the ship are conventionally stationed in the generator room to view the operation of the generating capacity as the conflagration unfolds. In any event, the damage control management system can reassign the location of Main Electrical control if that area needs to be abandoned during the conflagration.

Operator/user interface for Main Electrical control is accomplished through a series of DAIEC flat touch screen displays as depicted in FIGS. 7E through 7E10 (discussed below). An explanation of the main functions of Main Electrical is first provided as follows:

First, Main Electrical control performs normal and casualty reconfiguration of ship's power distribution to provide the most stable voltage to all users of the distributed voltage. One example of normal reconfiguration is the distribution changes associated with the start up of a high current load.

One example of casualty reconfiguration is the switching of certain equipment from main to auxiliary power feed because of a broken main power feed cable. This is done by collecting data from all system PLCC units about the performance of the 60 and 400 hertz generating and distribution network. This includes the parameters of the gas turbines, the 60 and 400 hertz generators and significant currents and voltages in the distribution system. This data is used to decide the best configuration of the system in its present state. Once the Main Electrical Control DAIEC decides this configuration, commands are sent to the proper Terminal Units and Data & Control units to perform this configuration change.

Second, Main electrical control performs battle shorting and load shedding to maintain electrical power. This second function is intended to prevent the generator, missile and mess compressor scenario problem discussed earlier. Authority from Main Damage control is required for certain specific load shedding or battle shorting orders such as battle shorting the gas turbine. Main Damage Control personnel approval is not required in less critical requests, such as a request for radar transmitter battle short. The Main Electrical Control software within the DAIEC contains two lists for each operational configuration of the ship. Both of these lists contain unit, port and card location of the variable of interest. These variables are, for example, battle short command signal, load shedding command signal or location of measured battle shorted variable.

The first list is the Battle Shorting list. This list contains battle shorting orders and monitored parameters for those equipments that are imperative for conduct of a particular operation of the ship. This monitored parameter is used to determine when it is necessary to go in or out of battle short. The monitored parameter, turbine inlet temperature in the case of the gas turbine, is also monitored to decide when to load shed. Finally, the first list contains the identity of the terminal unit displaying the monitored parameter and who has the authority to approve that particular battle short (as shown in Table Two above).

For example, if all three gas turbines are running at 55% of capacity and the ship is at general quarters the turbines do not need to be battle shorted. The ship could loose one turbine and the remaining two turbines would still be at 82.5% of their respective capacities. Main Damage Control will display the percent of capacity of the gas turbines only when in battle short. This percentage of turbine capacity will also be displayed on the flat touch screen of the Main Communication terminal unit located in the combat information center, since the engineering casualty and damage control management LAN system receives its operation modes from Main communication.

The second list is the Load Shedding list. It contains a separate prioritized list of equipments to remove from service for each of the operational modes of the ship. Any load shedding candidate which requires command approval is identified. Examples of this list are shown in Table three below.

TABLE Three

| Collision equipment | ship | Configuration | | | | Term # | Port # | Location |
|---|---|---|---|---|---|---|---|---|
| | x | y | z | w | auth | | | |
| Equipment 123 | 12 | 22 | 1 | 6 | n | 16 | 4 | 3-130-1-M |
| Equipment 89 | 2 | 16 | 2 | n | n | 3 | 25 | 1-360-4-M |

Main Electrical Control also allows transition from one electrical configuration to another without significant power disruption. As an example, a power disruption may be caused by the current surge caused by starting a very large load. The electric plant technicians must have enough flexibility to be able to modify these transitional scenarios. (This is evidenced by the fact in modern ship design modeling of the ship's electrical distribution system is very expensive and is not currently done.)

A preferred exemplary embodiment of a user/operator interface display for operation of Main Electrical centers around the DAIEC that touch screen illustrated in FIG. 7E. All TU touch screens display both the operational mode and the emergency mode configurations of the ship. All functions are enabled by moving a highlighted area onto the function to be enabled. This is done by pressing the "scroll" area on the touch screen display and either the "up or "down area on the touch screen display. When the highlighted area is in the correct position the "select" area on the touch screen is pressed.

Upon enabling communications, the DAIEC displays the screen depicted in FIG. 7E1. This screen provides a bar graph of the communication error rates of all the TUs and DCUs which Main Electrical uses to perform its functions. The vertical axis represents the logarithmic error rate. the units with the highest error rates are shown toward the left. In a preferred embodiment, error rates less than one error every 5 hours are not displayed.

The Main Electrical Control operator can choose two courses of action if high error rates occur after the system has automatically performed circuit breaker reset. First, he can determine if switching to an alternate feed line will improve communication. This may be accomplished using the screen depicted in FIG. 7E1 when the "Display and Control of Electrical Distribution" function is selected on the touch-screen display depicted in FIG. 7E. If the operator observes no current leaving the node feeding the high error rate equipment he can perform a change in the configuration. This is discussed in further detail below. Second, he can send electrical maintenance personnel to the location of the unit to determine the cause of the problem. (For example, perhaps power has been lost and can be restored using casualty power and casualty power cables. This action will not only restore communication but it will also restore power to that sector of the ship).

In accordance with a preferred exemplary embodiment of the present invention, loss of power will brake the communication path but not degrade performance of the Terminal Units or Data & Control units because of the uninterruptible power source provided to the unit. If, for example, the unit has failed due to significant battle damage, a local diagnostic can be performed on the unit to determine if a failed unit needs to be replaced. If it is determined that replacement is necessary, then the unit is removed from an Active Units list maintained by each DAIEC. This is done by Main Communication as will be explained in detail below.

When "Battle Shorting List Maintenance" on the Main Electrical main menu is enabled, the screen depicted in FIG. 7E2 appears. This screen is used to edit the Battle Shorting lists. The user interface screen depicted in FIG. 7E2 is exemplary for the maintenance of a Battle Shorting list, for example, of a predefined "condition-one" as a primary operation and for a fire as a secondary operation. Other examples of primary functions are predefined conditions "two" and "three". Examples of other secondary operations might include a collision, an airborne ordnance hit, or an underwater ordnance hit.

Pressing "scroll" and "equipment" on the touch screen causes the displayed list of equipments to scroll. Pressing "condition-one" and scroll causes the primary conditions to scroll for the equipments. Pressing fire and scroll causes the secondary conditions to scroll through all the secondary conditions for the equipments shown. Once the primary, secondary and equipment conditions are established the battle shorting conditions can be edited. The columns on this screen which can be edited are primary conditions, "see", "where", "Auth" and auto. When "select" is pressed with SPY-1, the highlighted screen depicted in FIG. 7E4 appears.

Pressing the "scroll" and "see" causes the "YES" and "NO" to reverse their positions. When the new configuration is correct the operator will press "select". This action causes the battle shorting of the Spy-1 Radar to now be displayable. It is only displayable at terminal units 1 to 15 to 22. Pressing the "scroll" and "where" will cause the highlighted area to move from 1 to 15 to 22. Removing either finger on "scroll" or "where" will cause the scrolling to stop. When the operator has the highlighted area under the desired new terminal unit he will press "select". Pressing "save" and "select" will save these new instructions for battle shorting the Spy-1 Radar.

The save command is very powerful. It sends the new configuration to all affected units as well as new list configuration to the two secondary terminal units. The new battle shorting orders are stored in the affected units. Thus the affected units will not need any additional instruction once the configuration of the ship is announced and changed to a configuration which requires the Spy-1 Radar in the above example to be battle shorted.

Some Data and Control units serve to reduce the disruption caused by large starting currents. The main and alternative feed are likewise used. The distribution system is designed so that vital, sensitive and large transient loads can be switched to either main or alternative feeds systems. The non-vital, insensitive and small transient loads are equally distributed between main and alternative feed lines.

One feed line (for example, the main feed line) is designated for starting large transient loads. A separate Data and Control Unit (DCU) may be provided for monitoring the controller of any large transient producing load. This DCU will sense when the large transient generating load has been requested to be put on line (i.e., powered-up). This DCU can then command large synchronous switches to switch the large transient load to the main feed line during start up and then return the load to an operational feed line once the transient has settled.

In order to keep the main and auxiliary lines balanced, some loads may be synchronously moved to the auxiliary feed. Since synchronous switches are used, they will not disturb the operation of equipment which is being moved from one feed to the other. The sequence is for the DCU to sense the request to turn on the high current load. Second, when the DCU receives a token, it sends a broadcast message to reconfigure the distribution system to accommodate the transient. Third, when the DCU has sent these messages it may either wait for acknowledgements or proceed with enabling the start-up of the transient load. The two different responses will depend on the severity of the transient.

The data base for this portion of the system is called "Transient Control". This data base holds the times required for a particular type of current transient to settle out, as well as any configuration changes which will result from bringing this large equipment on line. Thus, the commands to put the system in the new configuration are sent after the current transient has subsided. While other current transient measurement techniques to solve this problem might be used, they would most likely suffer from problems of inadequate response time due to inherent limitations of a PLCC LAN.

When Transient Control Maintenance is enabled from the Main Electrical control screen, screen 7E5 appears. This screen is used to select the equipment. Pressing the scroll and down locations on the flat screen causes the highlighted area to move down the list of equipments. When arriving at the desired equipment, the operator presses the select location on the flat screen. When he does, the screen in FIG. 7E6 appears. This screen is used to change the transient modification scenario for the selected equipment. The equipments are in two lists. The list on the left, in descending order, holds the equipments which may require reconfiguration prior to starting equipment 8. The list on the right is a similar list used after equipment 8 is started. These lists hold all equipments which can be used to limit the effects of starting of equipment 8. The equipments which are currently used have a "yes" in the enable column. These lists are edited using techniques similar to what were discussed earlier. Pressing "before start" causes equipment 22 to be highlighted. Pressing "scroll" and "down" causes the highlighted area to move down the list. When the end enabled equipments is reached the other listed disabled equipments appear to move up into the highlighted space. When the scrolling is stopped and select is pressed a new equipment is added to the enabled equipment list. To change order in the list the operator highlights an enabled equipment and presses "select" and "up or "down" to move the equipment up or down in the enabled list. When the configuration for the list for equipment 8 is completed the "save" space is pressed. This saves the new configuration. When the token is received next these new configurations are sent by Main Electrical to the affected units.

When "Display and Control of Electrical Distribution" is enabled, the screen display depicted in FIG. 7E7 appears. This is a display of the maximum and minimum voltages expanded around "nominal" for all voltage measuring circuits contained in the SECDCDM. The refresh command allows the operator to restart accumulation of data to fill the screen. The Terminal or Data & Control units only send data when the maximum or minimum data is greater or less than data previously sent. This will reduce the the amount of unnecessary data beig sent. When any emergency is announced by main damage control, it is done with the "close ship" command. When any unit receives the emergency announcement it displays this fact in the upper right hand corner of its flat screen. When Main Electrical receives the "close ship" command, the screen display of FIG. 7E7 automatically appears on the flat touch screen of the Main Electrical TU. The "close ship" command causes the ship to be placed in an emergency configuration by sending manual and automatic orders to terminal and data & control units. This configuration is designed to minimize the movement, within the ship, of any effect of an emergency. Effects of emergencies are sea water, smoke, fire and loss of shipboard assets which are used to perform the mission of the ship. The "close ship" list is maintained by Main Mechanical.

Figure 8:
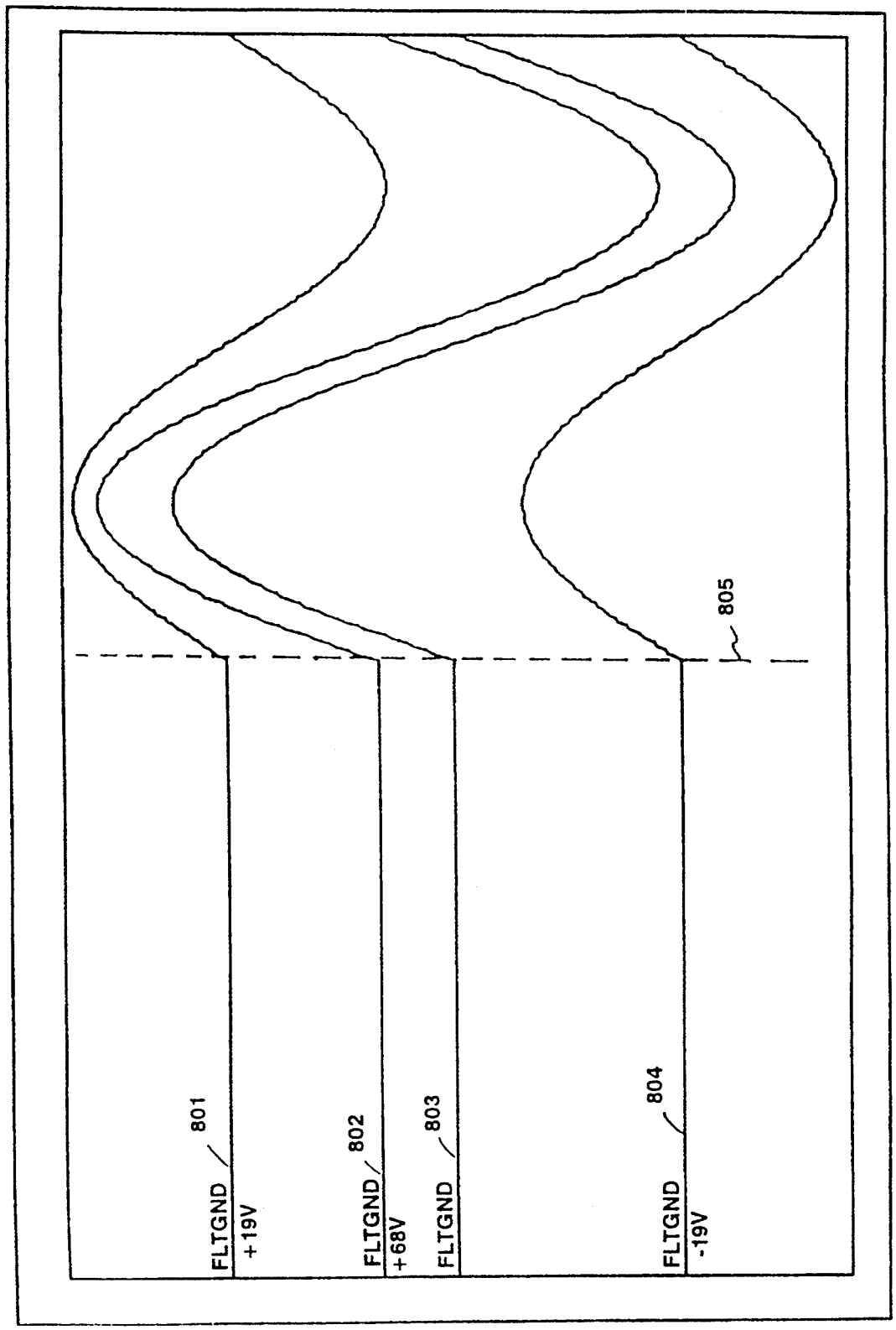
FIG. 8 is a waveform representation of the relationships of the voltages in the bootstrapping network of the transmitter logic shown in FIGS. 5B1 and 5B2.

The Screen depicted in FIG. 7E7 gives the best representation of the condition of the electrical distribution system. Pressing "expand both" and an area of the screen causes screen depicted in FIG. 7E8 to appear. FIG. 7E8 shows the voltages from location xx to location yy. Pressing "screen up" causes the screen of FIG. 7E7 to reappear. Pressing "expand main" and a location from the screen of FIG. 7E7 causes the screen in FIG. 7E9 to appear. FIG. 7E9 shows only the voltage variation for the main buss. The expand command can be used until the display is for a single node. When this happens voltage and current are plotted as shown in FIG. 7E10. This display can also aid the operator's understanding of shipboard transients with the use of the transient command. Here the averaging effects in the data gathering terminal units are removed and worst case data is displayed. This data can be used to eliminate the effects of start-up transients when used in conjunction with screens 7E5 and 7E6. The refresh command starts the display process all over again. These displays are used to determine the condition of the electrical distribution system.

When a conflagration is broadcast to all units they automatically reset every circuit breaker without further orders. At the Main Electrical TU, the screen depicted in FIG. 7E7 appears. The operators attention is called to the lost line on the display. Any lost circuits which are restored by the casualty Reconfigure command are restored on the display. The operator can observe the effect of a parted main or auxiliary power line in a screen as depicted in FIG. 7E7. Lost lines are shown by a notation or indication of lost voltages beyond a certain point in the display. If the operator observes a parted cable he enables the casualty Reconfigure command by pressing "casualty reconfiguration" and the space on the display where the lost voltages start. The DAIEC SECDCD matrix holds the start up and run currents for all the equipments which are going to be moved to the unaffected feed line. The DAIEC starts the casualty reconfiguration by sending shed orders to the TUs and DCUs to shed non-essential loads from the unaffected feed line. The number of non-essential loads shed will depend on the amount of load that the DAIEC calculated will be required to be moved to the unaffected feed line. The DAIEC then sends orders to terminal and data and control units to switch essential equipments from the affected line to the unaffected line. The operator observes the voltages to the essential loads being restored as the process continues. This will take two circulations of the bus or less than four seconds.

Once this is done the operator wants to look for terminal or data and control units which are not responding. To do this he presses "screen" and "up" twice. This returns the operator to the screen display depiction of FIG. 7E. The operator enables "communication maintenance" and the screen display of FIG. 7E1 appears. The operator then dispatches damage control personnel (for example, by conventional radio frequency communications; also known as "DCWIFCOM") to the location of any down units which are outside the fire damage area to attempt repair.

A program design function flow description for the Main Electrical control primary terminal unit is set forth below:

| Primary Terminal Unit Main Electrical Program Function Flow: |
| --- |
| Incoming LAN Data Initiated Functions: |
| Store all current SECDCD in local non-volatile memory. Of particular relevance is: Electrical Distribution Node Data Electrical Distribution Configuration Configuration & address of Units on line Calculate, Prioritize & Send Main Electrical Commands via authority when necessary Change from Main Electrical to another configuration Display conflagration data |
| Incoming Commands Initiated Functions: |
| Close ship reset local Set local close ship configuration Send data local by port & extreme differences only all local by port |

-continued

Primary Terminal Unit Main Electrical Program Function Flow:

all local by port and card
all local
battle shorted overload data
organized main electrical
Display
Manual Command & Control
Save
Local data
Change
Port Configuration Terminal Unit Operator Initiated Functions:

Perform Maintenance
Battle Shorting Lists requesting authority when necessary
Load shedding Lists requesting authority when necessary
Transient control Start-up lists requesting authority when necessary
Send Save Command
New unit lists
Display Data
Communication reliability data
non-reporting personnel
casualty boards
battle shorting data
summarized electrical node data
groups of electrical node data
single node electrical data
Send commands
refresh electrical data
by port and unit
by unit
Approval for reconfiguration when required Incoming Local Data Initiated Functions:

Send Close ship command
Send local reconfiguration by port & card

Self initiated Functions:

Upon Boot-up:
Perform self diagnostic & display anomalies without operator request
Read non-volatile memory and determine that the unit is Main Electrical

MAIN MECHANICAL CONTROL

The Second primary terminal unit is designated as "Main Mechanical" Control. Main Mechanical Control performs the function of command and control of the non-electrical distribution portions of equipments and sensors associated with the SECDCDM. The goal of Main Mechanical control is to return those sub-systems under its cognizance to the highest state of readiness possible. The primary display for Main Mechanical is the screen display depicted in FIG. 7D. The Main Mechanical Damage Control Assets are displayed by a screen display depicted in FIG. 7D1. As electrical power is being restored by Main Electrical, Main Mechanical must decide the severity of potential fire and or water damage. If the below waterline sensors are showing very fast flooding it must have priority. If an above deck missile fire is indicated fire fighting must come first. Items of the ships damage control data matrix (SECDCDM) that are managed by Main Mechanical control are first discussed below followed by a description of the DAIEC operator interfaces for the Main Mechanical control terminal unit:

First, Main Mechanical controls shipboard air. These variables have to do with sensing the location of a fire and setting of smoke tight and fire tight boundaries. Shipboard Air Control also requires control of speed and direction of all fans.

The Main Mechanical data matrix contains all the temperature sensors with values of class A, B, C, and D that relate to classes of fires. Class A fires are in ordinary combustible materials such as mattresses, dunnage, wood canvas and paper. Class A fires have temperatures from 250 to 500 degrees Fahrenheit. Class B fires occur in gasoline, fuel oil, lubricating oil, diesel oil and paint. Class B fires have temperatures from 1500 to 2500 degrees Fahrenheit. Class C fires occur in electrical equipment and have temperatures from 750 to 1500 degrees Fahrenheit. Class D fires have temperatures greater than 3000 degrees F and can be caused by unspent missile fuel, and fires in metals magnesium and titanium.

Smoke sensors rate the toxicity of the smoke. Class N means no visibility and not fit for human habitation, without Oxygen Breathing Apparatus (OBA). Class O means air content satisfactory for breathing without breathing apparatus but no longer than 10 minutes. Class P means Pure fresh air. The location of each sensor, in deck coordinates, is in the SECDCDM.

The Main Mechanical terminal unit SECDCD matrix also contains information about those damage control assets that set smoke tight, fire tight boundaries. Fire tight boundaries are established to limit sources of oxygen. Smoke tight boundaries are established to keep the ship as free from smoke as possible. There are two classes of assets to set smoke tight, fire tight boundaries. The first group of assets are the condition of water-tight hatches, open or closed, which set the damage control boundaries. The second group of assets are the conditions of air circulation fans. The conditions of these fans are the direction of air and the speed of the fan. These assets are part of what is shown in table one. In our current US Navy ships, crews have no idea where a fire is located without physical inspection. The present damage control procedures require personnel to use their hands on bulkheads to determine if a fire is on the other side. Thus the establishment of smoke-tight, fire-tight boundaries in 24 seconds is impossible in our present ships.

Second, Main Mechanical controls sea water and its effects. Sea water has three sources. It can come from a hull penetration caused by a mine or a torpedo. A one square foot hole 15 feet below the waterline will admit water at the rate of 13,900 gallons or 48 tons per minute. The total pumping capacity of a large combatant ship is 12,200 gallons per minute. Thus it is essential that holes below the waterline be isolated by closing water-tight doors and then pumping can commence. Removal of water from the hull is called dewatering.

The process of fighting hull penetration flooding requires information about those assets which are used to fight flooding. The Main Mechanical DAIEC program sends a "close ship" command which among other things orders all hatches closed. The conditions of the water-tight hatches are in the SECDCDM. The orders are sent to terminal units to operators on their flat screens. If automatic doors are not working properly a repair party will be sent to try to get the door closed. The Main Mechanical DAIEC program holds the volumes of all the compartments below decks. It also is able to determine the water levels in all compartments every time the PLCC LAN circulates, that is, less than every two seconds. The Main Mechanical DAIEC program is able to calculate the amount of water which is entering the ship every LAN circulation time. Once this is done pumping can be started both by fixed and portable pumps. Knowing the amount of water that is entering and leaving the ship, the DAIEC program is able to report the severity of the hull penetration. With the aid of the main damage control operator and the damage control parties, command is able to determine what further action is required. Further the Main Mechanical DAIEC determines stability and freeboard as a function of time using automated and manual data. This data is used to establish a flooding plan and report the impact of damage to command. Examples of these actions can be found in any Navy Repair Party Manual (e.g., LEYEGULFINST 3541.6).

Sea water can also be the result of fighting fire. Regardless of the reason, extensive flooding may occur in a particular area of the ship. The location of the added flooding weight may cause a list either to port or starboard, or a trim forward or aft. Sea water can also come from magazine flooding and sprinkling systems. Such systems are all monitored and controlled by Main Mechanical.

The transfer of fuel can be used to correct list and trim. This is done with existing fuel oil transfer pumps. The SECDCDM contains the location and amount of fuel. The Main Mechanical DAIEC program is able to make recommendations to correct list (tilt) and trim of the ship.

Counter flooding is a second method which is used to correct list and trim. Counter flooding adds sea water to ballast tanks and other wet voids. For every gallon of sea water taken on, the ship sinks lower in the water. Thus, counter flooding must be done accurately or the damage control party can literally sink the ship. The Main Mechanical DAIEC program performs the counter flooding calculations with the aid of data in the SECDCDM. Presently, all the calculations are done manually from equations and other information in the repair party manual. The only available data is visual trim and list gages.

Third, Main Mechanical controls engineering plant assets that keep the ship fighting. These assets are required for the operation of other systems. These assets include demineralized and chilled water, compressed air, oxygen, nitrogen and dry air. The SECDCDM includes flow rates and status of the equipment that produces these assets. It also includes the condition of all variables which are used to control these assets.

Fourth, Main Mechanical determines the availability of Halon 1301 for engine room fire fighting.

Fifth, Main Mechanical controls the ships JP-5 fuel. The Main Mechanical data base contains the amount and location of all fuel. The amount of remaining gas turbine fuel determines the sum of the mechanical and electrical energy available without refueling. The location of this fuel is used in the list and trim adjustment discussed earlier.

Operation of Main Mechanical centers primarily around the screen display depicted in FIG. 7D. Since the engineering casualty and damage control management system has a limited communications bandwidth the status of each sensor is not reported. Rather, only sensor changes are reported. Furthermore, data from temperature sensors only has five values which only requires three bits of data. When the local address of a particular temperature sensor is added the total number of data bits for a single sensor equals one byte. Likewise, smoke and flooding sensor data with address bits also only requires one byte. Excluding overhead, a single sensor requires only 0.145 milliseconds to make a change in its value known when communication occurs at a data rate of 55 kbits/sec.

The first operator indication that an emergency has started is when the display depicted in FIG. 7D1 automatically appears on the flat screen of Main Mechanical. This is the result of either one of three conditions. The first is the change in value of at least two heat, smoke, fire main pressure or flooding sensors, in combination, from one terminal or data and control. The second is the loss of communication from more than one unit in one LAN circulate time. Third, is the receipt of a severe shock to the ship. The command which results from any of these three events is called "close ship".

The following is a discussion of the screen display depicted in FIG. 7D1. This screen display is designed to give the operator of Main Mechanical a simple overall view of the damage control sensors. If the operator sees that there is an actual emergency he selects "close ship" using the touch screen as discussed earlier. The command will be sent by Main Mechanical to all TUs and DCUs when Main Mechanical next receives the communications token. The command could also be sent by any terminal unit when its associated shock sensor senses significant shock.

The "close ship" command causes the ship to be placed in an emergency configuration. This configuration is designed to minimize the movement, within the ship, of any effect of an emergency. Effects of emergencies are sea water, smoke, fire and loss of shipboard assets which are used to perform the mission of the ship. This emergency configuration stays in effect until the Main Mechanical DAIEC has an opportunity to analyze the data about the emergency. Then the DAIEC will order a relaxation of the emergency configuration based on the needs of the emergency.

For example, consider the ventilation system of the ship. The emergency configuration for ventilation is to have no air circulation at all. This lack of circulation will last for ten to twenty seconds while the impact of the emergency is being discovered and the orders for the proper configuration are being sent. No circulation for this brief period is much preferred to continuing pre-emergency conditions during the time required to digest the emergency data and send orders.

The emergency configuration of the ship is held in the main mechanical DAIEC and is sent to the proper locations prior to any emergency so that the "close ship" command is a simple message. If, for example, there are level "4" temperature readings (indicative of abnormally elevated temperatures) on the starboard side of the ship just above the waterline, the DAIEC will deduce that there is a missile hit at the locations associated with these level "4" readings. The DAIEC will thus indicate to an operator or automatically order normal air circulation for the remainder of the ship up to within, for example, several zones from the edge of the fire. (That is, provided that the ventilation ducting for that particular circulation configuration does not go through the level "4" heat area). Casualty reconfigurations, as discussed above, can thus be operator initiated or, if preferred, the DAIEC can be programmed such that reconfiguration decisions will be made automatically.

Table four shown below illustrates a list of notional ship assets and their configurations which result from the "close ship" command.

TABLE Four

| SUB-SYSTEM | CONFIGURATION |
|---|---|
| BREATHING AIR | NONE |
| FIXED PUMPS | ALL THE LINE |
| TURBINES | ALL ON THE LINE |
| GENERATORS | ALL ON THE LINE |
| SPLIT PLANT | ENABLED |
| FIRE FIGHTING WATER MAINS | OFF |
| HATCHES AUTO & MANUAL | CLOSED |
| BACK-UP SUB-SYSTEMS | ON THE LINE |
| DAMAGE CONTROL CONFIGURATION | WILLIAM |

As was stated earlier, the screen display depicted in FIG. 7D1 is designed to give the operator at Main Mechanical Terminal Unit a simple overall view of his damage control sensors. The column numbers across the top refer to the severity of the emergency. The spaces under each column are used for displaying the percentage of sensors which are reporting at a particular level. The "no change" column gives the operator a sense of the severity of the emergency. The percentages displayed do not contain any data from sensors that are not currently reporting either because of maintenance problems occurring before the emergency or due to failure during the emergency. If a Terminal Unit or Data and Control unit cannot respond, then the sensors associated with that unit are also removed by the DAIEC from the calculation.

Table Five shown below depicts part of the display screen of FIG. 7D1 and illustrates some exemplary definitions (under column nos. 1-4) for the displaying of equipment and system conditions.

same percentages as the fire main pressure. Flow is measured at the fire main nozzles. By calculating the total nozzle outflow me can determine if there is a loss of fire main water. The percentages are of the expected flows at particular points in the system. The first flooding column is the time before the ship sinks or capsizes given the present flooding and pumping rates. This DAIEC calculation takes into consideration the change in freeboard, list, trim and the present rate of flooding and pumping. The second flooding column is the flooding rate, with plus numbers; dewatering rate, with minus numbers, in tons per minute. Flooding column three is the list in degrees. Flooding column four is trim in degrees.

A program design function flow description for the Main Mechanical control primary terminal unit is set forth below:

Primary Terminal Unit Main MechaniCal Program Function Flow:

Incoming LAN Data Initiated Functions:
Store all current SECDCD in non-volatile memory. Of particular relevance is:
Temperature
Smoke
Boundary
water
fire
smoke
Water
Fire Main Pressure
Fire Main Flow
flooding
dewatering TABLE Five

| | 1 | 2 | 3 | 4 | NO CHANGE |
|---|---|---|---|---|---|
| HEAT | % < 250° F. 500° F. > | % < 1K° F. 2.5K° F. > | % < 750° F. 1.5K° F. > | % 3000° F. > | % no change |
| SMOKE | % Pure Air | % OK for 10 minutes | OBA Required | not applicable | % no change |
| FIRE MAIN PRESSURE | % < 75% 95% > | % < 74% 50% > | % < 49% 25% | % < 24 | % no change |
| FIRE MAIN FLOW | % < 75% 95% > | % < 74% 50% > | % < 49% 25% | % < 24 | % no change |
| FLOODING | time to abandon ship | flooding in tons/min | degrees list | degrees trim | % no change |
| VENTILATION | | | | | |
| SHOCK SENSORS | | | | | |
| ENGINEERING | | | | | |
| DRY AIR | | | | | |
| CHILLED H2O | | | | | |
| DEMIN H2O | | | | | |
| COMPRESSED AIR | | | | | |
| OXYGEN | | | | | |
| NITROGEN | | | | | |
| HALON 1301 | | | | | |
| JP-5 | | | | | |
| DAMAGE CONTROL CONFIG | % X | % Y | % Z | % W | % NC |

As mentioned above, the screen display is arranged to indicate increasing severity of damage as it is read from left to right. If no damage has occurred in a particular subsystem then the "no change" column should indicate "100%". The definitions for temperature (i.e., "HEAT") levels, smoke levels, and Damage Control Configurations (X, Y, Z and W) are as previously discussed. The first fire main pressure column (column 1) indicates the percentage of pressure sensors which are registering 75 to 95 percent of expected fire main pressure. The second column is from 74 to 50 percent of expected pressure. The third fire main pressure column is the number of pressure sensors which are reporting pressures from 49 to 25 percent of expected pressure. The fourth column is for 24 to zero percent of desired pressure. The four fire main flow columns are for the Engineering Plant Assets
dry air
Chilled H2O
Demineralized H2O
Compressed Air
Oxygen
Nitrogen
Halon 1301
JP-5
Configuration & address of units on line
Calculate, prioritize & send main mechanical reconfiguration commands requesting authority when required
Display conflagration data
Change from Main Mechanical to another Configuration
Incoming Commands Initiated Functions:
Close Ship
Reset local -continued Primary Terminal Unit Main MechaniCal Program
Function Flow:

Set local close ship configuration
Send Data:
(local by port & extreme differences only)
all local by port
all local by port and card
all local
battle shorted overload
organized main mechanical
Change
Port configuration
Save
Local Data
Display
Manual Command & Control
 Terminal Unit Operator Initiated Functions:
Perform Maintenance:
Inactive Sensor Maintenance list requesting
authority when required
Close ship maintenance List requesting
authority when required
Damage Control Configuration list requesting
authority when required
Display Data:
Main Mechanical non-volatile memory data
summary
Individual data such as temperature or
flooding
Expanded data such as fire main pressure in
a ship area
Communication reliability data
Casualty boards
Send command:
Approval for reconfigurations when required
Refresh Mechanical Data
by port & unit
by Unit
 Incoming Local Data Initiated Functions:
Send close ship command
determine list & trim
Send local reconfiguration by port & card
 Self initiated Functions:
Upon Boot up:
Perform self diagnostic & display anomalies
without operator request
Read non-volatile memory and determine that
the unit is Main Mechanical

MAIN DAMAGE CONTROL

The third primary terminal unit is Main Damage Control. Main Damage Control performs all the functions for total control of the engineering casualty and damage control management system. (Main Mechanical and Main Electrical perform the casualty reconfiguration done on prime power, machinery and controls.) Main Damage Control also performs coordination of roving damage control parties to put out a fire or rescue people or shore up a bulkhead. Spoken communication between the Main Damage Control Terminal Unit operator and damage control parties is conventionally via portable radios (conventionally referred to as "DCWIFCOM" for damage control wireless communications by U.S. Navy personnel). The Main Damage Control Terminal Unit is located in a ship location designated as Damage Control Central. It may be "moved" or reassigned to a terminal unit at a location nearer to the scene of the actual damage when, and if, the situation is safe. Likewise, any of the main terminal units can be moved when to do so would improve the effectiveness of the damage control management system.

Figure 3:
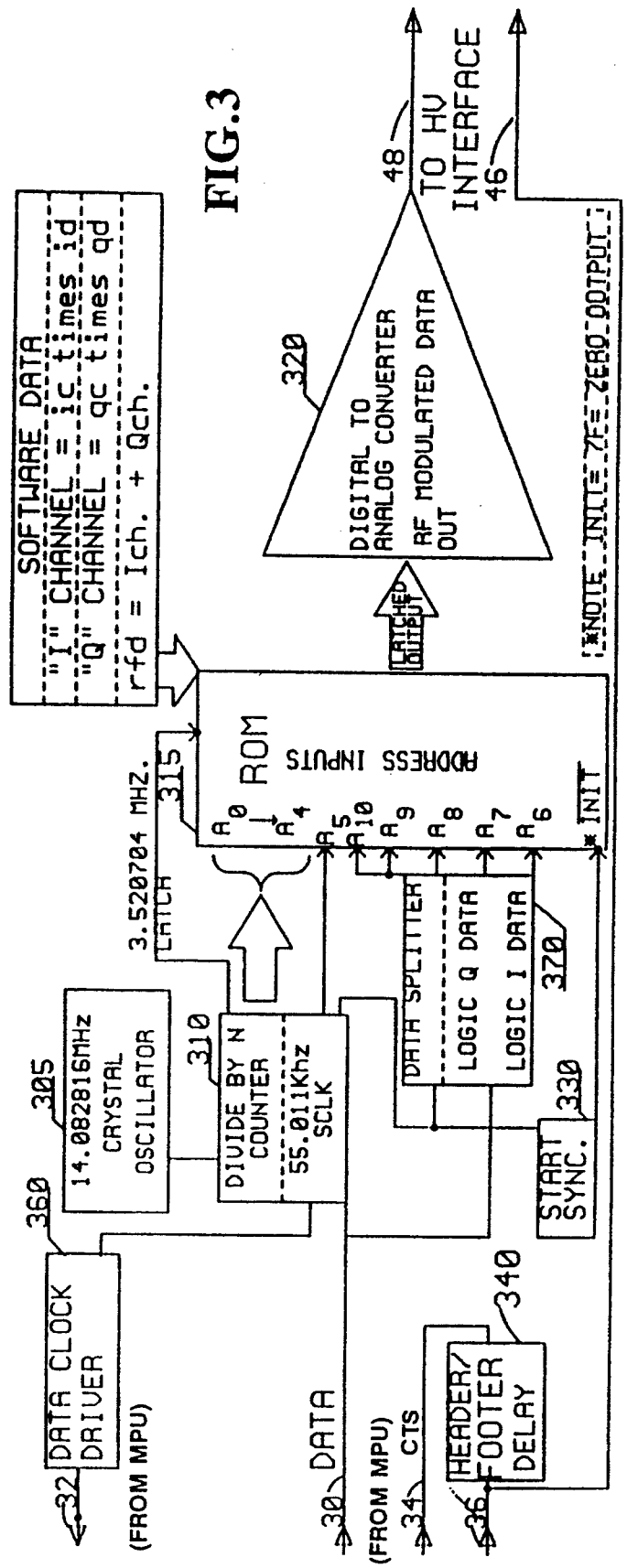
FIG. 3 is a block diagram of the transmitter logic shown in FIG. 2.

The operator interface display screens for Main Damage control are depicted in FIGS. 7A–7A3. An exemplary boot-up screen is shown in FIG. 7A. The first eight items define "emergency modes." When selected, each of these emergency modes will cause the "close ship" command to be sent to all DCUs on the LAN from the Main Damage control Terminal Unit. Selection of one of these eight emergency modes will also send that data to all terminal unit displays to announce the emergency. This is done since in some cases an eminent situation is known just prior to the actual start of an emergency (such as a missile hit or a collision at sea). When "close ship" is sent, by whatever means, the display depicted in FIG. 7A1 appears on the Main Damage Control TU flat touch screen display. The screen display of FIG. 7A1 provides a summary of the data from Main Mechanical and from Main Electrical (i.e., the displays depicted in FIGS. 7D1 and 7E1).

For example, for a missile hit, the sequence of events from the perspective of a Main Damage Control operator would be as follows:

First, the sound of the impact of the missile would be heard. The next mode in the ship PLCC LAN to receive the token will probably send a "close ship" message as a result of the shock from the missile impact. (This command causes the ship be placed in a particular emergency configuration. Emergency configurations are designed to minimize the spreading throughout the ship of any effects of a particular emergency.) Typical effects of emergencies are sea water, smoke, fire and loss of shipboard assets which are used to perform the mission of the ship. Along with the issuance of the "close ship" command, the display screen of FIG. 7A1 appears.

Second, a "race" starts between the operator and the main damage control DAIEC to see who can first determine the type of emergency which has occurred. If the DAIEC wins, display screen of FIG. 7A2 appears. The operator then selects "yes" on the touch screen display. If the operator wins, he presses "up" on the touch screen display and display FIG. 7A appears. He then selects the "Airborne Ordnance Hit". The "Emergency Mode" indicated on the screen display changes from "NONE" to "Airborne Ordinance Hit".

Third, preferably in less than 2 seconds, the screen display depicted in FIG. 7A3 appears. This screen display requests permission to announce and order. If the operator agrees he may touch the flat screen at "scroll" until "all" is highlighted, and then press the flat screen at "enable". Similarly, the operator may select any response using the highlighted scroll and selection process. With each successive step in the process, the Main Damage Control terminal unit sends instructions over the power lines to other units. (Moreover, the operator may also be using DCWIFCOM to communicate verbally with his damage control parties.) These PLC instructions are obtained from a command structure located in the DAIEC software but only enabled in the terminal unit designated as Main Damage Control. The time between outputs at Main Damage Control depends on two primary factors. First, the time for the DAIECs to digest their data; and second, the time required for Main Damage Control and every other designated unit to transmit one message. The sum of these two times is termed the LAN "circulation time" and will ordinarily be less than two seconds.

A program design function flow description for the Main Damage Control primary Terminal Unit is set forth below:

| |
|---|
| Primary Terminal Unit Main Damage Control Program Function Flow: |
| *Incoming Data Initiated Functions:* |
| Announce Emergency requesting authority when required |
| Display Summary Emergency Data |
| Store all current SECDCD in non-volatile memory. Of particular relevance here are data summaries from |
| Main Communication |
| Main Electrical |
| Main Mechanical and the configuration & address of units on the LAN |
| Display Operator requested Data |
| Primary Unit Summaries |
| Any unit data |
| Change from Main Mechanical to another configuration |
| *Incoming Commands Initiated Functions:* |
| Close ship |
| Reset local |
| Set local close ship configuration |
| Send Data |
| local by port & extreme differences only |
| all local by port |
| all local by port & card |
| all local |
| battle shorted overload |
| Change |
| port configuration |
| Save |
| Local Data |
| Display |
| Manual command & control |
| *Terminal Unit Operator Initiated Functions:* |
| Provide Authority |
| Announce Emergency |
| Reconfigure Terminal Units |
| Close Ship |
| Send Commands: |
| Primary Unit Summaries |
| Electrical |
| Mechanical |
| Communications |
| Reconfigure System |
| on failure |
| effective use of assets |
| *Incoming Local Data Initiated Functions:* |
| Send close ship command |
| Send local Reconfiguration by port & card |
| *Self initiated Functions:* |
| Upon boot up: |
| Perform self diagnostic & display anomalies without operator request |
| Read local non-volatile memory and determine that this unit is Main Damage Control |

MAIN COMMUNICATIONS CONTROL

The fourth primary terminal unit is designated "Main Communication". Main Communication is preferably located in the Combat Information Center (CIC). Main Communication performs five primary functions. These functions are controlled from a DAIEC touch screen display as shown in FIG. 7F.

A the first function of Main Communication is to initialize the system. The purpose of the initialization function is to determine the operational readiness of the system. This is preferably done prior to getting the ship under way. During this time, the operator places all the LAN terminal units and DCUs in the address mode. In this mode, the operator can observe the communication error rates of the units in the ships PLCC LAN. Any repairs necessary to get the LAN totally operational are then made. On request, each unit will also send to Main Communication the complete sensor profile rather than just the "change" data. The Main Communication DAIEC will check this data against stored data records for all sensors in the SECDCDM. This data matrix is stored in the terminal units DAIEC local non-volatile memory. Differences are displayed on the terminal unit DAIEC screen for analysis and repair. Finally, an operability test is performed on all equipment managed by the engineering casualty and damage control management system. Deviations are displayed on the Terminal unit DAIEC touch screen displays and the Main Communications Terminal unit operator orders repair. Once this maintenance and repair are performed the operator switches the system over to the operational mode. Any equipment which is not operational prior to getting underway is added to the list of Equipment which are a part of the Casualty Control List.

A second function of Main Communication is to maintain accounting of shipboard personnel such that the trapped seamen tragedy of the STARK can be averted. Prior to getting underway the ship's Watch Quarters and Station Bill is updated. As a conflagration unfolds the members of ships company are requested to report their location to their local terminal unit. Use of the Watch Quarters and Station Bill will aid in the accounting of ship's company. Groups of personnel can also be reported since the bill contains their location for all the ship's configurations and times of day. In this way non-reporting members can be quickly identified.

A third function of Main Communication is to set the operational modes of the ship. This is done from the DAIEC flat touch screen by selection of the operational modes of the ship by a selected member of the CIC team.

A fourth function of Main Communication is to maintain the numerous lists or drawings which are referred to as "Boards" (since they were originally lists, kept on clip boards). These Boards are electrical, engineering plant, combat system and structural casualty, stability, CBR locations, safe passage aboard, locations of battle dressing and decontamination stations, and damage control party assignments.

A fifth function of Main Communication is training. The Main Communication terminal unit has the ability to recreate a previously recorded conflagration. This training data base may be acquired via an accumulation of time orientated sensor data within the ships engineering casualty and damage control data matrix (SECDCDM). The Main Communication terminal unit training module can download this data into each TU and DCU in the LAN. Thus, during a training session, each terminal unit or data and control unit will respond as it did originally in an actual emergency situation. Preferably, a complete training data base is stored in the Main Communication terminal unit DAIEC and only down-loaded to the other units prior to the beginning of a training exercise. In this manner, a number of training scenarios can be stored in the Main Communication terminal unit DAIEC non-volatile memory. Preferably, the training data base would include actual data from other ships and other conflagration data bases which are generated by the damage control and/or training communities.

FIG. 7F1 depicts the system initialization control screen. Functions are selected by highlighting the function and then pressing select on the flat screen. The third function brings up the screen display of FIG. 7F2.

This screen display is similar to FIG. 7E1 except it facilitates the display of larger variations in communication error rates. When the ship arrives in port the CIC person sets the communication report to this screen and the system measures its own communication reliability. The longer this function is allowed to run, the smaller the calculated error rate becomes and the more unit to unit variations become apparent.

The Screen display depicted in FIG. 7F3 is selected from the display depicted in FIG. 7F. The display of FIG. 7F3 is an intermediate screen which accesses lower level screens (not shown) and which will enable the operator to process changes in the form (configuration) and content of the Watch Quarters and Station Bill.

The Screen depicted in FIG. 7F4 is provided for "reporting in" to Main Communication. This same screen is available at all terminal units to aid operators in "reporting in" to Main Communications. Each terminal unit stores the organizations and locations in its vicinity. This will reduce the amount of data which one terminal unit must process. Once the first four items in the screen display depicted in FIG. 7F4 are selected, "exceptions" can then be selected in order to remove from the "location" or organization list, such as CIC, individuals who are not found. When "exceptions" or "individuals" are selected, the screen depicted in FIG. 7F5 appears. This screen display is set up similar to a standard keyboard. In this manner, proper names can be entered. As the characters of a name are entered the number of members of ship company in the list below the keyboard will decrease until the person making the selection sees the name he wants to select. The selection of the correct name is mode using the "scroll" and "select" functions at the bottom of the screen display.

Selecting "unreported ships company" from the screen display depicted in FIG. 7F displays a list in alphabetical order of ships company who have not reported since the start of the present emergency.

When "set operation mode" is selected from the screen display depicted in FIG. 7F, a separate screen display (not shown) reveals a list of the operational modes of the ship. One of these modes can then be selected by the designated CIC person as previously discussed.

A program design function flow description for Main Communication primary terminal unit is set forth below:

---
Primary Terminal Unit Main Communication Program Function Flow:
---

Incoming Data Initiated Functions:

Store/update all Sensor data changes
with time tag in a training data base in
local non-volatile memory
Calculate & Change Content of Reporting
Personnel in the local non-volatile
memory
Calculate & Change Casualty Board data
by name in non-volatile memory
Store all current/incoming SECDCD in
local non-volatile memory. Of particular
relevance here is:
Reporting Personnel
Communication Reliability
Equipment casualties
Sensor profiles
operational modes
Configuration & address of units on line
Change from Main Communication to ---
-continued
Primary Terminal Unit Main Communication Program Function Flow:
--- another configuration
    Incoming Commands Initiated Functions:
Close ship
Reset Local
Set local close ship configuration
Send data
Casualty Boards by name
local by port & extreme differences only
all local by port & card
all local
battle shorted overload data
organized main communication
Change
Port Configuration
Save
Local data
Display
Manual Command & Control
    Terminal Unit Operator Initiated Functions:
Display Data
Communications reliabihity data
Non-Reporting Personnel
Complete Unit Sensor Profile
Data Differences between Original &
Initialized SECDCD
Casualty Boards
engineering plant
electrical
combat system
structural
stability
CBR locations
damage control assignments
locations of battle dressing stations
locations of decontamination stations
safe passage routs
Battle shorting
Provide Authority Reconfigure Terminal
Units
Initialize Training Package
Send Commands:
Change Ship Operational Modes
Start Training
Change to Broadcast Mode
Complete Unit Sensor Profile
Change local boards data in the SECDCD
matrix in local non-volatile memory
battle shorting data
approval for reconfiguration when required
    Incoming Local Data Initiated Functions:
Send close ship command
Store Casualty data in the SECDCD
matrix in local non-volatile memory
    Self initiated Functions:
Upon Boot-up
Perform self diagnostic & display
anomalies without operator request
Read local non-volatile memory and
determine that this unit is Main
Communications
If able, Initialize the System in
"Address Mode"
Check the nominal performance of all
terminal units & accumulate communication
reliability values for display when
requested
Obtain terminal and data & control unit
port data once reliable communications
has been established.
Check in the Ships engineering casualty
and damage control data matrix (SECDCDM)
for the proper values of the received
port variables.
Store in differences in original and
initialized values in the SECDCDM for
display when requested.

MAIN SPARE TERMINAL UNITS

The fifth primary terminal unit is "Main Spare". As the name indicates Main Spare is a terminal unit that simply functions as a "spare" and is specifically reserved for this purpose. This comprises about 20 percent of the main terminal units used in a preferred embodiment of the Damage Control Management System in accordance with the present invention.

A program design function flow description for the Main Spare primary terminal unit is set forth below:

---
Primary Terminal Unit Main Spare Program Function Flow:
---
Incoming Data Initiated Functions:
Store/update all current SECDCD in
local non-volatile memory
Change configuration from main spare to
another configuration
Incoming LAN Commands Initiated Functions:
Close ship
Reset local
Set local close ship configuration
Send data
local by port & extreme differences only
all local by port
all local by port and card
all local
battle shorted overload
Change
port configuration
Save
Local Data
Display
Manual command & control
Terminal Unit Operator Initiated Functions:
Request permission to change
designation to another unit by password
Display Primary Unit Data
Incoming Local Data Initiated Functions:
Send close ship command
Send local Reconfiguration by port &
card
Self Initiated Functions:
Upon Boot-up
Perform self diagnostic & display
anomalies without operator request
Read local non-volatile memory and
determine that this unit is Main Spare

---

GENERAL HARDWARE DESCRIPTION

Each Terminal Unit (TU) and each Data and Control Unit (DCU) functions as a node of the local area network depicted in FIG. 1A. Referring to FIG. 2, an exemplary block diagram of the hardware of a terminal unit is illustrated. Each Terminal Unit includes a Distributed Artificial Intelligence Embedded Controller (DAIEC) 128, a Slave processing unit 22 and a Master Processing unit 28.

As discussed above, the operational program in the DAIECs are all substantially identical. That is, each particular terminal unit (TU) in the system has essentially the same DAIEC control program. The major distinguishing features of a particular terminal unit over other terminal units in the system are the configuration of the its sensors and controllers and its location. The choice of initial locations for the "main" terminal units (e.g., Main Mechanical, Main Communication, etc.) is tailored to the way that a particular ship operates. These initial conditions are stored at each terminal unit in a local non-volatile memory (e.g., EEPROM) and can be changed by reprogramming the memory.

A Data and Control Unit (DCU) is essentially the same as a Terminal Unit except that it does not have a DAIEC or an I/O touch screen device and does not perform any man-machine interfacing functions. Each DCU does, however, contain a Master Processing Unit that includes associated local non-volatile memory. This memory contains, in addition to the HDLC communications protocol control program stored in all terminal units, a scaled-down DAIEC control program for performing its I/O functions. A general program design function flow description for an exemplary DCU is set forth below:

---
Data & Control Unit Program function flow:
---
Incoming LAN Data Initiated Functions:
Store all current SECDCD in local
non-volatile memory
Incoming Commands Initiated Functions:
Close ship
Reset local
Set local close ship configuration
Send Data
local by port & extreme differences only
all local by port
all local by port and card
all local
battle shorted overload
Change
port configuration
Save
Local Data
Display
Manual command & control
Terminal Unit Operator Initiated Functions:
NONE (not applicable to DCUs)
Incoming Local Data Initiated Functions:
Send close ship command
Send local Reconfiguration by port & card
Start Transient Sequence
Self initiated Functions:
Upon Boot-up
Perform self diagnostic & display
anomalies without operator request
Read local switch settings and
determine that the unit is a Data &
Control unit with a specific address.

---

DAIEC

Figure 12C:
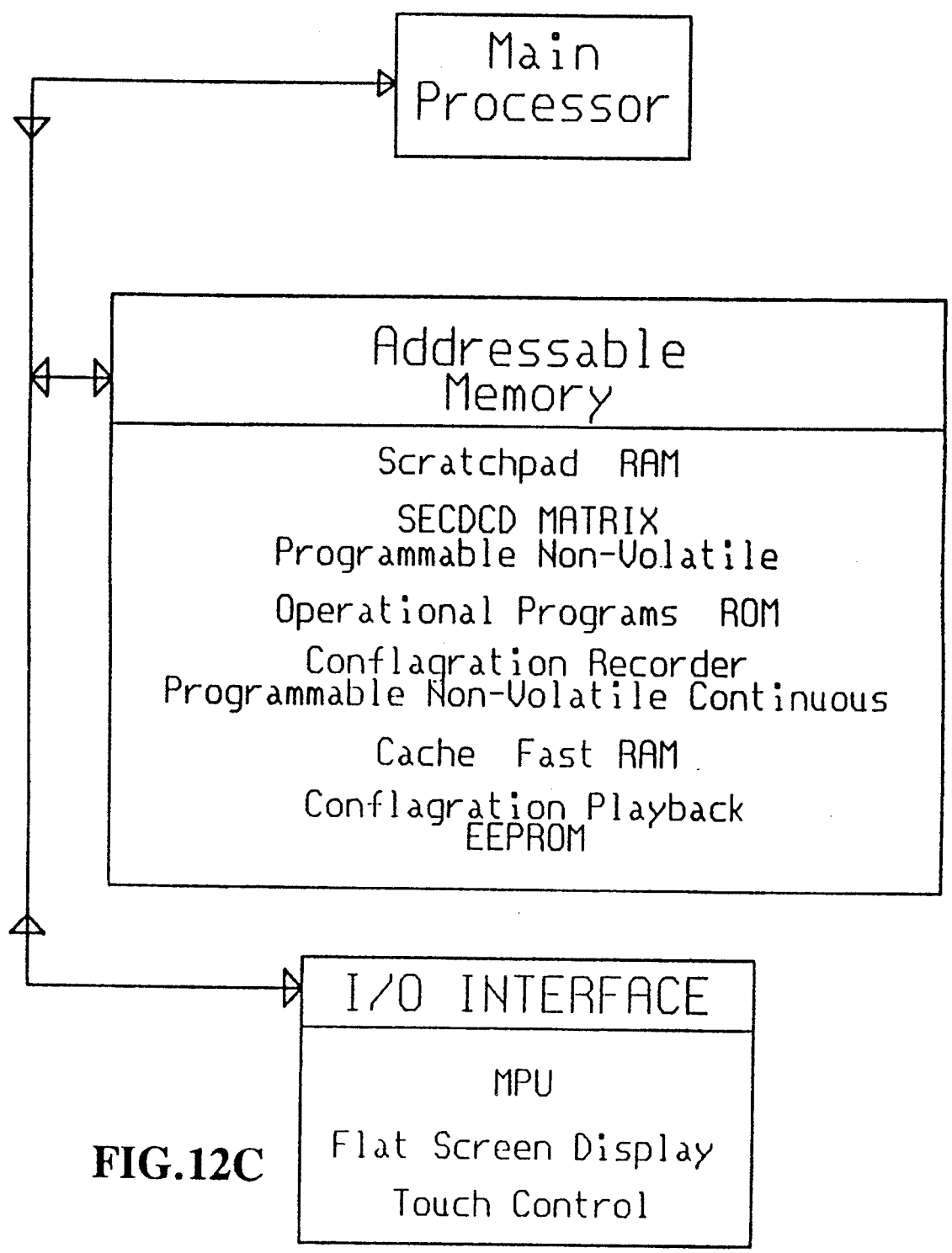
FIG. 12C is a block diagram illustrating an exemplary hardware configuration for the DAIEC.

The Distributed Artificial Intelligence Embedded Controller (DAIEC) 128 can be microprocessor based. However, since Artificial Intelligence programs can be very large, a preferred embodiment of the DAIEC utilizes a 32 bit processor (e.g., a MOTOROLA 68040) operating at 40 mhz. Moreover, it would be appreciated by one of skill in the art that the DAIEC main processor should have a speed margin of approximately 40% with an addressable memory margin of at least 50%. An exemplary hardware configuration for the DAIEC is illustrated in FIG. 12C.

The DAIEC preferably utilizes dedicated addressable memory including read only memory (ROM), a random access memory (RAM), and some form of resident non-volatile memory (e.g., an electronically erasable programmable read only memory (EEPROM) may be used if its read/write time is fast enough for the particular PLCC LAN application envisioned). The associated non-volatile memory provides local storage capability for the SECDCDM. Other types of continuous non-volatile mass storage memory may also be provided. For example, DAIEC 128 may use a master/slave mailbox register arrangement to facilitate communication with Master Processing unit 28 over lines 31 and 33. Referring again to FIG. 2, in the preferred exemplary embodiment of the present invention, a flat touch-screen display (124) is used as an input/output device for DAIEC 128. An orange screen color is also preferred since it propagates well through smoke.

SLAVE PROCESSING UNIT

Within each TU and DCU, as depicted in FIG. 2, the Slave Processing Unit communicates with sensors and equipment via serial ports 20 and exchanges information with other nodes in the LAN through the Master Processing Unit via parallel data buses 24 and 26. Information from other nodes in the LAN is received and processed via a Pre-detection receiver circuit 90, Receiver Logic 44 and Master Processing Unit 28. Information is processed and transmitted to other nodes in the LAN by Master Processing Unit 28 and Transmit Logic 42 via Linear Power Amplifier 60.

Master Processing Unit 28 and Slave processing unit 22 are microprocessor based units which may, for example, use a Z-80, a SAB80CI66 or any other conventional microprocessor that can perform port controlling functions. Both Master Processing Unit 28 and Slave Processing unit 22 include random access memory and non-volatile memory modules such as ROM or EEPROM.

Slave processing unit 22 formats the data received via I/O ports 20 and performs all port controlling functions. Although the preferred embodiment utilizes RS-232-C protocol in handling data locally via the slave processing unit I/O ports, the present invention should not be interpreted as being limited to the use of RS-232-C protocol, as any conventional communications protocol may be used.

The slave processor unit 22 also sets data rates and handles the local direct communication with the RS-232 ports of one or more data or control cards. Data cards 25 and control cards 27 contain conventional electronics used to monitor and control equipment and conditions relatively local to an associated Terminal Unit or Data and Control Unit (for example, turbine battle shorting control via a control card output lines and Turbine Temperature monitoring via a Data Card input lines). The data cards 25 and control cards 27 are connected directly to the RS-232-C ports 20 of slave processing unit 22 as shown in FIG. 2. Slave processing unit 22 communicates with master processing unit 28 via bus lines 26 and 24. Slave processing unit 22 also includes a modem timer (not shown) for setting the baud rate for communicating with specific ports at a particular terminal location.

Under certain circumstances, slave processing unit 22 may be sending data at a relatively low transmission rate (e.g., 300 baud), and at the same time master processing unit 28 may be receiving data from another terminal unit at a much higher rate. Accordingly, it is necessary for slave processing unit 22 and master processing unit 28 to each have sufficient local storage capacity to provide adequate buffering to prevent loss of information due to differences in respective communication rates. In this regard, both the slave processing unit 22 and the master processing unit 28 include RAM buffers and a "mailbox" FIFO register interface (not shown). When the slave processing unit 22 needs to transmit data to the master processing unit 28 it sends a control byte to the master processing unit's mail box register. This control byte indicates to the master unit that data is ready to be sent.

MASTER PROCESSING UNIT

Master processing unit (MPU) 28 organizes data received from slave processing unit 22 and controls communications of information over the PLCC LAN. Slave processing unit 22 transmits data via parallel bus lines 26 to master processing unit 28. The master processing unit 28 converts this parallel data into a serial data string to form a message or a "sub-message". In the preferred embodiment of the present invention, a PLCC LAN message may comprise several "sub-messages" if it is desirous to send information to more than one node (e.g., in the "broadcast mode" previously discussed). HDLC is employed as a preferred serial communications protocol in the present exemplary embodiment and its requirements are well known in the art. A conventional HDLC communications controller chip may be used in a known manner in conjunction with the MPU to format the data according to protocol. Alternatively, the MPU itself may be programmed to format one or more standard HDLC sub-messages and assemble them into a single LAN message having a header and a footer in accordance with a preferred embodiment of the present invention. This program is stored in a local non-volatile memory (not shown) specifically dedicated to the MPU. Accordingly, a minimal exemplary PLCC serial LAN message contains a header (to assist receiver acquisition), a flag (indicating the start of the message), an address, a token, data bits, a cyclic redundancy check (CRC) bit for error detection, another flag (indicating the end of a message), and a message footer as illustrated in FIG. 11. In both the broadcast mode and the address mode the token bit indicates authority to transmit. Since only one transmitter can hold the token at any one time, simultaneous transmissions are prevented.

Referring again to FIG. 2, the master processing unit 28 transmits serial data bit streams via line 30 to transmit logic 42 and receives serial data bit streams via lines 38, clock signals via line 40 and a carrier detect signal via line 39 from receiver logic 44. Data is provided to transmit logic 42 at a rate determined by clock signals sent from transmit logic 42 via line 32. The data received by master processing unit 28 is at a rate determined by the clocking signals on line 40. The frequency of the clock signals received on lines 32 and 40 is at the transmitter clock frequency which is 55 kilohertz in the preferred embodiment. However, the system could also use different clock speeds in different directions, for example, in a one-master/many-slave configuration.

In communicating with transmit logic 42, master processing unit 28 transmits a "request-to-send" signal via line 36 to transmit logic 42. This request-to-send signal informs transmit logic 42 that master processing unit 28 has data that it desires to send. When transmit logic 42 is ready to receive data from the master processing unit 28 it sends a "clear-to-send" on line 34. Prior to sending the clear-to-send, transmit logic 42 sends an amp enable signal via line 46 to activate two-state amplifier 68. Transmit logic 42 then precedes a message sent from master processing unit 28 with a receiver initialization "header". In accordance with a preferred embodiment of the present invention, this header consists of a consecutive string of "one" bits in both the quadrature and in-phase channels. One skilled in the art would appreciate that a NRZ (non-return-to-zero) coding scheme does not recognize a serial string of "ones" as data. Consequently, with respect to recognition of the HDLC protocol message start flag, the header would be treated as nonexistent data (a null) and would have no effect. Similarly, a "footer" is also sent at the end of each OQPSK PLCC LAN message. As illustrated in FIG. 11, each PLCC LAN message may consist of one or more "sub-messages" of an HDLC protocol format prefaced by a header and followed by a footer. The format of the footer is essentially the same as that of the header but is slightly longer than one byte long.

The master processing unit (28) operates in a synchronous (i.e., an "even" driven), mode of operation. Thus, master processing unit 28 communicates with transmit logic 42, DAIEC controller 128 or slave processor unit 22, and in response to their individual requests initiates appropriate responsive actions. However, in accordance with a preferred embodiment the local area network can have only one transmitter active at a time (i.e., communications over the LAN is in half duplex). Therefore, whenever a particular terminal is transmitting, it can not receive and vice versa.

Master processing unit 28 packets parallel data received from Slave processing unit 22 and DAIEC 128. Master processing unit 28 also depackets all data received from the receiver logic 44 via line 38. Preferably, data packeting operations are accomplished by using a NRZ protocol. If a Terminal Unit's master processing unit 28 is in possession of a "token," that unit is permitted to transmit and all other units are prohibited from transmitting. Since there is only one token, simultaneous transmissions from a plurality of terminal units are prevented. Although communication over the LAN occurs in half-duplex, the present invention is not necessarily limited to half-duplex. For example, using frequency diversity multiplexing (FDM) a terminal unit could be simultaneously receiving on one frequency and transmitting on another.

Master processing unit 28 preferably includes both random access memory (RAM) and read only memory (ROM). Random access memory modules are used to store packeted and unpacketed data. The read only memory modules are used to store conventional microprocessor instructions for controlling the Master Processing units routine data handling/communication functions. Master processing unit 28 sends a control byte via line 24 to a "mailbox" register in the slave processing unit's memory indicating that it has data. However, the master processing unit must store that data until the slave processing unit indicates that it is ready to receive the data. When slave processing unit 22 indicates over line 26 that it is ready to receive data, master processing unit 28 transmits data to the slave unit.

TERMINAL UNIT TRANSMITTER SECTION

The Transmit section of Terminal Unit is illustrated in FIG. 2 and consists primarily of transmit logic circuit 42, High Voltage Interface 50, isolated linear power amplifier circuit 60 and power line coupler 70. Transmit logic 42 receives data packets from master processing unit 28 via line 30 and provides modulated data via output line 48 to high voltage isolation interface 50 for transmission over power lines 83. Data transmission over power lines 83 is accomplished by using two-state differential-input linear power amplifier 60 and power line coupling circuit 70. When the terminal unit is not transmitting data, two-state power amplifier 60 remains in an "idle" mode. In the idle mode (or "first" state) the amplifier exhibits a high output impedance and consumes very little power. Before any data is transmitted, transmit logic 42 is instructed by main processor unit 28 to generate an "amp enable" output signal on line 46.

If an "amp enable" signal is not present on line 46 the terminal unit operates, in effect, as if there is no two-state power amplifier circuit present. Preferably, the "request to send" signal from MPU 28 is utilized to trigger the production of an "amp enable" signal on line 46. The "amp enable" signal on line 46 is provided to High Voltage Interface 50 where it is current amplified (buffered) and inverted by amplifier 52. This amplified and inverted signal passes through fuses 54 and 55 and activates light emitting diode (LED) 61. The light from the LED optically energizes gate 67 and enables linear power amplifier circuit 60. Consequently, the amp enable signal brings amplifier 60 out of its quiescent state and into a data "transmit" mode.

In response to receiving data via line 30 from the master processing unit 28, transmit logic 42 produces modulated output data for transmission on line 48. The modulated data passes through high voltage interface 50, via interface buffer amplifier 53 and signal coupling transformer 63. Two-state linear power amplifier circuit 60 superimposes the high frequency modulated data onto the 440 volt power line via power line coupler circuit 70 for reception by other terminal units coupled to the same AC power line network. Any data thus transmitted onto power lines 83 reaches all terminal unit stations in a local area network defined by the AC power lines. Naturally, the receiver circuit section associated with a terminal unit that is transmitting ignores any data from its own transmitter on input lines 88 and 89.

TRANSMIT LOGIC

In accordance with a preferred embodiment of the present invention, transmit logic 42 utilizes ROM generated waveform techniques to provide Direct Digital Modulation (DDM) of the transmitted data. Some important advantages of utilizing ROM generated waveforms for DDM are the ability to construct the modulator circuit within a very small physical area and the fact that no adjustment or filtering is required to obtain flat group delay. The ROM generated waveform for modulated data output on line 48 controls the output waveform of the overall transmitter so as to be compatible with any power line transmission system. The modulated data thus produced has very low sideband content beyond the first harmonic of the modulating signal so that the modulated signal will not interfere with other common powerline equipment. Moreover, the phase of the modulated data is digitally derived which significantly reduces transmitter, power line and receiver induced phase error, and furthermore improves the overall noise immunity of the communications. In addition, the ROM generated waveform has no discontinuities which might create spurious transmission noise. This is accomplished by filtering the "I" channel signal and "Q" channel signal before it is digitized and stored in ROM so that a "level" transmission appears sinusoidal.

FIGS. 3 and 5A1–5A2 depict transmit logic 42 of FIG. 2 in greater detail. FIG. 3 is a diagrammatic block illustration of the transmit logic, whereas FIGS. 5A1 and 5A2 depict a detailed circuit diagram including exemplary preferred component values of transmit logic 42. The transmit logic modulation scheme employed by this circuit functions much along the same lines as an "analog processor", for example, as disclosed by Dr. Kamilo Feher in *Digital Communications Satellite/Earth Station Engineering*, Prentice-Hall, 1981. In a preferred exemplary embodiment of the present invention, the modulation scheme used is Offset Quadrature Phase Shift Keying (OQPSK). This scheme allows only one channel's data to change at a time. As illustrated in FIG. 3, the transmit logic modulator circuit consists primarily of data splitter 370, crystal oscillator 305, divide-by-N counter 310, read only memory (ROM) 315, and digital-to-analog converter (DAC) 320. ROM 315 contains the digitized RF modulated waveform data which is transformed to a modulated signal by DAC 320.

Referring now to FIGS. 4A–4E, an exemplary waveform map for modulated RF data is depicted in FIG. 4A as "rfd". FIGS. 4E and 4C depict the in-phase (id) and quadrature-phase (qd) baseband data waveforms. FIGS. 4D and 4B depict the in-phase (ic) and quadrature-phase (qc) carrier frequency waveforms offset by 22.5 degrees to allow for a zero volt "start-up" of the modulated RF data (rfd) waveform depicted in FIG. 4A. It is important to recognize that the exemplary id, gd, ic and qc waveforms depicted are not stored in ROM 315, but are shown simply to aid in understanding the derivation of a modulated RF data waveform. The only information actually stored in ROM 315 is the digitized binary numerical equivalent of a modulated RF data (rfd) waveform.

The following is a 16×128 table of digitized waveform values stored in ROM 315 for the preferred embodiment of the present invention described above (each decimal value represents the one-byte binary value stored in memory at the indicated locations starting sequentially with the first byte value at hexadecimal addr=000 and the last byte value at hex addr=7fe):

| HEX ADDR | 0 | 1 | 2 | 3 | 4 | 5 | 6 | 7 | 8 | 9 | a | b | c | d | e | f |
|---|---|---|---|---|---|---|---|---|---|---|---|---|---|---|---|---|
| 0 | 127 | 103 | 79 | 57 | 38 | 22 | 10 | 3 | 0 | 3 | 10 | 22 | 38 | 57 | 79 | 103 |
| 10 | 127 | 151 | 175 | 197 | 216 | 232 | 244 | 251 | 254 | 251 | 244 | 232 | 216 | 197 | 175 | 151 |
| 20 | 127 | 103 | 79 | 57 | 38 | 22 | 10 | 3 | 0 | 3 | 10 | 22 | 38 | 57 | 79 | 103 |
| 30 | 127 | 151 | 175 | 197 | 216 | 232 | 244 | 251 | 254 | 251 | 244 | 232 | 216 | 197 | 175 | 151 |
| 40 | 254 | 251 | 244 | 232 | 216 | 196 | 174 | 150 | 126 | 102 | 78 | 56 | 38 | 23 | 12 | 6 |
| 50 | 5 | 9 | 18 | 31 | 48 | 68 | 91 | 114 | 137 | 160 | 182 | 201 | 216 | 228 | 235 | 237 |
| 60 | 235 | 228 | 217 | 202 | 183 | 163 | 142 | 121 | 99 | 80 | 62 | 48 | 38 | 32 | 30 | 33 |
| 70 | 40 | 51 | 65 | 82 | 101 | 122 | 141 | 160 | 178 | 193 | 204 | 212 | 216 | 216 | 211 | 202 |
| 80 | 127 | 103 | 79 | 57 | 38 | 23 | 11 | 4 | 2 | 4 | 11 | 23 | 38 | 56 | 77 | 99 |
| 90 | 123 | 145 | 167 | 188 | 206 | 221 | 232 | 239 | 243 | 242 | 237 | 228 | 216 | 201 | 184 | 165 |
| a0 | 145 | 126 | 106 | 87 | 71 | 56 | 44 | 35 | 29 | 26 | 27 | 31 | 38 | 47 | 59 | 73 |
| b0 | 88 | 104 | 121 | 137 | 153 | 168 | 181 | 193 | 202 | 210 | 215 | 217 | 216 | 213 | 208 | 200 |
| c0 | 254 | 251 | 244 | 232 | 216 | 197 | 175 | 151 | 127 | 103 | 79 | 57 | 38 | 22 | 10 | 3 |
| d0 | 0 | 3 | 10 | 22 | 38 | 57 | 79 | 103 | 127 | 151 | 175 | 197 | 216 | 232 | 244 | 251 |
| e0 | 254 | 251 | 244 | 232 | 216 | 197 | 175 | 151 | 127 | 103 | 79 | 57 | 38 | 22 | 10 | 3 |
| f0 | 0 | 3 | 10 | 22 | 38 | 57 | 79 | 103 | 127 | 151 | 175 | 197 | 216 | 232 | 244 | 251 |
| 100 | 64 | 54 | 46 | 41 | 38 | 37 | 39 | 44 | 52 | 61 | 73 | 86 | 101 | 117 | 133 | 150 |
| 110 | 166 | 181 | 195 | 207 | 216 | 223 | 227 | 228 | 225 | 219 | 210 | 198 | 183 | 167 | 148 | 128 |
| 120 | 109 | 89 | 70 | 53 | 38 | 26 | 17 | 12 | 11 | 15 | 22 | 33 | 48 | 66 | 87 | 109 |
| 130 | 131 | 155 | 177 | 198 | 216 | 231 | 243 | 250 | 252 | 250 | 243 | 231 | 216 | 197 | 175 | 151 |
| 140 | 190 | 202 | 211 | 216 | 216 | 212 | 204 | 192 | 176 | 159 | 140 | 121 | 101 | 83 | 67 | 54 |
| 150 | 45 | 39 | 38 | 41 | 48 | 60 | 74 | 91 | 110 | 129 | 148 | 167 | 183 | 197 | 208 | 214 |
| 160 | 216 | 214 | 208 | 197 | 183 | 167 | 148 | 129 | 110 | 91 | 74 | 60 | 48 | 41 | 38 | 39 |
| 170 | 45 | 54 | 67 | 83 | 101 | 121 | 140 | 159 | 176 | 192 | 204 | 212 | 216 | 216 | 211 | 202 |
| 180 | 64 | 54 | 46 | 41 | 38 | 38 | 40 | 45 | 53 | 62 | 74 | 87 | 101 | 117 | 131 | 146 |
| 190 | 161 | 175 | 187 | 197 | 206 | 212 | 215 | 216 | 215 | 210 | 204 | 194 | 183 | 171 | 157 | 142 |
| 1a0 | 127 | 112 | 97 | 83 | 71 | 60 | 50 | 44 | 39 | 38 | 39 | 42 | 48 | 57 | 67 | 79 |
| 1b0 | 93 | 108 | 123 | 137 | 153 | 167 | 180 | 192 | 201 | 209 | 214 | 216 | 216 | 213 | 208 | 200 |
| 1c0 | 190 | 202 | 211 | 216 | 216 | 212 | 204 | 193 | 178 | 160 | 141 | 122 | 101 | 82 | 65 | 51 |
| 1d0 | 40 | 33 | 30 | 32 | 38 | 48 | 62 | 80 | 99 | 121 | 142 | 163 | 183 | 202 | 217 | 228 |
| 1e0 | 235 | 237 | 235 | 228 | 216 | 201 | 182 | 160 | 137 | 114 | 91 | 68 | 48 | 31 | 18 | 9 |
| 1f0 | 5 | 6 | 12 | 23 | 38 | 56 | 78 | 102 | 126 | 150 | 174 | 196 | 216 | 232 | 244 | 251 |
| 200 | 64 | 52 | 43 | 38 | 38 | 42 | 50 | 61 | 76 | 94 | 113 | 132 | 153 | 172 | 189 | 203 |
| 210 | 214 | 221 | 224 | 222 | 216 | 206 | 192 | 174 | 155 | 133 | 112 | 91 | 71 | 52 | 37 | 26 |
| 220 | 19 | 17 | 19 | 26 | 38 | 53 | 72 | 94 | 117 | 140 | 163 | 186 | 206 | 223 | 236 | 245 |
| 230 | 249 | 248 | 242 | 231 | 216 | 198 | 176 | 152 | 128 | 104 | 80 | 58 | 38 | 22 | 10 | 3 |
| 240 | 190 | 200 | 208 | 213 | 216 | 216 | 214 | 209 | 201 | 192 | 180 | 167 | 153 | 137 | 123 | 108 |
| 250 | 93 | 79 | 67 | 57 | 48 | 42 | 39 | 38 | 39 | 44 | 50 | 60 | 71 | 83 | 97 | 112 |
| 260 | 127 | 142 | 157 | 171 | 183 | 194 | 204 | 210 | 215 | 216 | 215 | 212 | 206 | 197 | 187 | 175 |
| 270 | 161 | 146 | 131 | 117 | 101 | 87 | 74 | 62 | 53 | 45 | 40 | 38 | 38 | 41 | 46 | 54 |
| 280 | 64 | 52 | 43 | 38 | 38 | 42 | 50 | 62 | 78 | 95 | 114 | 133 | 153 | 171 | 187 | 200 |
| 290 | 209 | 215 | 216 | 213 | 206 | 194 | 180 | 163 | 144 | 125 | 106 | 87 | 71 | 57 | 46 | 40 |
| 2a0 | 38 | 40 | 46 | 57 | 71 | 87 | 106 | 125 | 144 | 163 | 180 | 194 | 206 | 213 | 216 | 215 |
| 2b0 | 209 | 200 | 187 | 171 | 153 | 133 | 114 | 95 | 78 | 62 | 50 | 42 | 38 | 38 | 43 | 52 |
| 2c0 | 190 | 200 | 208 | 213 | 216 | 217 | 215 | 210 | 202 | 193 | 181 | 168 | 153 | 137 | 121 | 104 |
| 2d0 | 88 | 73 | 59 | 47 | 38 | 31 | 27 | 26 | 29 | 35 | 44 | 56 | 71 | 87 | 106 | 126 |
| 2e0 | 145 | 165 | 184 | 201 | 216 | 228 | 237 | 242 | 243 | 239 | 232 | 221 | 206 | 188 | 167 | 145 |
| 2f0 | 123 | 99 | 77 | 56 | 38 | 23 | 11 | 4 | 2 | 4 | 11 | 23 | 38 | 57 | 79 | 103 |
| 300 | 0 | 3 | 10 | 22 | 38 | 57 | 79 | 103 | 127 | 151 | 175 | 197 | 216 | 232 | 244 | 251 |
| 310 | 254 | 251 | 244 | 232 | 216 | 197 | 175 | 151 | 127 | 103 | 79 | 57 | 38 | 22 | 10 | 3 |
| 320 | 0 | 3 | 10 | 22 | 38 | 57 | 79 | 103 | 127 | 151 | 175 | 197 | 216 | 232 | 244 | 251 |
| 330 | 254 | 251 | 244 | 232 | 216 | 197 | 175 | 151 | 127 | 103 | 79 | 57 | 38 | 22 | 10 | 3 |
| 340 | 127 | 151 | 175 | 197 | 216 | 231 | 243 | 250 | 252 | 250 | 243 | 231 | 216 | 198 | 177 | 155 |
| 350 | 131 | 109 | 87 | 66 | 48 | 33 | 22 | 15 | 11 | 12 | 17 | 26 | 38 | 53 | 70 | 89 |
| | 109 | 128 | 148 | 167 | 183 | 198 | 210 | 219 | 225 | 228 | 227 | 223 | 216 | 207 | 195 | 181 |
| | 166 | 150 | 133 | 117 | 101 | 86 | 73 | 61 | 52 | 44 | 39 | 37 | 38 | 41 | 46 | 54 |

-continued

| HEX ADDR | 0 | 1 | 2 | 3 | 4 | 5 | 6 | 7 | 8 | 9 | a | b | c | d | e | f |
|---|---|---|---|---|---|---|---|---|---|---|---|---|---|---|---|---|
|  | 0 | 3 | 10 | 22 | 38 | 58 | 80 | 104 | 128 | 152 | 176 | 198 | 216 | 231 | 242 | 248 |
|  | 249 | 245 | 236 | 223 | 206 | 186 | 163 | 140 | 117 | 94 | 72 | 53 | 38 | 26 | 19 | 17 |
|  | 19 | 26 | 37 | 52 | 71 | 91 | 112 | 133 | 155 | 174 | 192 | 206 | 216 | 222 | 224 | 221 |
|  | 214 | 203 | 189 | 172 | 153 | 132 | 113 | 94 | 76 | 61 | 50 | 42 | 38 | 38 | 43 | 52 |
|  | 127 | 151 | 175 | 197 | 216 | 232 | 244 | 251 | 254 | 251 | 244 | 232 | 216 | 197 | 175 | 151 |
|  | 127 | 103 | 79 | 57 | 38 | 22 | 10 | 3 | 0 | 3 | 10 | 22 | 38 | 57 | 79 | 103 |
|  | 127 | 151 | 175 | 197 | 216 | 232 | 244 | 251 | 254 | 251 | 244 | 232 | 216 | 197 | 175 | 151 |
|  | 127 | 103 | 79 | 57 | 38 | 22 | 10 | 3 | 0 | 3 | 10 | 22 | 38 | 57 | 79 | 103 |
| 400 | 127 | 103 | 79 | 57 | 38 | 22 | 10 | 3 | 0 | 3 | 10 | 22 | 38 | 57 | 79 | 103 |
|  | 127 | 151 | 175 | 197 | 216 | 232 | 244 | 251 | 254 | 251 | 244 | 232 | 216 | 197 | 175 | 151 |
|  | 127 | 103 | 79 | 57 | 38 | 22 | 10 | 3 | 0 | 3 | 10 | 22 | 38 | 57 | 79 | 103 |
|  | 127 | 151 | 175 | 197 | 216 | 232 | 244 | 251 | 254 | 251 | 244 | 232 | 216 | 197 | 175 | 151 |
|  | 190 | 175 | 157 | 138 | 119 | 99 | 81 | 65 | 52 | 42 | 36 | 35 | 38 | 45 | 56 | 71 |
|  | 88 | 108 | 128 | 149 | 169 | 187 | 204 | 216 | 225 | 230 | 230 | 225 | 216 | 203 | 186 | 167 |
|  | 145 | 123 | 100 | 78 | 58 | 41 | 26 | 17 | 11 | 11 | 15 | 24 | 38 | 55 | 76 | 98 |
|  | 123 | 146 | 170 | 193 | 212 | 229 | 241 | 249 | 252 | 250 | 243 | 232 | 216 | 197 | 175 | 151 |
|  | 190 | 178 | 165 | 150 | 135 | 121 | 105 | 90 | 76 | 64 | 53 | 44 | 38 | 34 | 33 | 35 |
|  | 40 | 47 | 58 | 70 | 85 | 102 | 119 | 136 | 155 | 172 | 189 | 204 | 216 | 226 | 233 | 236 |
|  | 235 | 230 | 222 | 211 | 196 | 178 | 159 | 138 | 117 | 95 | 74 | 55 | 38 | 24 | 13 | 7 |
|  | 5 | 8 | 15 | 26 | 42 | 60 | 81 | 105 | 128 | 152 | 175 | 197 | 216 | 232 | 244 | 251 |
|  | 254 | 251 | 244 | 232 | 216 | 197 | 175 | 151 | 127 | 103 | 79 | 57 | 38 | 22 | 10 | 3 |
|  | 0 | 3 | 10 | 22 | 38 | 57 | 79 | 103 | 127 | 151 | 175 | 197 | 216 | 232 | 244 | 251 |
|  | 254 | 251 | 244 | 232 | 216 | 197 | 175 | 151 | 127 | 103 | 79 | 57 | 38 | 22 | 10 | 3 |
|  | 0 | 3 | 10 | 22 | 38 | 57 | 79 | 103 | 127 | 151 | 175 | 197 | 216 | 232 | 244 | 251 |
| 500 | 0 | 3 | 10 | 22 | 38 | 57 | 79 | 102 | 126 | 149 | 173 | 194 | 212 | 228 | 239 | 246 |
|  | 249 | 247 | 241 | 230 | 216 | 199 | 180 | 159 | 137 | 116 | 95 | 76 | 58 | 43 | 32 | 24 |
|  | 19 | 18 | 21 | 28 | 38 | 50 | 65 | 82 | 99 | 118 | 135 | 152 | 169 | 184 | 196 | 207 |
|  | 214 | 219 | 221 | 220 | 216 | 210 | 201 | 190 | 178 | 164 | 149 | 133 | 119 | 104 | 89 | 76 |
|  | 64 | 76 | 89 | 104 | 119 | 133 | 148 | 163 | 176 | 188 | 199 | 207 | 212 | 216 | 216 | 214 |
|  | 209 | 202 | 193 | 182 | 169 | 155 | 140 | 125 | 110 | 95 | 81 | 69 | 58 | 49 | 43 | 39 |
|  | 38 | 39 | 43 | 49 | 58 | 69 | 81 | 95 | 110 | 125 | 140 | 155 | 169 | 182 | 193 | 202 |
|  | 209 | 214 | 216 | 216 | 212 | 207 | 199 | 188 | 176 | 163 | 148 | 133 | 119 | 104 | 89 | 76 |
|  | 64 | 79 | 97 | 117 | 135 | 155 | 173 | 188 | 201 | 210 | 215 | 216 | 212 | 205 | 193 | 178 |
|  | 161 | 142 | 123 | 104 | 85 | 69 | 55 | 45 | 39 | 38 | 40 | 47 | 58 | 72 | 89 | 108 |
|  | 127 | 146 | 165 | 182 | 196 | 207 | 214 | 216 | 215 | 209 | 199 | 185 | 169 | 150 | 131 | 112 |
|  | 93 | 76 | 61 | 49 | 42 | 38 | 39 | 44 | 53 | 66 | 81 | 99 | 119 | 137 | 157 | 175 |
|  | 127 | 151 | 175 | 197 | 216 | 232 | 243 | 250 | 252 | 249 | 241 | 229 | 212 | 193 | 170 | 146 |
|  | 123 | 98 | 76 | 55 | 38 | 24 | 15 | 11 | 11 | 17 | 26 | 41 | 58 | 78 | 100 | 123 |
|  | 145 | 167 | 186 | 203 | 216 | 225 | 230 | 230 | 225 | 216 | 204 | 187 | 169 | 149 | 128 | 108 |
|  | 88 | 71 | 56 | 45 | 38 | 35 | 36 | 42 | 52 | 65 | 81 | 99 | 119 | 138 | 157 | 175 |
| 600 | 127 | 103 | 79 | 57 | 38 | 22 | 11 | 4 | 2 | 5 | 13 | 25 | 42 | 61 | 84 | 108 |
|  | 131 | 156 | 178 | 199 | 216 | 230 | 239 | 243 | 243 | 237 | 228 | 213 | 196 | 176 | 154 | 131 |
|  | 109 | 87 | 68 | 51 | 38 | 29 | 24 | 24 | 29 | 38 | 50 | 67 | 85 | 105 | 126 | 146 |
|  | 166 | 183 | 198 | 209 | 216 | 219 | 218 | 212 | 202 | 189 | 173 | 155 | 135 | 116 | 97 | 79 |
|  | 190 | 175 | 157 | 137 | 119 | 99 | 81 | 66 | 53 | 44 | 39 | 38 | 42 | 49 | 61 | 76 |
|  | 93 | 112 | 131 | 150 | 169 | 185 | 199 | 209 | 215 | 216 | 214 | 207 | 196 | 182 | 165 | 146 |
|  | 127 | 108 | 89 | 72 | 58 | 47 | 40 | 38 | 39 | 45 | 55 | 69 | 85 | 104 | 123 | 142 |
|  | 161 | 178 | 193 | 205 | 212 | 216 | 215 | 210 | 201 | 188 | 173 | 155 | 135 | 117 | 97 | 79 |
| 680 | 190 | 178 | 165 | 150 | 135 | 121 | 106 | 91 | 78 | 66 | 55 | 47 | 42 | 38 | 38 | 40 |
| 690 | 45 | 52 | 61 | 72 | 85 | 99 | 114 | 129 | 144 | 159 | 173 | 185 | 196 | 205 | 211 | 215 |
| 6a0 | 216 | 215 | 211 | 205 | 196 | 185 | 173 | 159 | 144 | 129 | 114 | 99 | 85 | 72 | 61 | 52 |
|  | 45 | 40 | 38 | 38 | 42 | 47 | 55 | 66 | 78 | 91 | 106 | 121 | 135 | 150 | 165 | 178 |
|  | 254 | 251 | 244 | 232 | 216 | 197 | 175 | 152 | 128 | 105 | 81 | 60 | 42 | 26 | 15 | 8 |
|  | 5 | 7 | 13 | 24 | 38 | 55 | 74 | 5 | 117 | 138 | 159 | 178 | 196 | 211 | 222 | 230 |
|  | 235 | 236 | 233 | 226 | 216 | 204 | 189 | 172 | 155 | 136 | 119 | 102 | 85 | 70 | 58 | 47 |
|  | 40 | 35 | 33 | 34 | 38 | 44 | 53 | 64 | 76 | 90 | 105 | 121 | 135 | 150 | 165 | 178 |
| 700 | 0 | 3 | 10 | 22 | 38 | 57 | 79 | 103 | 127 | 151 | 175 | 197 | 216 | 232 | 244 | 251 |
|  | 254 | 251 | 244 | 232 | 216 | 197 | 175 | 151 | 127 | 103 | 79 | 57 | 38 | 22 | 10 | 3 |
|  | 0 | 3 | 10 | 22 | 38 | 57 | 79 | 103 | 127 | 151 | 175 | 197 | 216 | 232 | 244 | 251 |
|  | 254 | 251 | 244 | 232 | 216 | 197 | 175 | 151 | 127 | 103 | 79 | 57 | 38 | 22 | 10 | 3 |
|  | 64 | 76 | 89 | 104 | 119 | 133 | 149 | 164 | 178 | 190 | 201 | 210 | 216 | 220 | 221 | 219 |
|  | 214 | 207 | 196 | 184 | 169 | 152 | 135 | 118 | 99 | 82 | 65 | 50 | 38 | 28 | 21 | 18 |
|  | 19 | 24 | 32 | 43 | 58 | 76 | 95 | 116 | 137 | 159 | 180 | 199 | 230 | 241 | 247 | 249 |
|  | 246 | 239 | 228 | 212 | 194 | 173 | 149 | 126 | 102 | 79 | 57 | 38 | 22 | 10 | 3 | 64 |
|  | 79 | 97 | 116 | 135 | 155 | 173 | 189 | 202 | 212 | 218 | 219 | 216 | 209 | 198 | 183 | 166 |
|  | 146 | 126 | 105 | 85 | 67 | 50 | 38 | 29 | 24 | 24 | 29 | 38 | 51 | 68 | 87 | 109 |
|  | 131 | 154 | 176 | 196 | 213 | 228 | 237 | 243 | 243 | 239 | 230 | 216 | 199 | 178 | 156 | 131 |
|  | 108 | 84 | 61 | 42 | 25 | 13 | 5 | 2 | 4 | 11 | 22 | 38 | 57 | 79 | 103 | 127 |
|  | 151 | 175 | 197 | 216 | 232 | 244 | 251 | 254 | 251 | 244 | 232 | 216 | 197 | 175 | 151 | 127 |
|  | 103 | 79 | 57 | 38 | 22 | 10 | 3 | 0 | 3 | 10 | 22 | 38 | 57 | 79 | 103 | 127 |
|  | 151 | 175 | 197 | 216 | 232 | 244 | 251 | 254 | 251 | 244 | 232 | 216 | 197 | 175 | 151 | 127 |
| 740 | 103 | 79 | 57 | 38 | 22 | 10 | 3 | 0 | 3 | 10 | 22 | 38 | 57 | 79 | 103 |  |

Referring back to FIG. 3, data splitter 370 performs two different and distinct functions. The first is to split input data from master processing unit 28 on line 30 into two orthogonal data channels (i.e., a logic Qd channel and a logic Id channel). These orthogonal data channels are the in-phase data, LID, and quadrature-phase data, LQD, respectively. These channels each have half the symbol rate (i.e., half the bandwidth), of the input data on line 30. Secondly, data splitter 370 (discussed in detail below) provides the proper address signals to obtain the desired output waveform to be obtained from ROM 315 during the next symbol interval of the input data stream on line 30. This is accomplished by encoding two bits of input to ROM 315 for each channel and one bit from clock counter 310. The input data on line 30, thus, is used to form five of the address inputs to ROM 315, which are labelled in FIG. 3, as A6, A7, A8, A9 and A10. The remaining address inputs A0–A5 are obtained from divide-by-N ripple counter 310. A more detailed diagram of an exemplary preferred embodiment for data splitter 370 is shown in FIGS. 5A1 and 5A2 using the same numerical notation for components.

Referring now to FIGS. 5A1 and 5A2, crystal oscillator circuit 305 produces a 14.08 MHz clock signal which is divided by ripple counter 310 to generate clock pulse (CP) and address inputs to ROM 315. The output of ROM 315 is provided to DAC 320 which produces an analog modulated data signal on line 321. This signal is filtered by op-amp 322 and provided to the High Voltage Interface circuit 50 via line 48.

After the Transmit Logic receives a request to send (RTS) signal from the MPU and the header delay provided by multivibrator circuit 342 times out, D-type flip flop 343 sends a "clear to send" signal via line 34 to master processing unit 28. Ripple counter 341 is used to recognize a "footer" at the end of a LAN message.

TRANSMITTER HIGH VOLTAGE INTERFACE

As depicted in FIGS. 2 and 5B, amplifier interface 50, provides 7500 VAC isolation for high voltage protection during a fault. This is required since the isolated power amplifier 60 will be at 440 VAC in some applications. Amp enable signal input 46 and the modulated data signal input 48 to isolated power amplifier 60 are protected via high voltage amplifier interface 50. Fuzes 54 and 55 protect the amplifier enable interface. Fuzes 57 and 58 protect the modulated data interface. The fuses in amplifier interface 50 provide protection against any extremely high voltages appearing through two-state power amplifier 60 due to, for example, a lightening strike or a fault in opto-coupler 67. High Voltage interface circuit 50 may also include an inverting buffer (i.e., a current driver) 52 and amplifier 53 that amplifies the signals on input lines 46 and 48, respectively. This protection circuitry also includes diodes 41, 43, 44, and 45 that will conduct whenever an overvoltage exists, thus aiding the opening of fuzes 54, 55, 57, and 58. Resistors 35 and 47 provide current limiting to protect drivers 53 and 52 at the diode turn-on voltage levels.

TRANSMITTER LINEAR OUTPUT POWER AMPLIFIER

As previously mentioned above, the transmitter power amplifier circuit section (60) of the terminal unit operates in one of two modes: an idle/receive mode or a transmit mode. When the terminal unit is receiving, the two-state power amplifier 60 is in its idle mode. In this mode, power amplifier 60 draws only a very small amount of current. In addition to conserving power usage, the idle mode allows the use of a smaller power amplifier heat sink. In addition, while in the idle/receive mode, power amplifier circuit 60 has a high output impedance. This resultant increase in output impedance of the transmitter from less than one ohm in the transmit mode to several hundred ohms in the idle/receive mode improves the overall impedance characteristics of the terminal unit. Moreover, the increase in terminal unit receive mode impedance prevents power line ladder attenuation and results in improved receiver signal strength and reduced terminal error rates.

During transmission, the two state power amplifier 60 must first be turned on and brought up to the appropriate power level. In the transmit mode, the power amplifier's output impedance is very low. In this way, the transmitter output cannot be inter-modulated by power line noise. Thus, the transmitter used in the present invention reduces power line noise of a signal propagated along the power line 83.

As depicted in FIG. 2, two-state power amplifier section 60 includes a power amplifier 68 that is coupled to a 440 volt power line 83 through power line coupled circuit 70. Amplifier 68 is preferably a class AB amplifier capable of delivering adequate current to the load on demand. Amplifier 68 remains at a floating potential on AC power line 83. Inputs 57 and 58 of amplifier 68 are isolated by a small signal coupling transformer 63 having a primary 62 windings and secondary windings 64. Modulated data is coupled from primary 62 of transformer 63 to secondary 64. Modulated data passes from secondary 64 of transformer 63 through fuzes 57 and 58 to the RF inputs of amplifier 68.

Two state power amplifier transmitter section 60 also comprises an optical isolator 65 which includes light emitting diode 61. The light emitting diode generates an optical signal in response to an amp enable signal from high-voltage interface 50. That optical signal energizes gate 67 enabling amplifier 68. Thus, the terminal is kept isolated from the 440 volt power line by floating two-state amplifier circuit section 60. Amplifier 68 is preferably a linear differential amplifier to minimize spurious radiation.

Referring now to FIGS. 5B1 and 5B2, a preferred exemplary embodiment of the two-state isolated linear power amplifier circuit 60 is depicted in greater detail. Overall power for amplifier circuit 60 is provided by ±35 V unregulated power supply circuit section 600 from an isolated AC voltage source 601 (not shown). Differential amplifier U2 is powered by a ±15 volt regulated power supply comprising voltage regulator V17 and V18, which operate off of the ±35 unregulated voltage source 600. Unregulated voltage source 600 also provides ±35 V power to output FET's Q5 and Q6, as well as current drivers Q3 and Q4. Operational Amplifier (Op Amp) 69 (U1) receives power via resistors R9, R10, R43 and R44, decoupling capacitors C2, C4, C6, C8 and C9 and an active voltage "bootstrapping" network 500. Bootstrapping network 500 consists primarily of resistors R5, R6, R7 and R8, Zener diodes X2 and X3, voltage source regulating transistors Q1 and Q2 and capacitor C3. Since it is desirable that output voltage of amplifier circuit 60 be able to vary over a range of ±12.5 volts (or greater, if needed) peak in linear response to its input, a voltage bootstraping arrangement is required. This is because conventional operational amplifiers typically cannot be powered from ±35 volts and having a maximum allowable power supply voltage of ±19 volts, op-amp 69 operates linearly only within an output range of ±12–14 volts. Thus, using the maximum differential power supply voltage of ±19 volts in combination with the voltage bootstrapping and current driving network 500, op-amp 69 (U1) can drive the output FETs, Q5 and Q6, to operate in the required output range of ±20 volts in a linear fashion.

Electronic switches U16/A, U16/B and U3/A, U3/B require a plus voltage on pin 11 (e.g., FLTGND+17 V), a minus voltage on pin 14 (i.e., FLTGND−17 V) and a common floating ground potential on pin 13 (i.e., FLTGND). Switches U16 and U3 also require a logic level voltage (i.e., FLT+6.8 V) on pin 12. Moreover, switches U16 and U3 also use the same voltage source for power as op-amp 69 (U1) since all three devices must work together. Zener diode X12 provides the +6.8 voltage (i.e., FLT+6.8 V) for logic level control signals.

In FIG. 8, a graphical representation of the relationships of voltages in the bootstrapping network of the isolated linear power amplifier shown in FIGS. 5B1 and 5B2 is depicted. The voltage waveforms shown in FIG. 8, from top to bottom, are floating ground plus 19 volts (FLTGND+19 V) 801, floating ground plus 6.8 volts (FLT+6.8 V) 802, floating ground (FLTGND) 803 and floating ground minus 19 volts (FLTGND−19 V) 804, respectively from top to bottom. The flat parallel lines to the left of vertical dotted line 805 in FIG. 8 represent the various voltages without modulation. The waveforms to the right of vertical dotted line 805 represent the power supply voltages for opto-isolator 65, op-amp 69 (U1), and switches U3 and U16 during modulation.

Referring to FIGS. 8, 5B1 and 5B2, amplifier U1, and switches U3 and U16 operate with power supply voltages of ±19 volts (801 and 804) referenced to their floating ground (FLTGND). These components are driven by the input signal such that the difference between the input signal and the power supply voltage is large enough for U2, U3 and U16 to operate in their linear region. The use of differential op-amp U2 insures a symmetrical impedance with respect to ground. Regulated power for op-amp U2 is provided by voltage regulators U17 and U18. Opto-isolator 65, which drives switches U3 and U16, receives 6.8 V floating power (FLTGND+6.8 V) via the bootstrap network. The FLTGND+6.8 V is used to power the gated part of opto-isolator 65 and also sets the trigger logic level (at pin 12) for switches U3 and U16.

As previously discussed, the linear power amplifier 60 circuit has two states (or modes) of operation: a dormant or "disabled" state (idle/receive mode) and an active or "enabled" state (transmit mode). The two-state enable/disable signal obtained from the logic side of opto-isolator 65 (at pin 4) is provided to the control inputs (pins 10 and 15, respectively) of switches U3 and U16. FIGS. 5B1 and 5B2 depict switches U16 and U3 in the amplifier enabled position. In the "disable" position, switches U16/A and U16/B ensure that FETs Q5 and Q6 are turned off by connecting their gates to their source. Similarly, in the "disable" position, switch U3/B closes a feedback path around op-amp U1 (resulting in near zero gain) and U3/A connects the input of op-amp U1 to a hot ground (hotgnd) and opens (disconnects) the data path from differential op-amp U2 to op-amp U1.

The modulated data signal (MODDATA) from transmit logic 42 is input on line 48 through transformer XM1 to power amplifier circuit 60. Resistor R40 sets the quality factor or "Q" point of transformer XM1. The differential input circuitry consists of op-amp U2, and resistors R48, R47, R46 and R36. This differential input circuit functions to keep the total impedance of the amplifier balanced to ground. The signal then passes through switch U3/A into an input network, consisting of resistors R1, R2, and R3, of op-amp U1. Feedback for U1 is provided via line 502 from the output of the complete power amplifier circuit 60 and back through R4 and C1. C1 serves to limit the high frequency response of the amplifier 60. The signal passes from the output of U1 to current driver transistors Q3 and Q4 via symmetrical "bootstrap" network comprising resistors R5, R6, R7 and R8. The resistor network sets the current for Zener diodes X2 and X3 which, in turn, sets the operating points for Q3 and Q4. Base Resistors R11 and R12 limit the drive current available to Q3 and Q4. The network consisting of capacitor C7, resistors R14, R13, and R39, potentiometer P1 and FET Q7 functions as a temperature sensitive voltage regulator with two outputs at respective gates of FET's Q5 and Q6. FET Q7 is mounted on the same heat sink with Q5 and Q6. Q7 adjusts the gate voltages of Q5 and Q6 to hold the operating current constant despite changes in heat sink temperature. Changes in heat sink temperature are usually due to changes in the load of amplifier 60 and changes in ambient temperature. Diodes X4 and X5 are high current diodes that protect FETs Q5 and Q6 from reverse voltages when the amplifier is disabled. Resistor R19 functions as bleeder resistor for output capacitor C12.

TRANSMITTER POWER LINE COUPLER

As depicted in FIGS. 2 and 5B2, power line coupler network 70, consisting of metal oxide varistor MOV1, resistors R21, and R20 and inductor L1, functions to limit the power line voltage appearing at the output of power amplifier circuit 60 when the power amplifier is disabled (i.e., in its high impedance state). Whenever amplifier 60 is enabled or disabled, it can produce power line transients that are large enough to destroy output FETs Q5 and Q6. Metal oxide varistor, MOV1, protects these FET's from such transients. Series resistor R21 and parallel resistor R20 lower the series and parallel Q of inductor L1. Moreover, inductor L1 has a very low impedance at 60 hertz and thus reduces any 60 hertz voltage which may be felt at the output of the two-state power amplifier circuit 60. Output capacitor C12 serves to block any 440 volt, 60 hertz signals from entering amplifier 60 (via its output). Additionally, capacitor C12 permits transmission of the high frequency output RF signals from power amplifier circuit 60. Fuse 80 is provided for overload protection. Moreover, Inductor L1 is tuned to a predetermined desired center frequency for the transmissions (preferably while the transmitter is disabled and with both transmitter and receiver cards connected this assures that the terminal unit, when in the receive mode, looks like a high resistive impedance at the center frequency of the receiver).

TERMINAL UNIT RECEIVER

The dynamic range of a receiver, as used in a LAN environment in accordance with the present invention is an important design criterion which must be taken into consideration. More specifically, since terminal units are located at varying distances from one another, the differences in received signal amplitudes are significant. Therefore, a receiver must be able to process signals that vary in amplitude over a range of at least 60 db. Moreover, variations in received signal amplitude can change the acquisition time of the receiver. For example, if a receiver having a linear input is used, then the smaller the received signal amplitude, the longer the acquisition time. Accordingly, in a preferred embodiment of the present invention, a high gain zero crossing detector (i.e., comparator 102) is used in a Pre-detection Receiver circuit 90 to eliminate this problem.

The receiver section of a Terminal Unit, as generally depicted in FIG. 2, consists primarily of pre-detection receiver circuit 90 and receiver logic 44. When a terminal unit is not transmitting, signals from other units in the LAN are received from AC power lines 83 via input lines 88 and 89.

PRE-DETECTION RECEIVER SECTION

Pre-detection receiver 90 includes fuse 94, a passive linear phase bandpass filter 101, limiter 91, comparator 102 and an insulating/isolating opto-coupler consisting of LED 104 and light activated logic gate 106. Filter network 101, depicted in detail in FIG. 9A1, consists of capacitor 82, transformer 100, and an RLC network which, including the transformer, comprises four bandpass and four all-pass poles. A received signal from the AC power lines is coupled to the primary coil of transformer 100 through resistor 84 and capacitor 82. The impedance of capacitor 82 and resistor 84 combined with the input impedance of transformer 100 comprise the overall input impedance for passive linear phase bandpass filter network 101. This input impedance is preferably made large in comparison to the AC power line impedance through the use of an appropriate value for resistor 84 in order to swamp any deleterious effects on filter performance due to changes in AC power line impedance. Fuses 94 and 95 are provided to protect the receiver circuit against input network component failure.

A high common mode rejection transformer 100 is provided since a large part of power line noise is common mode noise. (A common mode noise signal, in this case, is a noise signal with a voltage varying over time identically on both primary coil conductors.) Ordinarily, if a transformer couples common mode signals into its secondary, such signals cannot be measured or filtered and will severely limit the performance of the receiver 44. Conventionally, it has been difficult to get a transformer to have a common mode rejection ratio of greater than about 30 db at the transmitter frequency. In accordance with the present invention, transformer 100 provides a common mode rejection ratio of greater than 130 db at or above the carrier frequency. This high common mode rejection comes by attention to detail in a number of areas. Specifically, the transformer 100 must be provided with "box-shielded" primary and secondary windings. Preferably, the box-shield contemplated by the present preferred embodiment utilizes a non-shorted copper enclosure for each winding. In addition, the isolation from transformer primary to secondary must be at least 3000 VAC, and the "zero-signal" reference potential point is connected to the box-shield. In the preferred embodiment, all transmitter commons are connected to the same power line, which acts as a zero-signal reference potential (i.e., the box-shielded primary is connected to transmitter common and the box-shielded secondary is connected to the single point ground potential of the secondary).

In accordance with the present invention, the box-shield is preferably constructed utilizing a special double-sided metallic tape wherein one side of the tape is copper and the other side is insulation (e.g., Tapecon tape part number 3M56). The double sided tape is wound, over the transformer coil (metal side facing inward) and ordinary insulating tape, such as Teflon tape, is wound over the double sided tape. This second layer of TEFLON tape provides the necessary primary to secondary insulation. The transformer is then placed in a metal enclosure. The present invention is not to be construed as being limited to this particular transformer design, however, and other equivalent embodiments that use common mode rejection or improve non-shorting shielding characteristics within the transformer are considered within the spirit and scope of the present invention. Accordingly, it is also contemplated that the above transformer design can be used in non-instrument applications where it is important to prevent common mode power transients from propagating through an electrical distribution system. (One such example, particularly applicable on a military ship, would be to prevent the deleterious results a ship experiences as from the effects of an Electromagnetic Magnetic Pulse (EMP) associated with a nuclear detonation).

Referring again to FIG. 9A, received signals pass through linear phase passive bandpass filter circuit 101, limiter circuit 91, and pre-detection receiver comparator circuit 102. Comparator circuit 102 has a high gain and hard limiting characteristics. The output of comparator circuit 102 is optically coupled to receiver logic 44 via light emitting diode 104 and gate 106. This optically isolated output provides a low noise environment for receiver logic 44. In addition, pre-detection receiver section 90 is preferably completely shielded to provide further noise reduction and in the receipt of low level information signals.

A low noise power supply (not shown) utilizing a high common mode transformer, as previously discussed above, is also contemplated for providing power to comparator circuit 102. Thus, most of the noise in pre-detection receiver circuit 90 after the secondary of the power transformer will be "differential" mode noise, which ordinarily is noise that can be rectified and then filtered. High frequency differential noise, however, is typically difficult to rectify. For that reason, the power supply employs high frequency switching diodes. A power line filter is also used to further attenuate any residual power line noise. The resulting DC power supply noise is less than −90 db. Moreover, pre-detection receiver comparator circuit 102 has a high degree of common mode rejection.

Limiter circuit 91, consisting of four diodes arranged in the configuration shown in FIG. 9A2, prevents power line noise from damaging op-amp 103 of comparator circuit 102 while maintaining the leakage currents on the inputs of comparator 103 equal. In addition, op-amp 103 provides an input impedance which matches the impedance requirements of passive linear phase bandpass filter circuit 101. A passive linear phase bandpass filter is used instead of a active linear phase bandpass filter because of the adverse effects the signal limiting characteristics inherent in an active filter have on received data. For example, if a 100 volt, 12 Khz noise spike arrives at a receiver that utilizes a passive filter with 80 db of rejection, no compression of the data will result at that frequency. However, this is not the case when using an active bandpass filter since any noise present will tend to clip the data signal due to the inherent signal "limiting" action of the active filter.

RECEIVER LOGIC

As depicted in FIG. 2, receiver logic 44 provides Master Processing unit 28 with a carrier detect signal via line 39, receives data via line 38, and a "synchronous" clock signal via line 40. Conventionally, communications utilizing coherent or synchronous Phase Shift Keying (PSK) techniques exhibit the best performance characteristics with respect to noise susceptibility or immunity. Since an AC power line is a very noisy environment, a preferred embodiment of the present invention uses quadrature phase shift keying techniques with a synchronous receiver. One skilled in the art would also appreciate that the PSK transceiver in accordance with the present invention could be easily modified to transmit and receive M-ary phase shift keyed signals (i.e., discrete phase modulation schemes having "M" discrete phases). In accordance with a preferred embodiment of the present invention, however, receiver logic 44 is used to receive offset quadrature phase shift keying (OQPSK) signals with no phase ambiguity.

In communications using OQPSK, data exists for every 90 degrees of phase (i.e., at 0, 90, 180, and 270 degrees). As such, synchronous detection is necessitated which essentially requires that the same phase and frequency exist at the receiver as at the transmitter. Unambiguous reception of error free data is, therefore, not possible without recovering the transmitter carrier phase and frequency at the receiver. Therefore, in accordance with a preferred exemplary embodiment of the present invention, the transmitter sends a predetermined data pattern (i.e., a "header") ahead of the actual message. The data content of this header acts as a phase reference and aids the receiver in the recovery of both transmitter carrier phase and frequency. The header, in accordance with the preferred embodiment of the present invention, comprises a ten to twelve bit stream of all ones in both the quadrature (or "Q") channel and in the In-phase (or "I") channel.

As discussed above, in accordance with a preferred embodiment of the present invention, a four-phase OQPSK PLCC "LAN message" may include one or more HDLC protocol type "sub-messages" (or any other type protocol sub-messages, if desired). The PLCC LAN message is preceded by the header and concluded with a "footer". The footer is essentially the same as the header but is only slightly longer than one byte in length.

A data clocking signal on line 40 from Receiver Logic circuit 40 is provided to Master Processing unit 28 at all times. When a carrier detect signal (CD) is also provided via line 39, Master Processing unit 28 will start to synchronize itself to the incoming data on line 38 using the data clocking signal provided on line 40. Once these two events take place (and the receiver is still receiving the remainder of the header), the master processing units 28 looks for an HDLC message start flag indicating the transition from a message header to message data before it begins storing and processing the data signals detected on line 38 (since HDLC protocol does not recognize the header information as data). Conventionally, an HDLC flag indicating a message start or an end-of-message is one byte consisting of 8 binary bits "01111110". Moreover, an HDLC "flag" can only exist at the beginning and end of messages. (However, it will exist more than twice in an OQPSK LAN message if sub-messages are sent to different addresses with a common header and footer.)

Figure 6A:
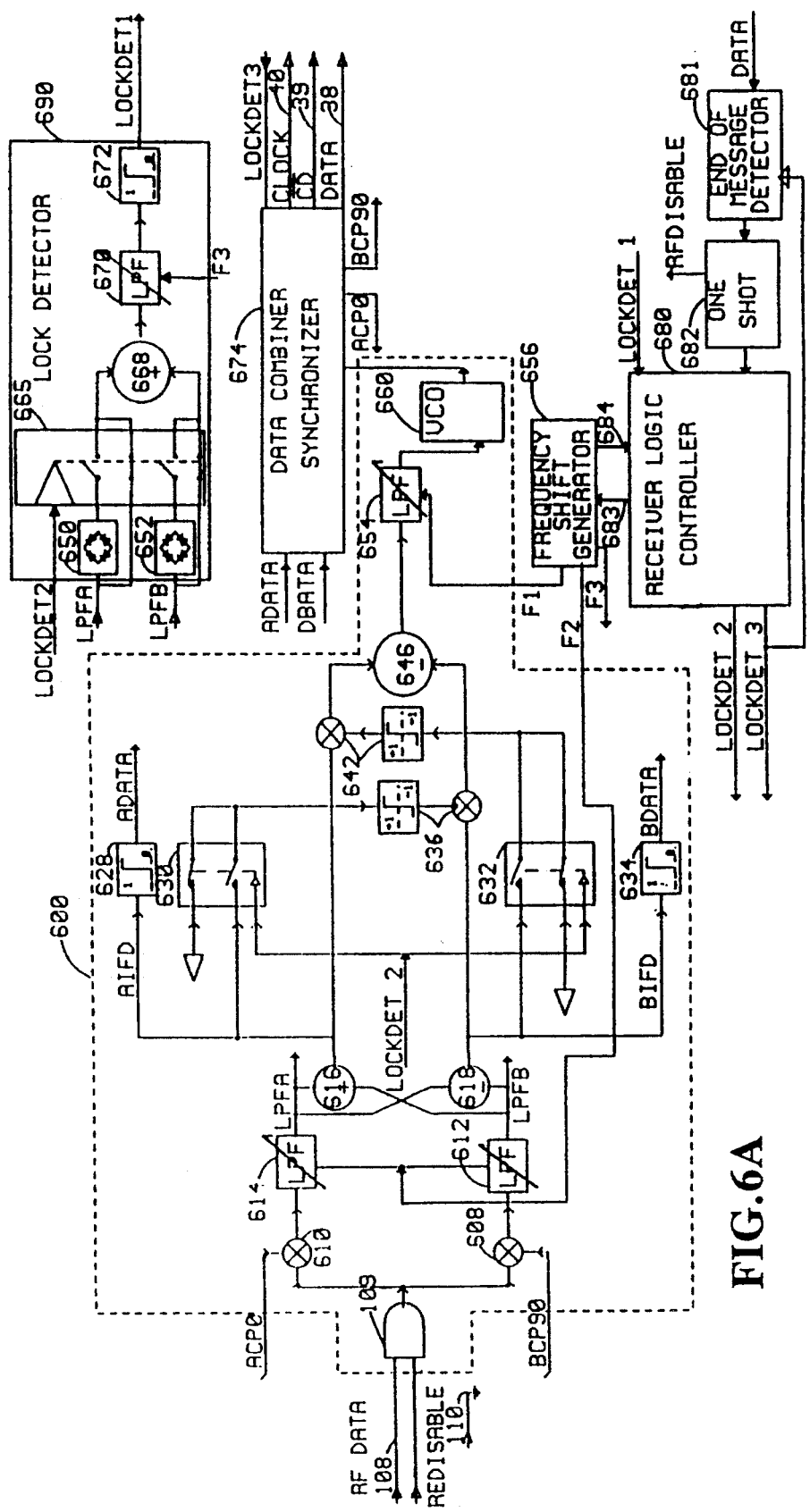
FIG. 6A is a block diagram of the Receiver Logic section of the Terminal Unit shown in FIG. 2.

Receiver acquisition or "lock" time is nominally defined as the time required from the initial processing of the header until the receiver has achieved phase synchronization with the transmitter and is ready to receive the non-header data portion of the transmitted message. In accordance with a preferred embodiment of the receiver logic of the present invention, as depicted in FIG. 6A, the receiver is provided with a lock detector circuit (690) to determine when phase synchronization has been achieved. Another advantage of the receiver in accordance with the present invention is the reduced time required to lock on an incoming signal. Since the data rate in the present embodiment is high and, typically, a terminal unit message for a single transmission is short, the lock time may actually comprise a significant part of the time required to process a received message. Thus, it is desirable that the combination of the receiver message acquisition time and the time required for lock detection should be kept as small as possible. Accordingly, a preferred exemplary embodiment of the present invention has a message acquisition lock time of approximately 2 milliseconds (which is very short compared with conventional carrier current communication receivers).

There are four novel and significant principles utilized by receiver logic 44 in accordance with a preferred embodiment of the present invention: First, a modified single-phase phase locked loop receiving a Header containing a constant string of "1" bits in both channels (i.e., both the In-phase and Quadrature phase channels) will not exhibit phase ambiguity. Second, continuously narrowing the bandwidth of the Receiver Logic loop after initially achieving lock on a message header significantly improves noise immunity. Third, once the modified single-phase phase locked loop in the Receiver Logic has locked on a message header, Receiver Logic circuit 44 can be switched from a modified single-phase phase locked-loop to a four-phase Costas loop without introducing any phase error. Fourth, the use of an adder (616) and a subtractor (618) in the Receiver Loop circuit significantly reduces intersymbol interference in OQPSK data and, thus, further improves noise immunity.

Referring now to FIG. 6A, the circuitry of the Receiver Logic (44) of FIG. 2 is illustrated in greater detail. Although "Receiver Loop" circuit section 600 (enclosed by the dotted lines) is shown configured as a "modified" single-phase phase locked loop, it can function as a four-phase Costas loop if the state of switches 630 and 632 are reversed, albeit with certain differences. One particular difference is that adder 616 and subtractor 618 are not a part of a conventional Costas loop. Another significant distinction is the particular design characteristics chosen for low pass filters 614, 612, 654 and 670 in the preferred embodiment. As contemplated in a preferred exemplary embodiment of the present invention, these are linear-phase low-pass switched-capacitor filters. However, linear phase filters of either the conventional type or of the switched-capacitor type are generally "Bessel" function type filters. While a Bessel filter exhibits a linear phase shift in the passband, its attenuation in the stop band leaves much to be desired. Accordingly, filters 612, 614, 654, and 670 in accordance with a preferred embodiment of the present invention, have a linear phase characteristic similar to that of a Bessel filter but also have 36 db of attenuation at twice the cutoff frequency (as compared to 12 db for a conventional Bessel filter). (A switched capacitor filter suitable for use in the preferred embodiment is Linear Technology part number LTC1264-7 which was the result of cooperation between the inventors and Linear Technology, Inc.)

As may well be appreciated by one familiar with the design of conventional switched-capacitor filters, the cut-off frequency of a switched-capacitor filter can be changed by changing the particular clocking frequency applied to the filter. Accordingly, in the preferred embodiment of the present invention the switched-capacitor filters used in the receiver logic phase-locked loop are provided with a range of clocking frequencies. The loop is initiated using a high clocking frequency for the filters, which results in the phase locked loop having lower noise immunity but a fast acquisition time (i.e., broad bandwidth and rapid locking). After acquisition, the cut-off frequencies of the loop filters are then changed to narrow the bandwidth and improve the noise immunity of the phase locked loop. This is accomplished by changing the filter clocking frequencies resulting in a change in loop bandwidth and may be done in one large step, a number of smaller steps or in a continuous manner depending on the noise constraints for a particular application. In accordance with the present preferred embodiment, a continuous change in switched-capacitor filter clocking frequency is produced by utilizing a voltage controlled oscillator (VCO) and providing it with "raised cosine" shaped waveform control voltage. (A suitable VCO for use in the preferred embodiment is Burr Brown part number VFC110).

Figure 6B:
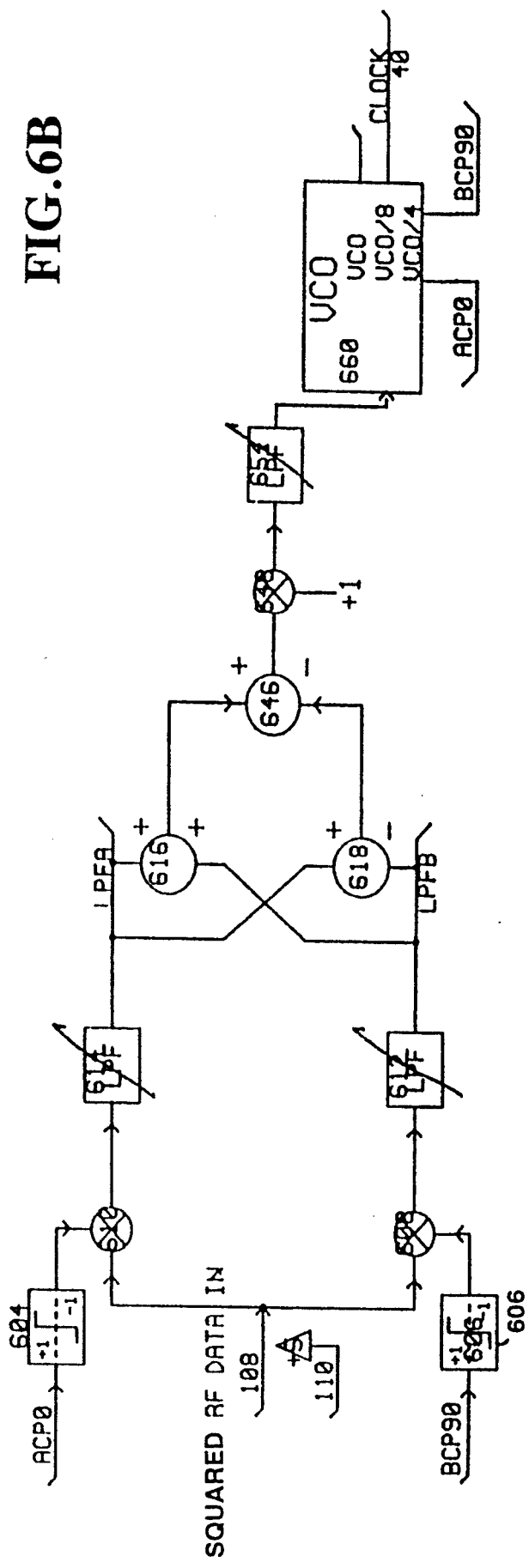
FIG. 6B is a block diagram illustrating the electrical configuration of the Receiver Loop circuit 600 of FIG. 6A in the acquistion or "mode one" phase of operation.
Figure 6C:
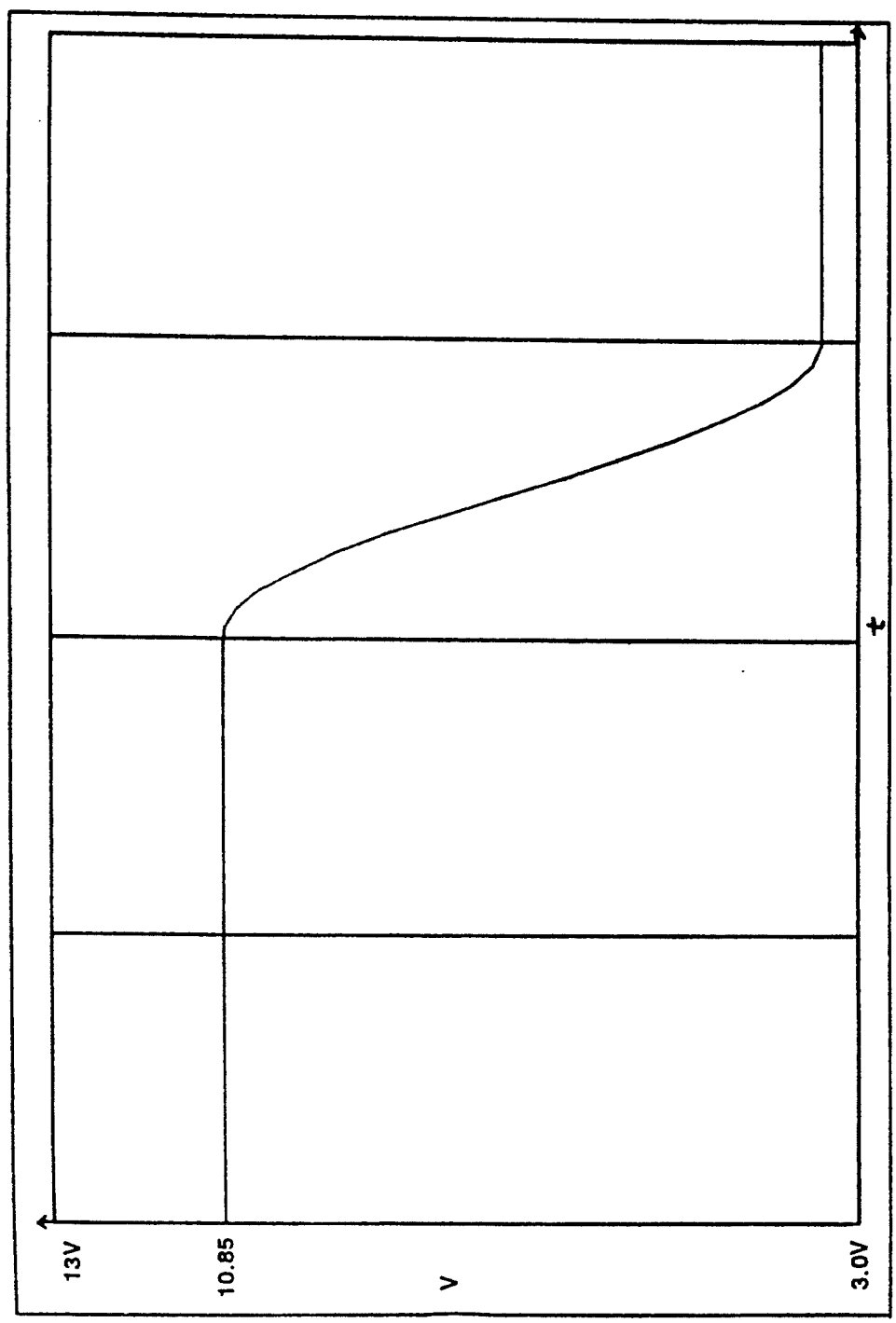
FIG. 6C is an illustration of a "raised cosine" voltage waveform in accordance with the present invention.

FIG. 6C illustrates an exemplary voltage vs. time graph of a "raised cosine" waveform control voltage in accordance with a preferred embodiment of the present invention.

Consequently, a VCO controlled in this manner will provide a continuously changing frequency output that varies linearly in accordance with the raised cosine control voltage. The VCO output can then be squared and used as the clocking frequency for a switched-capacitor filter. This use of a raised cosine shape for controlling the clocking frequency of the Receiver Loop switched-capacitor filters aids the received RF data acquisition process without disturbing the locked condition of the loop. Moreover, in the present embodiment, changes in Receiver Logic Loop circuit configuration from a phase-locked loop to a four-phase Costas loop also increases noise immunity, as previously discussed. In any case, since the demodulated signal is a dc signal during acquisition and the loop filter is linear, the average loop control voltage does not change. (Instead, the loop just becomes more noise immune).

VCO 660 of receiver logic loop circuit 600, depicted in FIG. 6A, can only find one phase position for outputs ACP0 and BCP90 that will result in error free data. This occurs when the loop VCO (660) input voltage from low pass filter 654 is zero. A zero voltage from filter 654 occurs when the received signal carrier phase is equal to the VCO phase or whenever ADATA and BDATA both have values of "1", at the same time which will occur whenever leader data is detected (since leader data contains all "ones" in both channels).

Figure 9B:
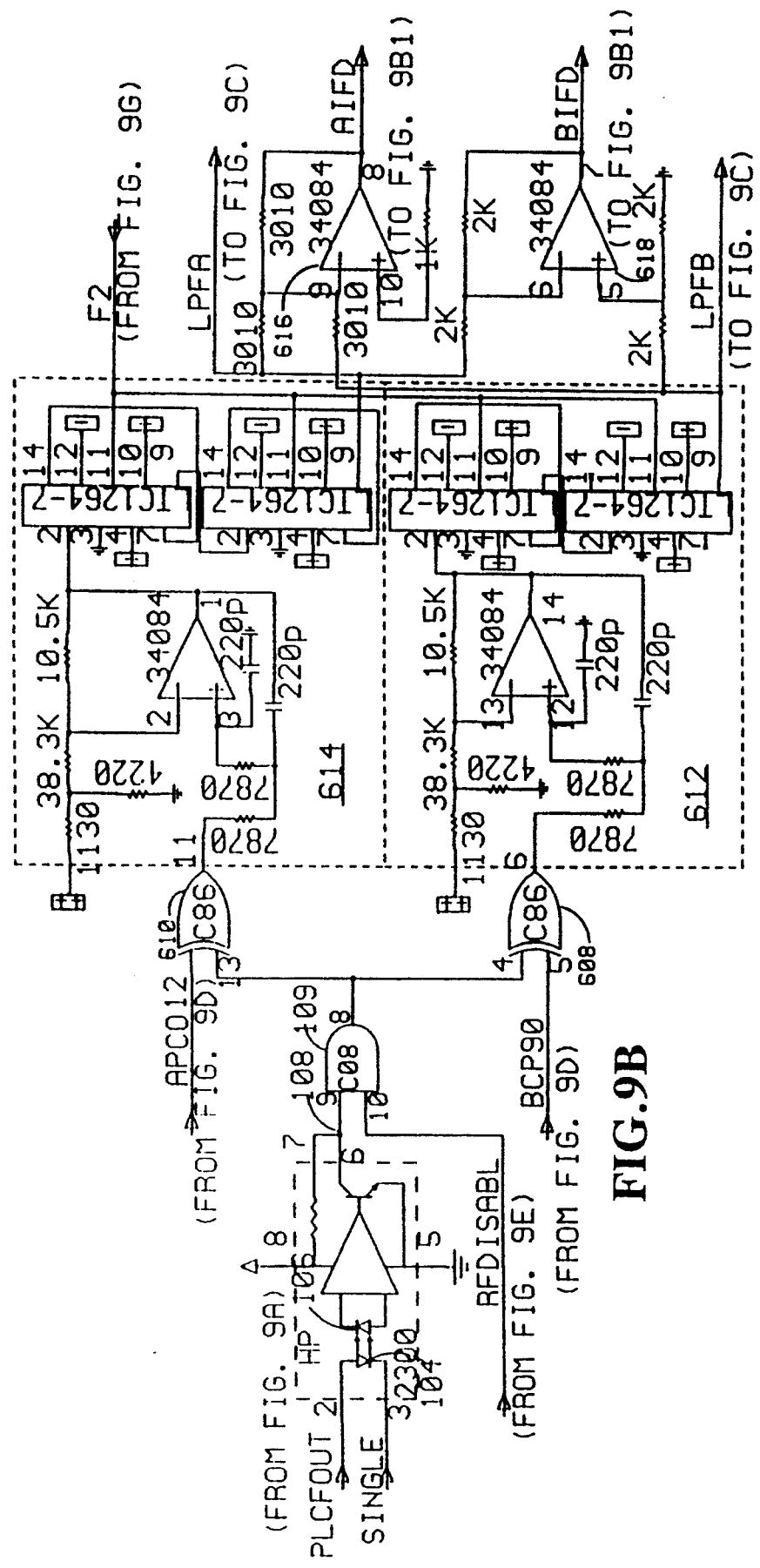

Referring again to loop circuit 600 in FIG. 6A, adder 616 and subtracter 618 significantly reduce intersymbol interference and phase jitter of VCO 660 and, consequently, improve noise immunity and reduce lock acquisition time when receiving OQPSK signals. Using specially designed "non-classical" low pass filters 612 and 614 in the Costas loop also reduces susceptibility to noise, as previously discussed above. A detailed circuit diagram of an exemplary preferred embodiment for the receiver phased-locked/Costas Loop circuit 600 is depicted in FIGS. 9B and 9B1 which use the same reference numerals as FIG. 6A where appropriate.

RECEIVER LOGIC MODES

Receiver logic 44 can be characterized as passing through four distinct "modes" as it processes a received message: a search mode, an acquisition mode, a locked mode and an end-of-message detected mode. In the first or "search" mode, the receiver loop circuit 600 is in an "unlocked" state and is looking for a message leader. As an example, FIG. 6B diagrammatically illustrates the configuration of receiver logic circuitry 44 when in the search mode. When the header arrives as RF data, it has a "1" in both quadrature channels. At the output of adder 616 and subtracter 618, the I and Q channel data is referred to as ADATA and BDATA, respectfully.

In the search mode, the receiver logic initially acts as a single-phase phase-locked loop (with switches 630 and 632 in the positions depicted in FIG. 6A). The cut-off frequencies of low pass filters 654, 612, 614, and 670, as controlled by frequency shift generator 656 via control lines F1, F2, and F3, respectively, are initially at their maximum values to aid acquisition. Without a detected message header signal, signal VCO 660 drifts randomly about some center frequency approximately four times the carrier frequency. Moreover, the LOCKDET 1 output of the lock detector circuit 690, which consists of absolute value circuits 650 and 652, lock enable switch 665, adder 668, low pass filter 670, and comparator 672, has a low output.

In a second or "acquisition" mode, which occurs when the receiver has detected a message header, the output voltage from low pass filter 670 used in lock detector 690 will be rising. When the output of low pass filter 670 reaches approximately 4.0 volts, a LOCK-DET 1 signal is generated by comparator 672. This signal initiates changes in the Receiver Loop Circuit (as discussed below) which allow for rapid and reliable locking onto a detected OQPSK message. This signal also modifies the Lock Detector circuit itself by inserting absolute value circuits 650 and 652 to detect OQPSK data. During this mode, the receiver loop is switched from a single-phase phased-locked loop to a four-phase Costas loop and data from the I and Q channels are combined and synchronized with the receiver clock.

During a third mode, once the receiver loop has locked onto a received message a LOCKDET 3 signal is generated, valid data is provided on line 38 and a Carrier Detect signal is sent to the Master Processor. For the remainder of mode three, Receiver Logic circuit 44 continues to synchronously process and send valid data on output line 38 to the master processor, (i.e., for the remainder of the message header and any subsequent HDLC format messages before the detection of a four-phase OQPSK message footer).

A fourth mode starts when End-of-Message detector 681 detects both an HDLC EOM flag followed by a message "footer", comprising a ten to twelve bit string of "one" bits, in the received message data stream (an exemplary message protocol format is depicted in FIG. 11). The End-Of-Message detector 681 triggers one shot 682 which resets the receiver controller 680. The reset signal causes receiver controller 680 to remove the carrier detect signal from line 39 and remove data from the valid data line 38. During the interval of the one shot delay, the RF Disable pulse also removes data from the Receiver Logic 44 by using the AND gate 109. Should an end-of-message footer not be received, an absence of any received message data will also cause a loss of the LOCKDET 1 signal which will, in turn, cause the Receiver Logic controller circuit (discussed in detail further below) to return Receiver Loop circuit 600 to its unlocked state. After Receiver Logic controller 680 is reset, it reverts to mode one again and begins searching for another message signal to lock onto.

RECEIVER LOCK DETECTOR

A primary function of Lock detector circuit 690 is to indicate when correlation occurs between the phase of the VCO output and the phase of a received carrier signal. Referring to FIG. 6A, lock detector 690 consists of absolute value circuits 650 and 652, adder 668, low pass filter 670 lock enable switch 665 and comparator 672.

Although the conventional Costas loop method for generating a reference carrier signal from a received QPSK signal has a phase ambiguity of $\pi/2$ radians, the digital state can be resolved by transmitting a known preamble code or "header" to establish the identity of the initial state of the transmitted digital data. This is accomplished in accordance with the present invention by transmitting a header message of all "1s". During reception of a message header comprising all "1s", since there is a "1" in both the I and the Q channels, lock detector comparator 672 will go high. Any other combinations of received data are ambiguous and will not cause comparator 672 to go high. One of skill in the art would appreciate that any alternate embodiment that provides an indication of the initial digital state of the transmitted signal may also be utilized without departing from the scope of the present invention.

Figure 9C:
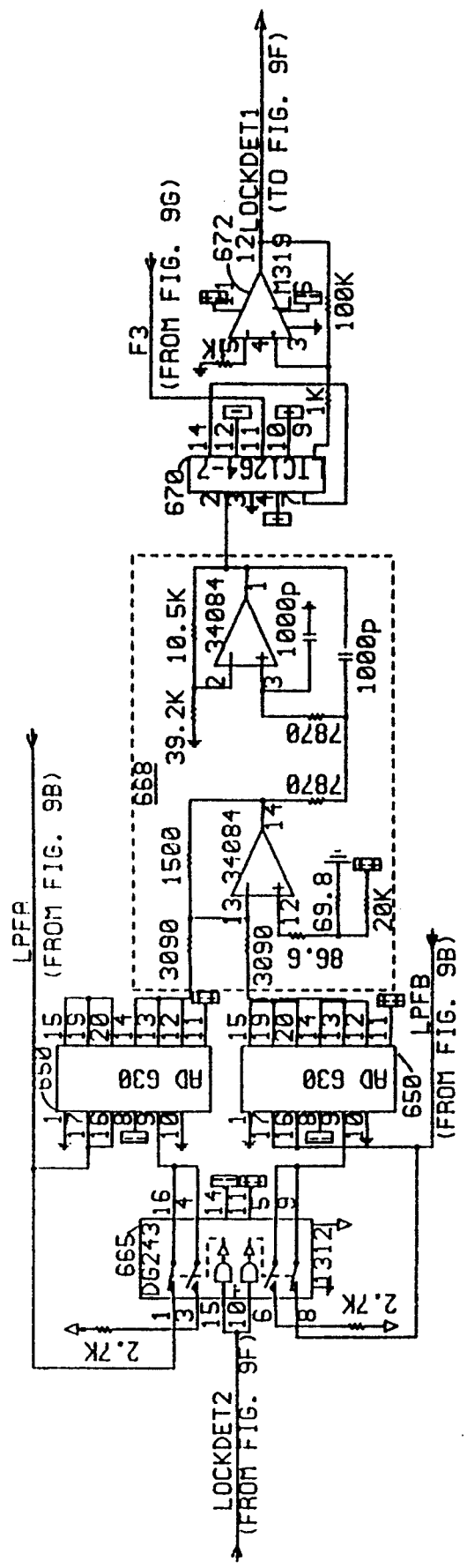
FIG. 9C is a detailed circuit diagram of the Lock Detector section of the Receiver Logic shown in FIG. 6A in accordance with a preferred embodiment of the present invention.

A detailed circuit diagram illustrating specific components for an exemplary preferred embodiment of lock detector 690 is depicted in FIG. 9C.

RECEIVER DATA COMBINER/SYNCHRONIZER

Since there are inherent time differences between the processing of the loop VCO clock signal and the received data signals, a data Combiner/Synchronizer circuit is provided (674 in FIG. 6A) which is also used to position a data clocking pulse so that the leading edge of a clock pulse is always in the center of any incoming data pulse. This tends to maximize noise immunity. (For example, if the clock pulse edge is near a data pulse edge any slight shift in either the clock or data due to noise will produce an error.)

Data Combiner/Synchronizer 674 performs four main functions: First it inverts the clock signal if a falling edge of data from the BDATA line occurs after the LOCKDET 3 signal is generated. Second, it synchronizes the loop VCO output and incoming data to provide data clocking pulses that coincide in time with the center of incoming data pulses. Third, it combines the two data channels, ADATA and BDATA, into a composite HDLC bit stream in a non-ambiguous manner. Fourth, it provides ACP0 and BCP90 via exclusive OR gates 610 and 608.

Figure 9D:
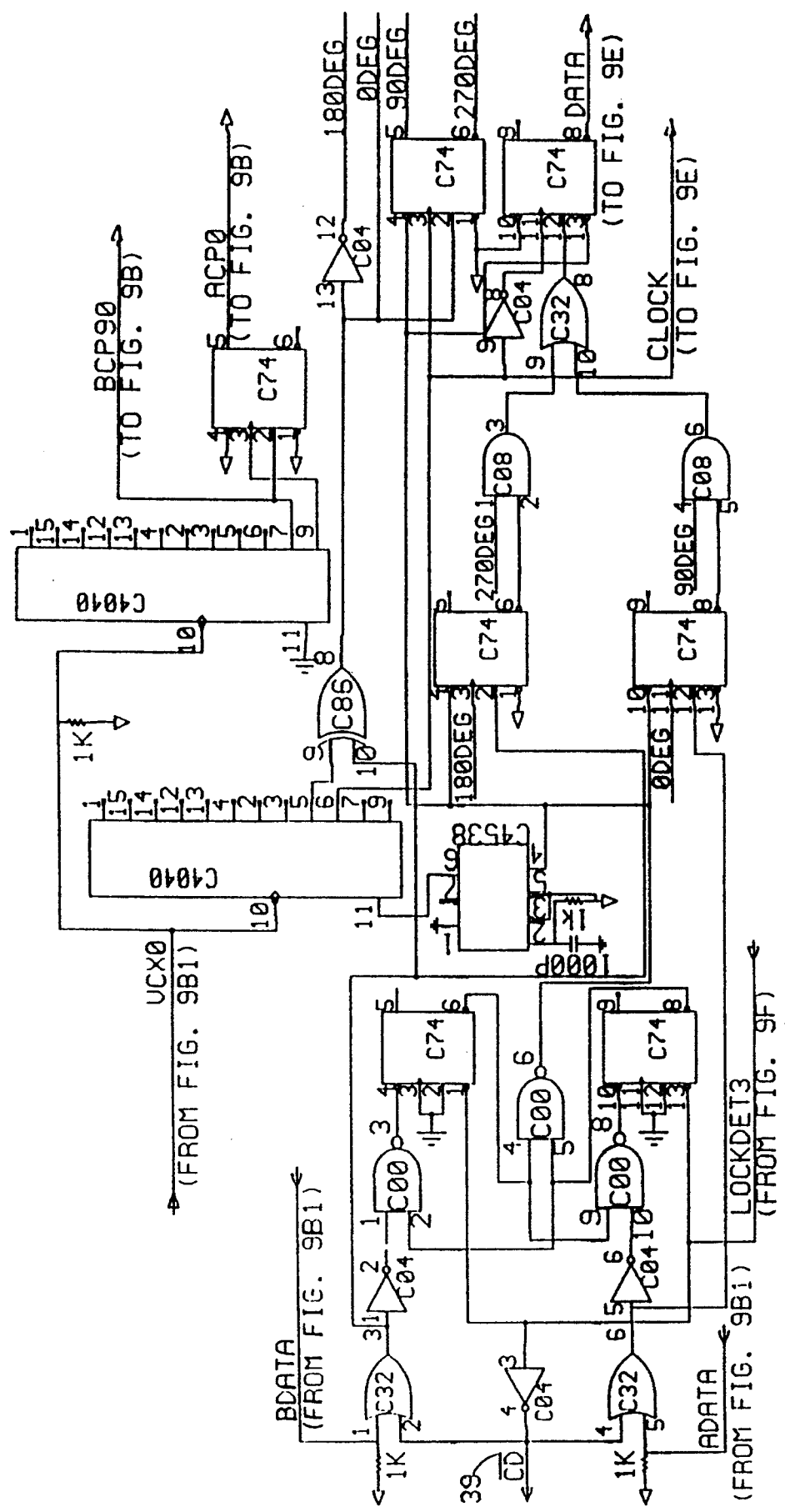
FIG. 9D is a detailed circuit diagram of the Data Combiner/Synchronizer section of the Receiver Logic shown in FIG. 6A in accordance with a preferred embodiment of the present invention.

A detailed circuit diagram illustrating specific components for an exemplary preferred embodiment for Data Combiner/synchronizer 674 is depicted in FIG. 9D.

END-OF-MESSAGE DETECTOR

It is also desirable that receiver logic controller 680 recognize the end of a message rapidly so receiver loop unlock can occur in less time than the minimum time between messages (which in the preferred exemplary embodiment, under normal conditions, is about 0.29 milliseconds on 2 bytes at 55 Kbits per second). Although the output of low pass filter 670 from Lock Detector 690 could be used to indicate and end of message condition (since it will start to fall when the LPFA and LPFB inputs to the lock detector no longer provide data), an End-of-Message Detector circuit is used in order to further decrease loop unlock time. As generally illustrated in FIG. 6A, End-of-Message detector 681 generates a signal to reset Receiver Logic Controller 680 via one shot 682 upon detection of an HDLC protocol EOM flag followed by an OQPSK LAN message footer in the incoming data stream (i.e., as soon as the last of the received message data of any and all "sub-messages" has arrived). In accordance with a preferred embodiment of the present invention, a OQPSK LAN message "footer" comprises a continuous string of ten to twelve "one" bits (which is not a valid HDLC protocol).

Figure 9E:
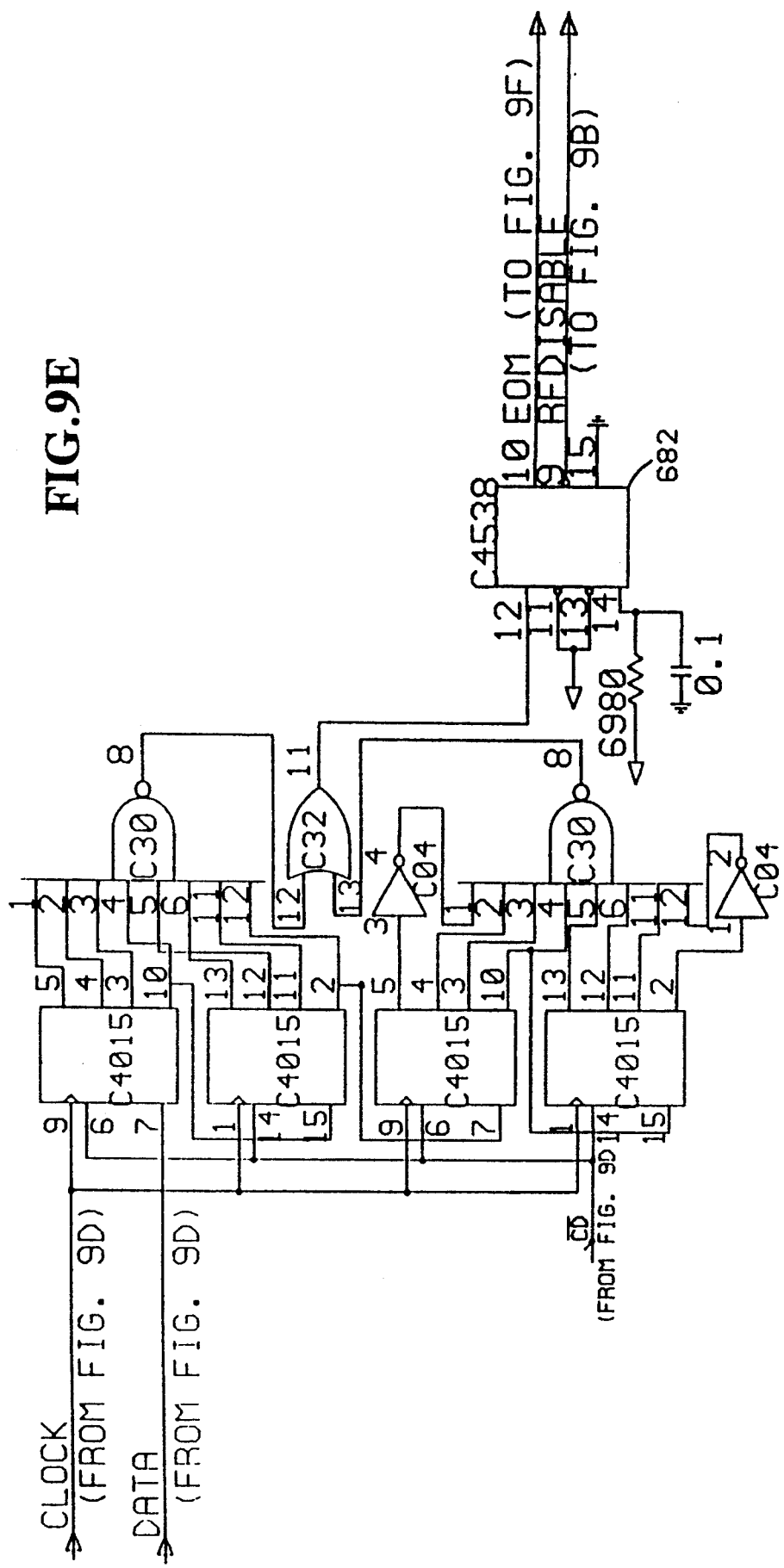
FIG. 9E is a detailed circuit diagram of the End-Of-Message detector and One-Shot shown in FIG. 6A in accordance with a preferred embodiment of the present invention.

A detailed circuit diagram illustrating specific components for an exemplary embodiment of End-of-Message Detector 681 is depicted in FIG. 9E.

In the event that the lock detector is inadvertently triggered by noise, the Receiver Loop circuit 600 potentially could be placed in a low-noise locked-on-frequency state indefinitely since an end-of-message signal would not be forthcoming. Consequently, as discussed below, receiver logic controller 680 also prevents the receiver logic circuit from permanently locking-up on spurious noise by using an absence of a LOCKDET 1 signal to unlock the receiver logic Costas loop and return it to the search mode.

RECEIVER LOGIC CONTROLLER

As generally illustrated in FIG. 6A, Receiver Logic Controller circuit 680 provides appropriately timed control signals to ensure proper operation of the Receiver Logic in detecting, acquiring and locking onto valid data messages from the Pre-detection Receiver circuit section.

More specifically, the generation of loop filter configuration control signals occurs in the following manner: First, upon detection of a message header by lock detector 690, a LOCKDET 1 signal is generated and passed to receiver logic controller 680. The receiver controller 680 then immediately starts to generate a "raised cosine" shaped control voltage waveform on line 683 for input to Frequency Shift Generator 656. As the raised cosine waveform is generated, switched-capacitor filter control frequencies F1 and F2 are likewise shifted in accordance with the "raised cosine" control voltage by VCOs, VC1 and VC2, within frequency shift generator circuit 656 (discussed in detail below). The F3 control frequency signal to the lock detector circuit, however, is shifted in a more conventional stepwise manner with a single frequency jump.

Upon completion of the raised cosine control voltage waveform generation, a LOCKDET 2 signal is produced. The LOCKDET 2 signal triggers electronic switches 630 and 632 to produce a change in the configuration of receiver loop circuit 600 from a modified single phase locked loop to a four-phase Costas loop. It also changes the configuration of the lock detector 690 via electronic switch 665 to utilize absolute value circuits 650 and 652 (so that the circuit senses only the analogue loss of a message).

After a short predetermined Costas loop settling time, as determined in-part by the predetermined frequency of a controller clock signal provided on line 684, receiver logic controller 680 generates a LOCKDET 3 signal. The LOCKDET 3 signal enables the Data Combiner/Synchronizer 674, resets End-of-Message detector 681 and is inverted and used as the carrier detect signal on line 39. Any "on-time" data which arrives after the LOCKDET 3 signal, will appear as "valid data" on output line 38 to the Master Processor. This locked mode of receiver operation continues until End-of-Message Detector circuit 681 detects an HDLC flag followed by the OQPSK message footer (discussed above).

Figure 9F:
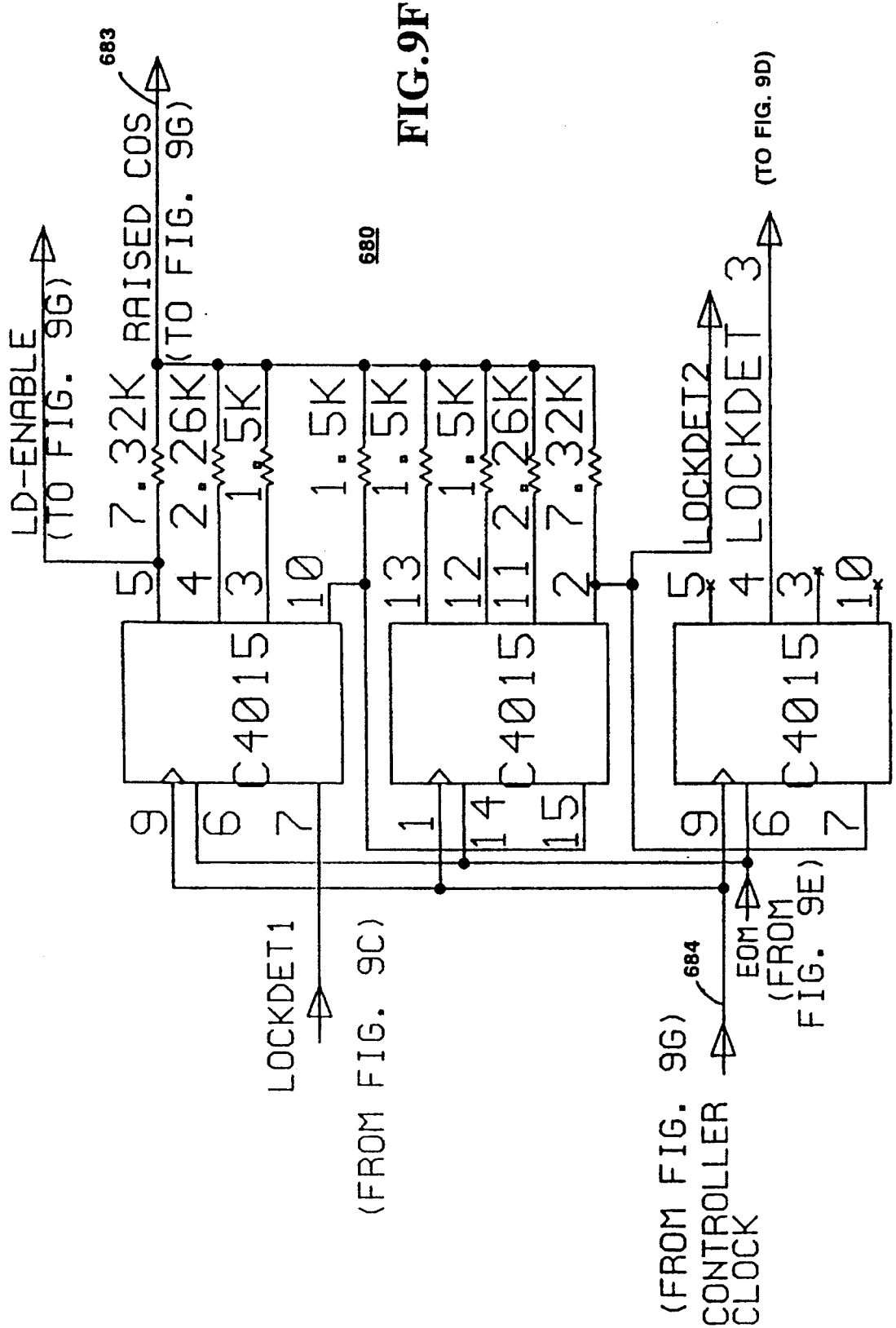
FIG. 9F is a detailed circuit diagram of the Receiver Logic Controller section shown in FIG. 6A in accordance with a preferred embodiment of the present invention.

A detailed circuit diagram illustrating preferred components for an exemplary embodiment of Receiver Logic Controller 680 is depicted in FIG. 9F. A predetermined controller clock signal is provided on line 684 by the Frequency Shift Generator circuit (discussed below) to three daisy-chained 4-bit shift registers. The lower order parallel outputs of two of the shift registers are combined via a resistor network to provide a rough "raised cosine" voltage waveform on line 683. The higher order parallel outputs of the third shift register are used to provide the LOCKDET 2 and LOCKDET 3 signals (also LOCKDET 4).

FREQUENCY SHIFT GENERATOR

As generally illustrated in FIG. 6A, frequency shift generator circuit 656 provides three predetermined changing clocking frequencies, F1, F2, and F3, for switched-capacitor low-pass filters 612, 614, 654 and 670. As discussed above, a change in the individual clocking frequencies of the switched-capacitor filters will cause a corresponding shift in their respective cut-off frequencies. Accordingly, the frequency shift generator circuit is designed to provide two continuous non-linearly changing clocking frequencies, F1 and F2, that will result in a corresponding smooth and continuous change in the cut-off frequencies of the respective switched capacitor low-pass filters used in the Receiver Loop circuit. A detailed circuit diagram of an exemplary embodiment illustrated with preferred component values for frequency shift generator circuit 656 is depicted in FIG. 9G and discussed briefly here below.

Figure 9G:
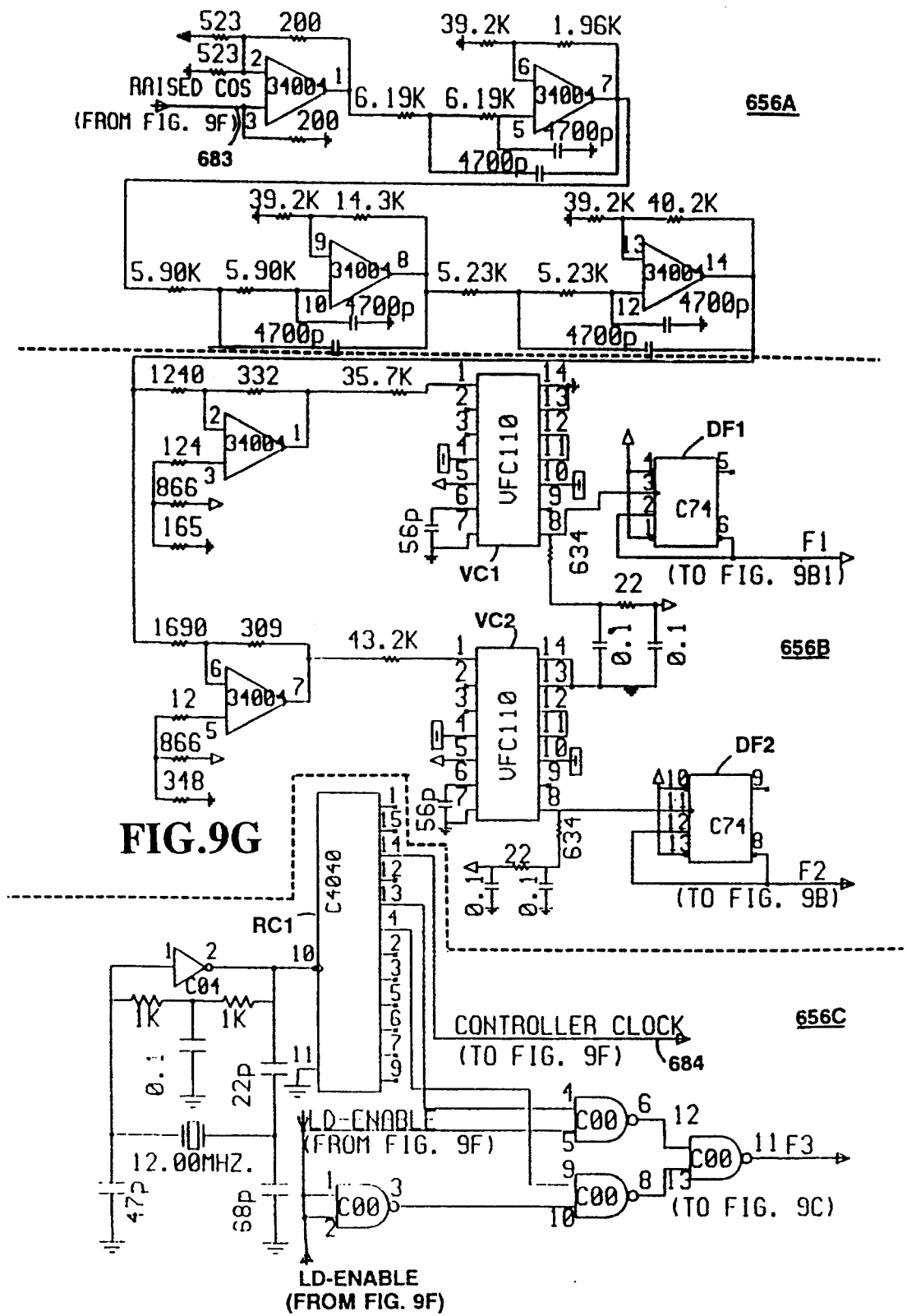
FIG. 9G is a detailed circuit diagram of the Frequency Shift Generator section shown in FIG. 6A in accordance with a preferred embodiment of the present invention.

Referring now to FIG. 9G, the digitally generated raised cosine waveform voltage input to line 683 is first smoothed by four serially connected active op-amp filters depicted within circuit section 656A. The smoothed raised cosine voltage waveform is then amplified and provided to the control inputs of two separate voltage controlled oscillators, VC1 and VC2, as depicted in circuit section 656B. The outputs of VC1 and VC2 are divided by two (which results in a 50% duty cycle) by separate D-type flip-flops, DF1 and DF2, which provide the respective clocking frequencies F1 and F2. Since the input control voltage provided to each VCO in section 656B is in the form of a raised cosine waveform, the output frequency of each VCO changes non-abruptly from a predetermined initial frequency to a predetermined final frequency in a smooth continuous manner that follows from the smooth changes of the raised cosine control voltage (i.e., the output frequencies of VC1 and VC2 will change relatively slow at first, then more rapidly followed by a slow tapering-change to a predetermined final frequency.) An example of the raised cosine control voltage waveform generated by the preferred embodiment of the present invention is depicted in FIG. 6C. In the preferred embodiment of the present invention, the Frequency Shift Generator circuit produces an F1 signal that starts at 1.622 MHz when the Loop is in an unlocked state and ends at 531.4 KHz when the Loop is in the locked state. Similarly, the Frequency Shift Generator circuit produces an F2 signal that starts at 1.842 MHz when the Loop is in an unlocked state and ends at 700 KHz when the Loop is in the locked state.

The Controller Clock signal provided on line 684 is generated in Frequency Shift Generator circuit section 656C by using a 12-bit ripple counter, RC1, to divide down the output of a 12.00 MHz crystal oscillator. The ripple counter is also used to produce the E3 switching capacitor clocking frequency for low pass filter 670. Other outputs of the ripple counter RC1 are gated using the LD-ENABLE signal from the Logic Controller circuit to produce a stepwise change in the F3 clocking signal at a predetermined time after the Lock Detector circuit generates the LOCKDET 1 signal. In the preferred embodiment of the present invention, the appropriate outputs of ripple counter RC1 are selected to produce a 93.753 KHz signal for F3 when the Loop is in the unlocked state and a 46.876 KHz signal for F3 when the Loop switches to the locked state.

RECEIVER LOGIC LOOP VCO

The receiver loop circuit VCO 660, as generally illustrated in FIG. 6A, must respond rapidly enough to allow a "lock" time of two milliseconds or less and, in addition, provide a high degree of temperature stability. Conventionally, the time required for a single-phase phase-locked-loop to lock onto the proper frequency is primarily a function of the phase and frequency difference between the loop VCO before acquisition (i.e., the wide bandwidth loop VCO drift phase and frequency) and the input target phase and frequency. However, the lock time will also depend on the response time of the particular VCO used in the phase lock loop. Accordingly, a preferred exemplary embodiment of the present invention provides an improved receiver loop VCO that has long term frequency stability and a very rapid response time. A detailed circuit diagram of an exemplary embodiment illustrated with preferred component values for the receiver loop circuit VCO 660 is depicted in FIGS. 10A, 10B and 10C.

Figure 10A:
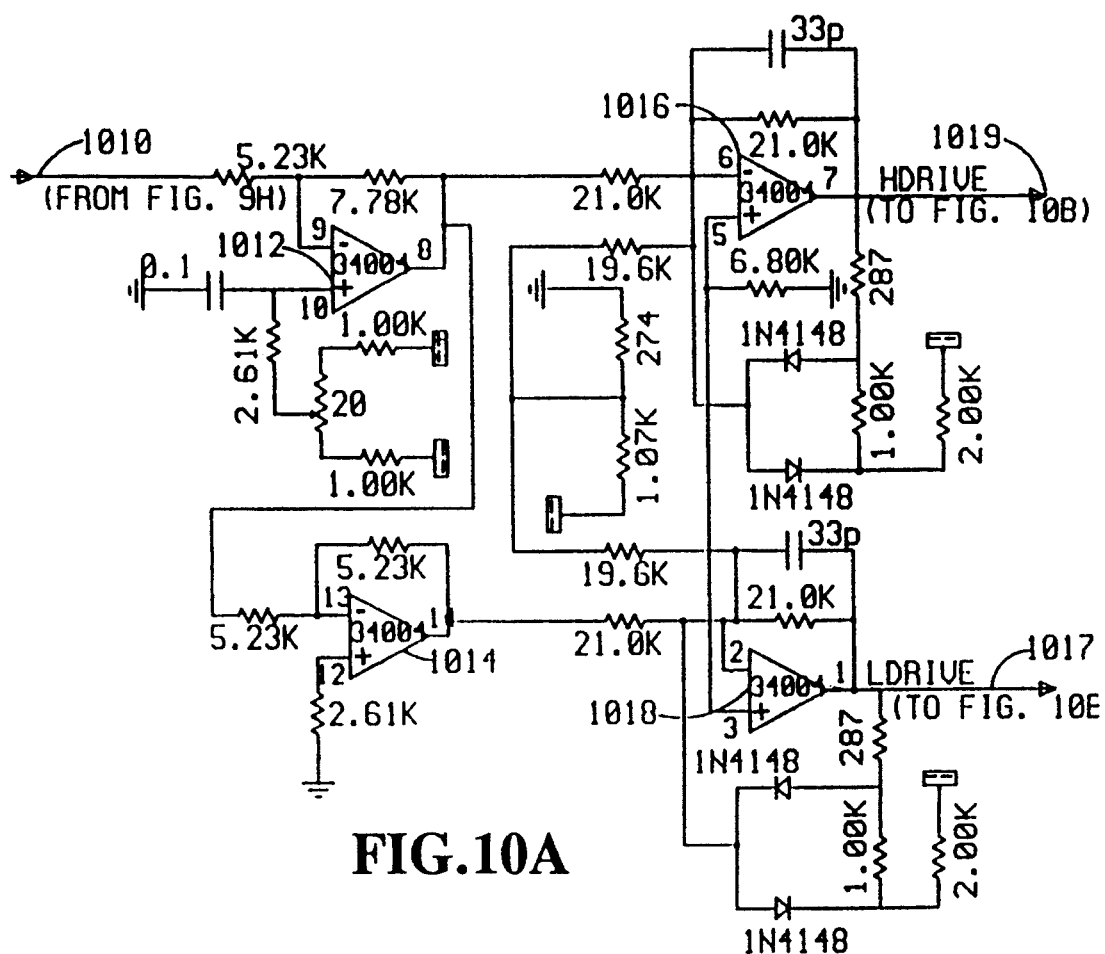
Figure 10C:
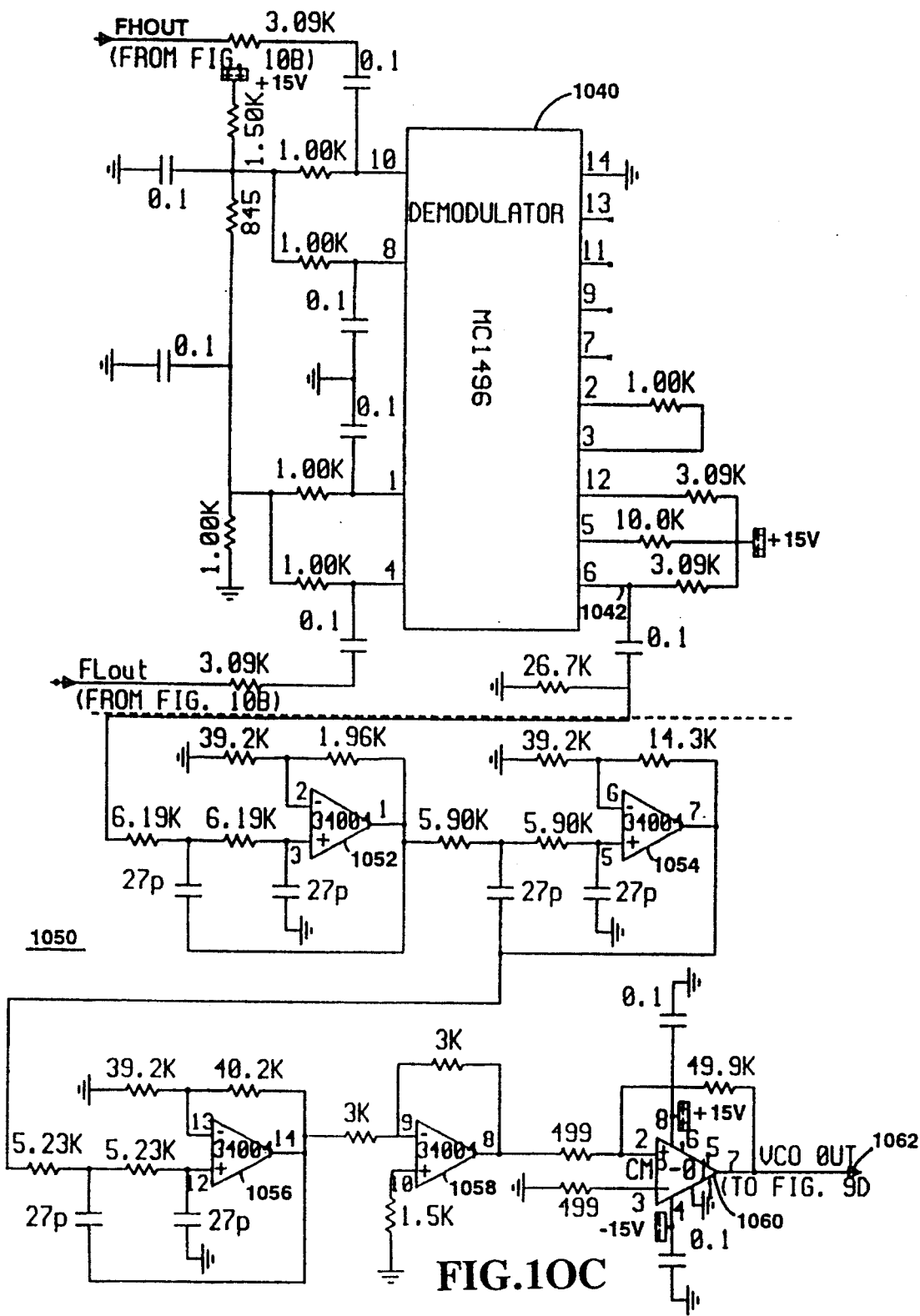

Referring now to FIG. 10A, a control voltage from loop low pass filter 654 provided on loop VCO input line 1010 is both buffered and inverted by operational amplifiers (op-amps), 1012, 1014, 1016, and 1018 to produce two equal but opposite oscillator driving voltages, HDRIVE and LDRIVE, on lines 1019 and 1017, respectively. Op-amp 1014 provides an inverted output voltage which tracks the output voltage of op-amp 1012. This inverted output is provided to the inverting input of op-amps buffers 1018. Similarly, the output of op-amp 1012 is provided to the inverting input of op-amp buffer 1016. The non-inverting inputs of op-amps 1016 and 1018 are connected together in an arrangement that ensures that the respective equal but opposite output voltages, HDRIVE and LDRIVE, on lines 1019 and 1017 track closely.

Referring now to FIG. 10b, the driving voltages HDRIVE and LDRIVE, are provided to two separate crystal-stabilized voltage controlled oscillator circuits FHIGH and FLOW. These crystal stabilized VCOs operate at relatively high frequencies determined by crystals XLH and XLL. Oscillator circuits FHIGH and FLOW, each include a frequency determining network comprising a pair of manually tunable inductors, VL1-VL2 and VL3-VL4, and a pair of varactor diodes VD1, VD2 and VD3, VD4. The diodes have a voltage dependent variable junction capacitance that enables each oscillator circuit to be "pulled" or varied slightly from its preferred operating frequency in accordance with the respective control voltages on lines HDRIVE and LDRIVE. The pair of inductors in series with the crystal allows a greater "pulling" of frequency while maintaining a high "Q" for the oscillator. In the preferred exemplary embodiment, a 12.00 MHz crystal, XLH is used with a 4.72 $\mu$H inductance in the FHIGH oscillator and 11.56 MHz crystal is usual with a 4.72 $\mu$H inductance in the FLOW oscillator. This particular selection of crystal frequencies provides a 440 KHz frequency difference between oscillators that is used to generate the orthogonal carrier signals (i.e., this signal is four times the carrier frequency). A varactor diode (e.g., an MV209) is used for diodes VD1 through VD4.

Using oscillator FHIGH as an example, the operation of oscillator circuits FHIGH and FLOW are briefly explained as follows. Oscillations from the frequency determining network are capacitively coupled via capacitor 1020 to FET 1022 which acts on a signal as follows. Since FET 1022 has a high input impedance it provides a high degree of isolation and is used to prevent loading of the frequency determining network and to improve the overall noise immunity of the oscillator. Transistor amplifier 1024 is connected to FET 1022 to provide some signal gain and its output, FHOUT, is fed back via capacitor 1038 to the frequency determining network to maintain oscillation. This RLC filter, comprising tunable inductor VL5, capacitor 1026 and resistor 1028, provides primary tuning for the frequency determining network and prevents the crystal from oscillating at harmonic frequencies. Diode pair 1030 and 1032, acts as a voltage clamp to prevent excessive feedback or noise voltages from reaching the frequency determining network components. A low pass filter comprising inductor 1034 and capacitors 1036 eliminate noise which might originate from the +15 V power source.

This dual crystal stabilized VCO embodiment is easily adapted to other applications since a wide variety of output frequencies are readily obtained simply by changing the individual crystals and retuning the inductors in each crystal oscillator circuit. A change in crystal frequencies may also result in an overall change in the performance characteristics of the loop VCO (e.g., higher crystal oscillator operating frequencies, in general, translate into a larger difference frequency which will result in greater VCO pull and faster response; VCO "pull" being the nominal amount of frequency change per unit of control voltage input change).

In response to an increase in the control voltage input to loop circuit VCO 660, FHIGH oscillator circuit will increase in frequency (i.e., "pull" high) and FLOW circuit oscillator will decrease in frequency (i.e., "pull" low). The difference in these frequencies is used as the loop VC0 output frequency. Referring now to FIG. 10C, the difference frequency is obtained by providing the respective outputs, FHOUT and FLOUT, from the FHIGH and FLOW oscillators to an integrated demodulator circuit 1040 (e.g., Motorola part no. MC1496). The output of demodulator circuit 1040 provides sum and difference frequencies at output 1042. This signal is filtered by active low pass filter network 1050 to provide only the difference frequency as the loop circuit VCO output. Active low pass filter 1050 comprises low pass op-amps filters 1052 through 1058 and output buffer 1060. The difference frequency used as the loop VCO output is provided at line 1062 to Data combiner/synchronizer circuit 674 and as feedback to the receiver loop circuit 600.

If the two crystal oscillators had exactly the same temperature coefficient, then the change in loop VCO circuit output due solely to ambient temperature changes would always be nearly zero. However, the two oscillators do not have identical temperature coefficients since the crystals are slightly different and operate at slightly different frequencies. The two temperature coefficients are, however, very close. In the preferred embodiment depicted in FIGS. 10a–10c, the long term temperature coefficient of the loop VCO circuit 660 is near one part per million per degree centigrade.

In addition, the two crystal stabilized voltage controlled oscillators will have slightly different thermal time constants. That is, they each experience a change in output frequency due to a change in ambient temperature at different rates and in a slightly different manner. This is due to slight differences in thermal transfer rates of the individual component parts of the two VCOs. As such, the frequency difference in outputs of the two oscillators initially would vary significantly in response to any ambient temperature change. However, once the VCO circuit stabilized for a few hours, the difference frequency would return to a value very near the value before the ambient change occurred. However, in order to eliminate this type of transient ambient temperature effect, the major temperature sensitive components of both crystal-stabilized voltage controlled oscillators placed on a common heat sink in the preferred embodiment of the present invention.

More specifically, referring again to FIG. 10b, the following components are all mounted on a common heat sink: the two crystals, XLH and XLL; the four Varactor diodes that VD1, VD2, VD3 and VD4; the six inductors VL1, VL2, VL3, VL4, VL5, and VL6. This particular mounting arrangement of components on a common heat sink improves the transient frequency stability of the VCO to less than 1 part per million per degree centigrade.

A person skilled in the art of power line communications would appreciate that the LAN described in accordance with the present invention would be of advantageous use in applications where the cost of cabling is high. Moreover, the present invention can also be used where communication over the power lines is superior to that of communication over a medium that is less "hazard survivable".

In an alternative exemplary embodiment utilizing the PLCC transceiver of the present invention in a LAN, the Terminal Units are not used and the Data and Control units are replaced with RS-232-C terminals at all locations but one. At that predetermined location, that terminal is designated the master station and one RS-232-C port is required for each RS-232-C terminal used in the system. The RS-232-C outputs of this master station are connected to the conventional RS-232-C input lines to a port controller for a main frame computer. In this manner, a totally transparent RS-232-C local area network would result. Such a configuration would be used where it is more economically viable over other communication schemes. For example, in commissioned submarines where the adding of additional cabling and electronic equipment is time consuming and expensive. Embodiments of the present invention using an RS-232-C type power line communications network would, therefore, be more cost effective.

In other contemplated embodiments of the PLCC LAN in accordance with the present invention, it may be desirable to use a combination of the above described RS-232-C and DAIEC terminal embodiments. For example, where communications requirements for building services is to be mixed with the communications requirements for data services it would be desirable to use both RS-232 and DAIEC terminals in the LAN.

While the invention has been described with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A distributed data acquisition and equipment control system for communicating information over AC power lines, comprising:
    an electrical power distribution line;
    a plurality of carrier-current communication means positioned at predetermined locations on said power distribution line for transmitting and receiving information, said plurality of carrier-current communication means forming a local area network (LAN);
    said LAN of carrier-current communication means comprising at least one Terminal Unit;
    said Terminal Unit comprising:
    a power line carrier current (PLCC) transceiver means for sending and receiving electrical signals constituting a LAN message over said power distribution line;
    a slave processing means for interfacing and controlling communication with a first plurality of sensors and equipment;
    an input/output (I/O) means for allowing an operator to input information onto and obtain information from the LAN;
    a controller means for providing an interactive interface via said I/O means and for maintaining a data base of integrated command, equipment parameter and damage control information in a local non-volatile memory; and
    a master processing means for controlling the exchange of information between said slave processing means, said controller means and said PLCC transceiver means, and for controlling the formation, transmission and reception of LAN messages with any other carrier-current communication means in said LAN via said PLCC transceiver means.

2. A distributed intelligence data acquisition and equipment control system for communicating data and control information over AC power lines, comprising:
    an electrical power distribution line;
    a plurality of carrier-current communication means positioned at predetermined locations on said power distribution line and forming a local area network (LAN) for transmitting and receiving information;
    at least one of said carrier-current communication means including a distributed artificial intelligence controller (DAIEC) means for controlling the exchange of information with other carrier-current communication means in the LAN, maintaining a local data base of stored information, and for providing an interactive user interface to said local data base and said plurality of carrier-current communication means in the LAN;
    said DAIEC means comprising a main processor connected to a non-volatile addressable memory and a user operable I/O device means for allowing a user to input information onto and obtain information from the LAN.

3. A distributed intelligence data acquisition and equipment control system for communicating shipboard engineering casualty and damage control information over the AC power lines of a vessel, comprising:
    an electrical power distribution line located throughout the vessel;
    a plurality of carrier-current communication units which are positioned at predetermined locations throughout said vessel and connected to said power line to form a local area network (LAN);
    said LAN of carrier-current communication units comprising at least one Terminal Unit and one Data and Control Unit;
    said Terminal Unit comprising:
    a power line carrier current (PLCC) transceiver for sending and receiving electric signals constituting LAN messages over said power distribution line;
    a slave processing unit for interfacing and controlling communication with sensors and equipment located aboard said vessel;
    an input/output (I/O) touch-screen display device;
    an intelligent controller means for providing an interactive user-friendly operator interface via said touch-screen display and for maintaining a data base of said shipboard engineering casualty and damage control information in a local non-volatile memory;
    a master processing unit connected to said slave processing unit, to said PLCC transceiver and to said intelligent controller for controlling the exchange of information between said slave processing unit, said intelligent controller and any other carrier-current communications units in the LAN via said PLCC transceiver, including the formation, transmission and reception of said LAN messages;
    said Data and Control unit comprising:
    a second PLCC transceiver;
    a second slave processing unit;
    a second master processing unit connected to said second slave processing unit and said second PLCC transceiver for controlling the exchange of information between said second slave processing unit and other carrier-current communications units in the LAN via said second PLCC transceiver, including the formation, transmission and reception of said LAN messages.

4. A distributed intelligence data acquisition and equipment control system for communicating shipboard engineering casualty and damage control information over the AC power lines of a vessel, comprising:
    an electrical power distribution line located throughout the vessel;
    a plurality of carrier-current communication means for transmitting and receiving data and control information positioned at predetermined locations throughout said vessel and connected to said power line to form a local area network (LAN);

said LAN of carrier-current communication means comprising at least one Terminal Unit and one Data and Control Unit;

said Terminal Unit comprising:

a power line carrier current (PLCC) transceiver means for sending and receiving electrical signals constituting a LAN message over said power distribution line;

a slave processing means for interfacing and controlling communication with a first plurality of sensors and equipment located aboard said vessel;

a user operable terminal means for inputting, outputting and displaying data and control information;

an intelligent controller means for providing an interactive user-friendly operator interface via a display of said terminal means and for maintaining a data base of said shipboard engineering casualty and damage control information in a local non-volatile memory;

a master processing means for controlling the exchange of information between said slave processing means, said intelligent controller means and said PLCC transceiver means, and for controlling the formation, transmission and reception of LAN messages with any other carrier-current communications means in said LAN via said PLCC transceiver means;

said Data and Control means comprising:

a second PLCC transceiver means for sending and receiving electrical signals constituting a LAN message over said power distribution line;

a second slave processing means for interfacing and controlling communication with a second plurality of sensors and equipment located aboard said vessel;

a second master processing means, connected to said second slave processing means and said second PLCC transceiver means, for controlling the exchange of information between said second slave processing means and said PLCC transceiver means, and for controlling the formation, transmission and reception of LAN messages with any other carrier-current communications means in sand LAN via said PLCC transceiver means.

5. A distributed intelligence data acquisition and equipment control system for communicating shipboard engineering casualty and damage control information over the AC power lines of a vessel, comprising:

an electrical power distribution line located throughout the vessel;

a plurality of carrier-current communication units which are positioned at predetermined locations throughout said vessel and connected to said power line to form a local area network (LAN);

said LAN of carrier-current communication units comprising at least one Terminal Unit;

said Terminal Unit comprising:

a power line carrier current (PLCC) Transceiver for sending and receiving electrical signals constituting LAN messages over said power distribution line;

a slave processing unit for interfacing and controlling communication with sensors and equipment located aboard said vessel;

an input/output (I/O) touch-screen display device;

an intelligent controller means for providing an interactive user-friendly operator interface via said touch-screen display and for maintaining a data base of said shipboard engineering casualty and damage control information in a local non-volatile memory; and a master processing unit connected to said slave processing unit, to said PLCC transceiver and to said intelligent controller for controlling the exchange of information between said slave processing unit, said intelligent controller and any other carrier-current communications units in the LAN via said PLCC transceiver, including the formation, transmission and reception of said LAN messages.

6. A distributed intelligence data acquisition and equipment control system for communicating data and control information over the AC power lines of a vessel, comprising:

an electrical power distribution line located throughout said vessel;

a plurality of carrier-current communication means for transmitting and receiving data and control information positioned at predetermined locations throughout said vessel and connected to said power line to form a local area network (LAN);

said LAN of carrier-current communication means comprising at least one Terminal Unit;

said Terminal Unit comprising:

a power line carrier current (PLCC) transceiver means for sending and receiving electrical signals constituting a LAN message over said power distribution line;

a slave processing means for interfacing and controlling communication with a first plurality of sensors and equipment located aboard said vessel;

a user operable terminal means for inputting, outputting and displaying data and control information;

an intelligent controller means for providing an interactive user-friendly operator interface via a display of said user operable terminal means and for maintaining a data base of said shipboard engineering casualty and damage control information in a local non-volatile memory; and a master processing means for controlling the exchange of information between said slave processing means, said intelligent controller means and said PLCC transceiver means, and for controlling the formation, transmission and reception of LAN messages with any other carrier-current communications means in said LAN via said PLCC transceiver means.

7. The control system as set forth in claim 2, wherein said DAIEC means further comprises a means for maintaining a data base of integrated command, communications and damage control information in said volatile memory.

8. The control system as set forth in claim 2, wherein said user operable I/O device means is a touch-screen display I/O device.

9. The control system as set forth in claim 2, wherein said user interface I/O device means includes a visual display screen and said means for providing an interactive user interface further comprises a means for generating a plurality of different predetermined graphic displays in response to various user input selections.

10. The control system as set forth in claim 2, wherein said DAIEC means further comprises a means for providing a plurality of predetermined monitoring, equipment control, user interface and communications functions specific to a particular group of predetermined damage control responsibilities to be implemented on a vessel.

11. The control system as set forth in claim 10, wherein damage control responsibilities implemented on said vessel are classified into a plurality of specific functional groups; said plurality of functional groups comprising:
an electrical control group.

12. The control system as set forth in claim 10, wherein damage control responsibilities implemented on said vessel are classified into a plurality of specific functional groups; said plurality of functional groups comprising:
a mechanical control group.

13. The control system as set forth in claim 10, wherein damage control responsibilities implemented on said vessel are classified into a plurality of specific functional groups; said plurality of functional groups comprising:
a damage control group.

14. The control system as set forth in claim 10, wherein damage control responsibilities implemented on said vessel are classified into a plurality of specific functional groups; said plurality of functional groups comprising:
a communication control group.

15. The control system as set forth in claim 10, wherein damage control responsibilities implemented on said vessel are classified into a plurality of specific functional groups; said plurality of functional groups comprising:
a spare control group.

16. The control system as set forth in claim 10, wherein said vessel is a marine vessel.

17. The control system as set forth in claim 3, wherein said electrical signals constituting a LAN message are OQPSK signals.

18. The control system as set forth in claim 3, wherein said PLCC transceiver comprises a means for sending and a means for receiving M-ary PSK signals.

19. The distributed intelligence control system as set forth in claim 3, wherein said slave processing unit comprises a microprocessor connected to an addressable random access memory and an I/O port interface means for enabling communications with said sensors and equipment.

20. The distributed intelligence control system as set forth in claim 19, wherein said I/O port interface means comprises RS-232-C serial and parallel interfaces.

21. The distributed intelligence control system as set forth in claim 3, wherein said Terminal Unit further comprises a plurality of RS-232-C I/O ports and said slave processing unit controls both serial and parallel communications with said sensors and equipment through said RS-232-C I/O ports.

22. The distributed intelligence control system as set forth in claim 4, wherein said electrical signals constituting a LAN message are OQPSK signals and said PLCC transceiver comprises a means for sending and receiving OQPSK signals.

23. The distributed intelligence control system as set forth in claim 4, wherein said PLCC transceiver means comprises a means for sending and a means for receiving M-ary PSK signals.

24. The distributed intelligence control system as set forth in claim 4, wherein said slave processing means comprises a microprocessor connected to an addressable random access memory and an I/O port interface means for enabling serial and parallel communications with said sensors and equipment.

25. The distributed intelligence control system as set forth in claim 24, wherein said I/O port interface means comprise RS-232-C serial and parallel interfaces.

26. The distributed intelligence control system as set forth in claim 4, wherein said Terminal Unit further comprises a plurality of RS-232-C I/O ports and said slave processing means controls both serial and parallel communications with said sensors and equipment through said RS-232C I/O ports.

27. The distributed intelligence control system as set forth in claim 4, wherein said master processor includes means for packeting digital data information to be transmitted over the LAN into one or a plurality of messages having an HDLC protocol format and for depacketing HDLC protocol messages received from the LAN to extract digital data information transmitted by other said carrier-current communication means.

28. The distributed intelligence control system as set forth in claim 4, wherein said master processor includes means for selectively transmitting messages over the LAN in either a broadcast mode or an address mode.

29. The distributed intelligence control system as set forth in claim 4, wherein said transceiver means comprises a transmit logic circuit means for producing a modulated PSK waveform in direct response to digital signals provided by said master processor and a receiver logic circuit means for detecting and demodulating PSK waveform signals received over said power lines.

30. The distributed intelligence control system as set forth in claim 29, wherein said transmit logic means comprises an addressable waveform memory means for storing digitized RF modulated waveform data coupled to a digital-to-analog converter for producing an analog PSK modulated signal in response to said digital signals provided by said master processor.

31. The control system as set forth in claim 5, wherein said electrical signals constituting a LAN message are OQPSK signals and said PLCC transceiver comprises means for sending and receiving OQPSK signals.

32. The control system as set forth in claim 5, wherein said PLCC transceiver comprises a means for sending and a means for receiving M-ary PSK signals.

33. The distributed intelligence control system as set forth in claim 5, wherein said slave processing unit comprises a microprocessor connected to an addressable random access memory and an I/O port interface means for enabling communications with said sensors and equipment.

34. The distributed intelligence control system as set forth in claim 33, wherein said I/O port interface means comprises RS-232-C serial and parallel interfaces.

35. The distributed intelligence control system as set forth in claim 5, wherein said Terminal Unit further comprises a plurality of RS-232-C I/O ports and said slave processing unit controls both serial and parallel communications with said sensors and equipment through said RS-232-C I/O ports.

36. The distributed intelligence control system as set forth in claim 5, wherein said master processor includes means for packeting digital data information to be transmitted over the LAN into one or a plurality of messages having an HDLC protocol format and for depacketing HDLC protocol messages received from the LAN to extract digital data information transmitted by other said carrier-current communication means.

37. The distributed intelligence control system as set forth in claim 5, wherein said master processing unit includes means for selectively transmitting messages over the LAN in either a broadcast mode or an address mode.

38. The distributed intelligence control system as set forth in claim 5, wherein said PLCC transceiver comprises a transmit logic circuit for producing a modulated PSK waveform in direct response to digital signals provided by said master processing unit and a receiver logic circuit for detecting and demodulating PSK waveform signals received over said power line.

39. The distributed intelligence control system as set forth in claim 38, wherein said transmit logic comprises an addressable waveform memory means for storing digitized RF modulated waveform data coupled to a digital-to-analog converter for producing an analog PSK modulated signal in response to said digital signals provided by said master processor.

40. The distributed intelligence control system as set forth in claim 5, wherein said intelligent controller comprises a digital processor unit coupled to a non-volatile addressable memory for storing said data base and further includes a means for providing an interactive user interface for a user operable I/O device.

41. The distributed intelligence control system as set forth in claim 6, wherein said electrical signals constituting a LAN message are OQPSK signals.

42. The distributed intelligence control system as set forth in claim 6, wherein said PLCC transceiver means comprises a means for sending and a means for receiving M-ary PSK signals.

43. The distributed intelligence control system as set forth in claim 6, wherein said slave processing means comprises a microprocessor connected to an addressable random access memory and an I/O port interface means for enabling serial and parallel communications with said sensors and equipment.

44. The distributed intelligence control system as set forth in claim 43, wherein said I/O port interface means comprises RS-232-C serial and parallel interfaces.

45. The distributed intelligence control system as set forth in claim 6, wherein said Terminal Unit further comprises a plurality of RS-232-C I/O ports and said slave processing means controls both serial and parallel communications with said sensors and equipment through said RS-232-C I/O ports.

46. The distributed intelligence control system as set forth in claim 6, wherein said master processor includes means for packeting digital data information to be transmitted over the LAN into one or a plurality of messages having an HDLC protocol format and for depacketing HDLC protocol messages received from the LAN to extract digital data information transmitted by other said carrier-current communication means.

47. The distributed intelligence control system as set forth in claim 6, wherein said master processor includes means for selectively transmitting messages over the LAN in either a broadcast mode or an address mode.

48. The distributed intelligence control system as set forth in claim 6, wherein said transceiver means comprises a transmit logic circuit means for producing a modulated PSK waveform in direct response to digital signals provided by said master processor and a receiver logic circuit means for detecting and demodulating PSK waveform signals received over said power line.

49. The distributed intelligence control system as set forth in claim 48, wherein said transmit logic means comprises an addressable waveform memory means for storing digitized RF modulated waveform data coupled to a digital-to-analog converter for producing an analog PSK modulated signal in response to said digital signals provided by said master processor.

50. The distributed intelligence control system as set forth in claim 6, wherein said intelligent controller comprises a digital processor unit coupled to a non-volatile addressable memory for storing said data base and further includes a means for providing an interactive interface for a user operable I/O device.

51. A system for monitoring conditions of predetermined areas and equipment and for communicating data and control command information over existing on-site power lines, comprising:

a plurality of carrier-current communication means positioned at predetermined locations on said power lines and forming a local area network (LAN) for transmitting and receiving information, wherein at least one of said carrier-current communication means includes a controller means for controlling the exchange of information with other carrier-current communication means in the LAN, maintaining a local data base of stored information indicative of monitored conditions and equipment, and for providing a user interface to said local data base and to said plurality of carrier-current communication means in the LAN;

said controller means comprising a digital processor connected to a non-volatile memory and a user operable I/O means for allowing a user to input information onto and obtain information from the LAN.

52. The system for monitoring and communicating information as set forth in claim 51, wherein said data base of stored information comprises integrated command and communications information.

53. The system for monitoring and communicating information as set forth in claim 51, wherein said user operable I/O means is a touch-screen display device.

54. The system for monitoring and communicating information as set forth in claim 51, wherein said user plurality of carrier-current communications means consists of one or more terminal units and one or more data and control units.

55. The system for monitoring and communicating information as set forth in claim 51, wherein said data plurality of carrier-current communications means includes one or more terminal unit means for providing an interactive user operable I/O interface and one or data and control unit means for providing an I/O interface for sensors and equipment used in a predetermined controlled area.

56. The system for monitoring and communicating information as set forth in claim 51, wherein said data base of stored information comprises both archived and currently acquired data regarding the status and operating conditions of various sensors and equipment in said controlled areas.

57. The system for monitoring and communicating information as set forth in claim 51, wherein said controller means includes a means for managing a local data base of integrated command, equipment parameter and damage control information stored in said non-volatile memory and for communicating such information to other communication means.

58. The system for monitoring and communicating information as set forth in claim 51, wherein said controller means is primarily responsible for providing a predetermined plurality of functions that are specific to at least one group of predetermined damage control responsibilities, said predetermined damage control responsibilities comprising:
- an electrical control group,
- a mechanical control group,
- a damage control group,
- a communication control group, and
- a spare group.

59. The system for monitoring and communicating information as set forth in claim 51, wherein said predetermined areas comprise a plurality of damage control zones having predetermined boundaries and said plurality of carrier-current communication means comprise at least one communication means associated with and located within each of said zones.

60. The system for monitoring and communicating information as set forth in claim 59, wherein said plurality of carrier-current communication means include a primary communication means and at least one secondary communication means associated with and located within each of said zones, said secondary communication means functioning as an active backup for an associated primary communication means within the same damage control zone.

61. The system for monitoring and communicating information as set forth in claim 60, wherein each of said primary communication means is assigned a specific group of damage control responsibilities that is mutually exclusive of damage control responsibilities assigned to other primary communication means.

62. The system for monitoring and communicating information as set forth in claim 51, wherein said carrier-current communication means further comprises:
- a transceiver means for transmitting and receiving electrical signals over said power lines.

63. The system for monitoring and communicating information as set forth in claim 62, wherein said transceiver means comprises a transmit logic circuit means for producing a modulated analog waveform in direct response to digital signals provided by said master processor.

64. The system for monitoring and communicating information as set forth in claim 63, wherein said transmit logic means comprises an addressable waveform memory means for storing digitized PSK modulated waveform data coupled to a digital-to-analog converter for producing an analog PSK modulated signal in response to said digital signals provided by said master processor.

65. The system for monitoring and communicating information as set forth in claim 64, wherein said transmit logic means further comprises a data splitter means for splitting digital data received from said master processor into two separate orthogonal phase channels and for providing address inputs to said waveform memory.

66. The system for monitoring and communicating information as set forth in claim 64, wherein said addressable waveform memory comprises a read only memory.

67. The system for monitoring and communicating information as set forth in claim 63, wherein said transmit logic means includes a means for generating a message header comprising a first predetermined sequence of bits and a message footer having second predetermined sequence of bits.

68. The system for monitoring and communicating information as set forth in claim 62, wherein said transceiver means comprises a receiver logic circuit means for detecting and demodulating PSK signals received over said power line.

69. The system for monitoring and communicating information as set forth in claim 62, wherein said transceiver means comprises a means for sending and a means for receiving M-ary PSK signals.

70. The system for monitoring and communicating information as set forth in claim 62, wherein said transceiver means comprises a means for sending and a means for receiving OQPSK signals.

71. The system for monitoring and communicating information as set forth in claim 62, wherein said carrier-current communication means further comprises:
- a slave processor means for interfacing and controlling communications with sensors and equipment in a controlled area, and
- master processor means connected to said transceiver means, said controller means said slave processor for controlling exchange of information between said slave processor, said controller and other communication means in the LAN via said transceiver means.

72. The system for monitoring and communicating information as set forth in claim 71, wherein said master processor includes means for packeting digital data information to be transmitted over the LAN into one or a plurality of messages having an HDLC protocol format and for depacketing HDLC protocol messages received from the LAN to extract similar digital data digital information transmitted by other said carrier-current communication means.

73. The system for monitoring and communicating information as set forth in claim 71, wherein said master processor includes means for transmitting messages over the LAN in either a broadcast mode or an address mode.

74. A distributed intelligence system for monitoring and controlling conditions of predetermined areas and electrical and mechanical apparatus aboard a vessel and for communicating damage control information relating to said areas and apparatus over existing power lines of said vessel, comprising:
- a plurality of communication means coupled to said power lines at predetermined locations for transmitting and receiving said damage control information;
- condition sensing means, coupled to said communication means, for monitoring equipment and sensing ambient conditions within said predetermined areas of said vessel;
- equipment control means, coupled to said communication means, for controlling at least one of said electrical and mechanical apparatus in response to control signals from said communication means.

75. The system for monitoring and communicating damage control information as set forth in claim 74, wherein said communication means comprises a carrier-current transceiver means for bidirectionally communicating with other communication means via said power lines.

76. The system for monitoring and communicating damage control information as set forth in claim 74, wherein said plurality of communication means, comprise:
- a main mechanical control communication means.

77. The system for monitoring and communicating damage control information as set forth in claim 74, wherein said plurality of communication means, comprise:

a main electrical control communication means.

78. The system for monitoring and communicating damage control information as set forth in claim 74, wherein said plurality of communication means, comprise:

a main damage control communication means.

79. The system for monitoring and communicating damage control information as set forth in claim 74, wherein said plurality of communication means, comprise:

a main communication control communication means.

80. The system for monitoring and communicating damage control information as set forth in claim 74, wherein said plurality of communication means, comprise:

a main spare communication means.

81. The system for monitoring and communicating damage control information as set forth in claim 74, wherein said equipment control means comprises means for controlling hatches, fittings, vents or valves.

82. The system for monitoring and communicating damage control information as set forth in claim 74, wherein said parameter sensing means comprises means for sensing smoke, fire or flooding.

83. The system for monitoring and communicating damage control information as set forth in claim 74, wherein at least one of said communication means comprises an intelligent controller having a memory for storing a data base of integrated command and damage control information; said intelligent controller including means for controlling communication of monitored information and information stored in said data base to other communication means.

84. The system for monitoring and communicating damage control information as set forth in claim 83, wherein said intelligent controller means further comprises artificial intelligence means for evaluating data obtained from said data base and from said parameter sensing means and for generating equipment control commands provided to said equipment control means or transmitted over said power lines to other said communication means.

85. The system for monitoring and communicating damage control information as set forth in claim 83, wherein said intelligent controller comprises a digital processor unit coupled to a non-volatile addressable memory means for storing said data base and further includes a means for providing an interactive user interface for a user operable I/O device.

86. The system for monitoring and communicating damage control information as set forth in claim 85, wherein said communication means further comprises a touch-screen display terminal device.

87. The system for monitoring and communicating damage control information as set forth in claim 83, wherein said data base of integrated command and damage control information, further comprises:

address and location data for said plurality of communication means.

88. The system for monitoring and communicating damage control information as set forth in claim 83, wherein said data base of integrated command and damage control information further comprises:

an equipment list and equipment parameter data.

89. The system for monitoring and communicating damage control information as set forth in claim 83, wherein said data base of integrated command and damage control information further comprises:

system operational mode configuration data.

90. The system for monitoring and communicating damage control information as set forth in claim 74, wherein said predetermined areas comprise a plurality of damage control zones having predetermined boundaries throughout said vessel and said plurality of communication means comprise at least one communication means associated with and located within each of said zones.

91. The system for monitoring and communicating damage control information as set forth in claim 90, wherein said plurality of communication means include a primary communication means and at least one secondary communication means associated with and located within each of said zones, said secondary communication means functioning as an active backup for an associated primary communication means within a particular damage control zone.

92. The system for monitoring and communicating damage control information as set forth in claim 91, wherein each of said primary communication means is assigned a specific group of damage control responsibilities for said vessel that are mutually exclusive of damage control responsibilities of other primary communication means.

93. The system for monitoring and communicating damage control information as set forth in claim 92, wherein each said primary communication means comprises an intelligent controller means for managing a data base of integrated command, equipment parameter and damage control information and for communicating information to other communication means.

94. A damage control management system for a vessel, comprising:

a network comprising a plurality of electrically interconnected communication nodes distributed throughout said vessel, wherein said nodes comprise means for monitoring and controlling equipment and conditions within corresponding predetermined areas aboard said vessel, at least one of said nodes comprise:

user operable I/O terminal means for displaying information and inputting user selections, and a processor means, connected to said I/O terminal and to said means for monitoring, for providing an interactive user interface via said I/O terminal, said processor means including means for generating a visual display of various data and damage control information on said user operable I/O terminal means in response to inputted user selections.

95. The damage control management system as set forth in claim 94, wherein said means for monitoring and controlling includes means for monitoring fire, smoke, flooding or other conditions aboard a vessel.

96. The damage control management system as set forth in claim 94, wherein said vessel is equipped with electrical power lines distributed throughout said vessel, said communication nodes are electrically interconnected via said power lines and each communication node in said network further includes a carrier-current modulation means for communicating various data and damage control information with other communication nodes in the network.

97. The damage control management system as set forth in claim 94, wherein said visual display of damage control information comprises a display of the location and status of monitored conditions and equipment.

98. The damage control management system as set forth in claim 94, wherein said visual display of damage control information includes at least one menu display of user selectable commands for controlling said conditions and equipment.

99. The damage control management system as set forth in claim 94, wherein said user operable I/O terminal means is a touch-screen display device.

100. A damage control management system for a vessel, comprising:
- a network comprising a plurality of electrically interconnected communication nodes distributed throughout said vessel, wherein said nodes comprise means for monitoring and controlling equipment and conditions within corresponding predetermined areas aboard said vessel, at least one of said nodes comprising:
- a memory means for storing a local data base of common damage control information comprising commands, parameters and sensor data for said areas of said vessel, and
- a means for maintaining and updating said data base through communication of said information between predetermined nodes.

101. The damage control management system as set forth in claim 100, wherein said predetermined nodes each further comprise a means for providing a plurality of predetermined monitoring, equipment control, user interface and communications functions specific to a particular group of predetermined damage control responsibilities to be implemented on a vessel.

102. The damage control management system as set forth in claim 101, wherein said damage control responsibilities implemented on a vessel are classified into a plurality of specific functional groups, said functional groups comprising:
- an electrical control group, and
- a mechanical control group.

103. The damage control management system as set forth in claim 101, wherein said damage control responsibilities implemented on a vessel are classified into a plurality of specific functional groups, said functional groups comprising:
- a damage control group and
- a communication control group.

104. The damage control management system as set forth in claim 101, wherein said damage control responsibilities implemented on a vessel are classified into a plurality of specific functional groups, said functional groups comprising:
- a spare group.

105. The damage control management system for a vessel as set forth in claim 100, wherein said vessel is equipped with electrical power lines distributed throughout said vessel and said communication nodes are electrically interconnected via said power lines.

106. The damage control management system for a vessel as set forth in claim 100, wherein said predetermined nodes further comprise a user operable I/O terminal and a means for providing an interactive user interface via said terminal.

107. The damage control management system as set forth in claim 100, wherein said memory is a non-volatile addressable memory.

108. A system for monitoring conditions of predetermined areas and equipment and for communicating information over existing on-site power lines, comprising:
- a plurality of carrier-current communication means positioned at predetermined locations on said power lines and forming a local area network (LAN) for transmitting and receiving information, wherein at least one of said carrier-current communication means comprises:
- a slave processor means for interfacing and controlling communications with sensors and equipment in a predetermined area,
- a transceiver means for transmitting and receiving electrical signals over said power lines; and
- a master processor means connected to said transceiver means and said slave processor for controlling exchange of information between said slave processor and other communication means in the LAN via said transceiver means.

109. The system for monitoring and communicating information as set forth in claim 108, wherein said transceiver means comprises a means for sending and a means for receiving M-ary PSK signals.

110. The system for monitoring and communicating information as set forth in claim 108, wherein said transceiver means comprises a means for sending and a means for receiving OQPSK signals.

111. The system for monitoring and communicating information as set forth in claim 108, wherein said master processor includes means for packeting digital data information to be transmitted over the LAN into one or a plurality of messages having an HDLC protocol format and for depacketing HDLC protocol messages received from the LAN to extract digital data information transmitted by other said carrier-current communication means.

112. The system for monitoring and communicating information as set forth in claim 108, wherein said master processor includes means for selectively transmitting messages over the LAN in either a broadcast mode or an address mode.

113. The system for monitoring and communicating information as set forth in claim 108, wherein said transceiver means comprises a transmit logic circuit means for producing a modulated analog waveform in direct response to digital signals provided by said master processor.

114. The system for monitoring and communicating information as set forth in claim 113, wherein said transmit logic means comprising a means for generating a message header having a first predetermined sequence of bits and a message footer having second predetermined sequence of bits.

115. The system for monitoring and communicating information as set forth in claim 113, wherein said transmit logic means comprises an addressable waveform memory means for storing digitized PSK modulated waveform data coupled to a digital-to-analog converter for producing an analog PSK modulated signal in response to said digital signals provided by said master processor.

116. The system for monitoring and communicating information as set forth in claim 115, wherein said addressable waveform memory means comprises a read-only-memory.

117. The system for monitoring and communicating information as set forth in claim 115, wherein said transmit logic means further comprises a data splitter means for splitting digital data received from said master processor into two separate orthogonal phase channels and for providing address inputs to said waveform memory.

118. The system for monitoring and communicating information as set forth in claim 108, wherein said transceiver means comprises a receiver logic circuit means for detecting and demodulating PSK waveform signals received over said power lines.

119. The system for monitoring and communicating information as set forth in claim 118, wherein said receiver logic circuit means comprises an electrically reconfigurable QPSK signal acquisition circuit; said signal acquisition circuit reconfigurable via electronic switches from/to an operative configuration as a single-phase phase locked loop to/from an operative configuration as a four-phase Costas loop.

120. The system for monitoring and communicating information as set forth in claim 118, wherein said receiver logic circuit means comprises a lock detector circuit means for providing a carrier lock detect signal indicative of the initial state of a transmitted QPSK signal received by said transceiver; said lock detect signal providing an unambiguous phase correlation indication that a reference carrier signal generated by said receiver logic during demodulation has no phase ambiguity with respect to said transmitted QPSK signal data.

121. A carrier-current transceiver circuit for transmitting and receiving phase shift keyed (PSK) signals over an electrical power line, comprising:
transmit logic means for generating a PSK modulated waveform signal from binary signal information; and
receiver logic means for detecting and demodulating PSK signals to produce binary signal information.

122. The carrier-current transceiver as set forth in claim 121, wherein said transmit logic means comprises an addressable waveform memory means for storing digitized PSK modulated waveform data coupled to a digital-to-analog converter for producing an analog PSK modulated signal in response to said binary signal information.

123. The carrier-current transceiver as set forth in claim 122, wherein said addressable waveform memory means comprises a read-only-memory.

124. The carrier-current transceiver as set forth in claim 122, wherein said transmit logic means further comprises a data splitter means for splitting said binary signal information into two separate data channels of orthogonal phase and for providing said data channels as address inputs to said waveform memory.

125. The carrier-current transceiver as set forth in claim 121, wherein said receiver logic means comprises an electrically reconfigurable QPSK signal acquisition circuit; said signal acquisition circuit reconfigurable via electronic switches from/to an operative configuration as a single-phase phase locked loop to/from an operative configuration as a four-phase Costas loop.

126. The carrier-current transceiver as set forth in claim 121, wherein said receiver logic means comprises a lock detector circuit means for providing a carrier lock detect signal indicative of the initial state of a transmitted QPSK signal received by said transceiver; said lock detect signal providing an unambiguous phase correlation indication that a reference carrier signal generated by said receiver logic during demodulation has no phase ambiguity with respect to said transmitted QPSK signal data.

127. The carrier-current transceiver as set forth in claim 121, further comprising:
isolated linear power amplifier means inductively coupled to said transmit logic and electrically coupled to said power line for amplifying and transmitting said PSK waveform signal and for isolating said transmit logic from power line voltages.

128. The carrier-current transceiver as set forth in claim 121, further comprising:
pre-detection receiver circuit means electrically coupled via a high common mode rejection transformer to said power line and optically coupled to said receiver logic for filtering and receiving PSK signals present on said power line; said pre-detection receiver circuit comprising a multiple bandpass multiple allpass-pole filter.

129. The carrier-current transceiver as set forth in claim 121, wherein said receiver logic means comprises a phase locked loop type signal acquisition circuit; said signal acquisition circuit comprising a plurality of switched-capacitor filters driven by a raised-cosine waveform clocking frequency source.

130. A system for communicating information over a power line, comprising:
a plurality of communication means positioned at predetermined locations on said power line for transmitting and receiving information;
said plurality of communication means comprising at least one terminal unit communication means;
said terminal unit communication means comprising:
a power line transceiver for sending and receiving electrical signals over said power line;
a non-volatile memory for storing information local to said Terminal Unit;
a user operable I/O device for inputting information and obtaining information from said Terminal Unit communication means for local storage or for transmission to other communication units via said power line transceiver;
a terminal unit controller for providing an interactive user interface via said user operable I/O device and for maintaining a data base of communications information in said local non-volatile memory; and
a master processor for controlling the exchange of information between said controller means and other said communications units via said power line transceiver.

131. The system for communicating information as set forth in claim 130, wherein said Terminal Unit communication means further comprises a slave processing means for interfacing and controlling communications with sensors and equipment external to said Terminal Unit; said slave processing means comprising a microprocessor connected to an addressable memory and an I/O port interface means for enabling serial and parallel communications with said sensors and equipment.

132. The system for communicating information as set forth in claim 130, wherein said power line transceiver means comprises a means for sending and a means for receiving M-ary PSK signals.

133. The system for communicating information as set forth in claim 130, wherein said power line transceiver comprises a means for sending and a means for receiving OQPSK signals.

134. The system for communicating information as set forth in claim 130, wherein said master processor includes means for packeting digital data information to be transmitted into one or a plurality of messages having an HDLC protocol format and for depacketing HDLC protocol messages received from the LAN to extract digital data information transmitted by other said communication means.

135. The system for communicating information as set forth in claim 130, wherein said master processor includes means for selectively transmitting messages over the LAN in either a broadcast mode or an address mode.

136. The system for communicating information as set forth in claim 130, wherein said power line transceiver means comprises a transmit logic circuit means for producing a modulated PSK waveform in direct response to digital signals provided by said master processor.

137. The system for communicating information as set forth in claim 136, wherein said transmit logic means includes a means for generating a message header comprising a first predetermined sequence of bits and a message footer having second predetermined sequence of bits.

138. The system for communicating information as set forth in claim 136, wherein said transmit logic means comprises an addressable waveform memory means for storing digitized RF modulated waveform data coupled to a digital-to-analog converter for producing an analog PSK modulated signal.

139. The system for communicating information as set forth in claim 138, wherein said addressable waveform memory means comprises a read-only-memory.

140. The system for communicating information as set forth in claim 136, wherein said transmit logic means further comprises a data splitter means for splitting digital data received from said master processor into two separate orthogonal phase channels and for providing address inputs to said waveform memory.

141. The system for communicating information as set forth in claim 131, wherein said I/O port interface means comprises RS-232-C serial and parallel interfaces.

142. The system as set forth in claim 130, wherein said Terminal Unit further comprises a plurality of RS-232-C I/O ports and said slave processing means controls both serial and parallel communications with said sensors and equipment through said RS-232-C I/O ports.

143. In a phase locked loop circuit for a receiver, an improved VCO circuit comprising:
input means form providing a VCO circuit input control voltage;
a pair of high frequency crystal-stabilized voltage controlled oscillators each including a frequency determining network means for setting a preferred operational frequency; said frequency determining network means comprising at least one varactor diode and a crystal and each of said oscillators set to operate at a different frequency;
oscillator frequency pulling means for equally and oppositely varying the operational frequencies of said pair of crystal-stabilized voltage controlled oscillators slightly in direct response to said VCO circuit input control voltage; and
demodulator circuit means connected to said pair of crystal-stabilized voltage controlled oscillators for providing a VCO circuit output frequency corresponding to the difference between operational frequencies of each oscillator of said pair of crystal-stabilized voltage controlled oscillators.

144. The improved VCO circuit as set forth in claim 143, wherein the varactor diodes and crystals for said frequency determining networks of said pair of crystal-stabilized voltage controlled oscillators are all mounted on a common heat sink.

145. The damage control management system as set forth in claim 94, further comprising a storage means connected to said processor for storing digital information representing a plurality of display formats organized to provide a hierarchical display of predetermined damage control information and management command functions, at least one of said display formats comprising plural input fields for selectively displaying other display formats corresponding to predetermined damage control information in response to inputted user selections via said I/O terminal.

146. The damage control management system as set forth in claim 145, wherein each of said display formats displayed by said I/O terminal means includes:
(a) a screen control command menu section disposed in a lower portion of said display format;
(b) a data display and command menu section disposed in a center portion of said display format; and
(c) a terminal I/O data message and status display section disposed in an upper portion of said display format.

147. The system for monitoring and communicating damage control information as set forth in claim 83, wherein said intelligent controller comprises a digital processor connected to said memory and includes a storage means for storing digital information representing a plurality of display formats organized to provide a hierarchical display of predetermined damage control information and management command functions, at least one of said display formats comprising plural input fields for selectively displaying other display formats corresponding to predetermined damage control information in response to inputted user selections via a user operable I/O device connected to said digital processor.

148. The system for monitoring and communicating information as set forth in claim 108, wherein master processor includes a storage means for storing digital information representing a plurality of display formats organized to provide a hierarchical display of predetermined damage control information and management command functions, at least one of said display formats comprising plural input fields for selectively displaying other display formats corresponding to predetermined damage control information in response to inputted user selections via a user operable I/O device connected to said master processor.

149. A method for monitoring and controlling conditions of predetermined areas and equipment and for communicating data and control information over existing on-site power lines, said method comprising:
providing a plurality of carrier-current communication units positioned at predetermined locations on said power lines for transmitting and receiving information;
electronically monitoring conditions of predetermined areas and equipment;
providing data regarding said conditions and equipment to an associated communication unit;
maintaining a local data base of damage control information at predetermined communication units;

exchanging said data and control information between carrier-current communication units; and providing a user interface to said local data base and to said plurality of carrier-current communication means via an I/O device operatively connected to one of said communication units.

150. A method for exercising damage control management aboard a vessel, said method comprising:

providing a plurality of electrically interconnected communication units distributed throughout said vessel;

monitoring conditions and equipment within predetermined areas of said vessel corresponding to locations of said distributed communication units, said units receiving data regarding monitored conditions and equipment in said corresponding areas;

providing said data and further damage control information to other predetermined interconnected communication units;

creating at least one data base of damage control information operatively connected to one of said communication units, said data base comprising operational parameters corresponding to monitored conditions and equipment for said predetermined areas;

maintaining and updating said data base with data obtained by said monitoring and with damage control information provided from other communication units; and providing interactive user access to said damage control information stored in said data base via an I/O device operatively connected to one of said communication units.

* * * * *

UNITED STATES PATENT AND TRADEMARK OFFICE
CERTIFICATE OF CORRECTION

PATENT NO. : 5,349,644
DATED : Sep. 20, 1994
INVENTOR(S) : Massey et al.

It is certified that error appears in the above-identified patent and that said letters patent is hereby corrected as shown below:

Column 7, line 64, "The" should read -- the --;
, line 67, "ship" should read -- ship's --;
Column 8, line 56, insert a comma after "setting" and after "boot-up";
Column 9, line 26, delete "it's";
Column 14, line 25, after "types" delete the comma;
Column 17, line 8, change "the" to -- an --;
, line 18, after "for" delete "the";
, line 21, delete "where" and insert -- the --;
, line 21, after "is" delete "the" and insert -- where --;
, line 27, after "system" insert -- (described below) --;
Column 18, line 56, after "DAIEC" delete "that";
Column 19, line 12, change "FIG. 7E1" to -- FIG. 7E --;
Column 20, line 20, change "feeds" to -- feed --;
Column 21, line 35, change "beig" to -- being --;
Column 26, line 9, after "control" insert --unit --;
Column 28, line 3, change "me" to -- one --;
Column 31, line 59, delete "A";
Column 33, line 34, change "mode" to -- made --;
Column 43, in last line of table, change "740" to -- 7F0 --;
Column 47, line 23, after "U1" delete the comma;

UNITED STATES PATENT AND TRADEMARK OFFICE
CERTIFICATE OF CORRECTION

PATENT NO. : 5,349,644
DATED : Sep. 20, 1994
INVENTOR(S) : Massey et al.

It is certified that error appears in the above-identified patent and that said letters patent is hereby corrected as shown below:

In the table in column 7, under the headings for "SYMBOL", "PART NO." and "FUNCTION/DESCRIPTION", the last 7 lines should read as follows:

| Symbol | Part No. | Function/Description |
|---|---|---|
| ⌸ | — | +15 |
| ⌸ | — | +8 |
| ⚡ | — | +5 |
| ⏚ | — | HOT GROUND |
| ⏚ | — | FLOATING GROUND |
| ⌸ | — | -8 |
| ⌸ | — | -15 |

Signed and Sealed this

Thirtieth Day of May, 1995

Attest:

BRUCE LEHMAN

Attesting Officer

*Commissioner of Patents and Trademarks*